(12) United States Patent
Rabin et al.

(10) Patent No.: US 7,073,197 B2
(45) Date of Patent: Jul. 4, 2006

(54) METHODS AND APPARATUS FOR PROTECTING INFORMATION

(75) Inventors: Michael O. Rabin, Cambridge, MA (US); Dennis E. Shasha, New York, NY (US)

(73) Assignee: ShieldIP, Inc., New York, NY (US)

( * ) Notice: Subject to any disclaimer, the term of this patent is extended or adjusted under 35 U.S.C. 154(b) by 359 days.

(21) Appl. No.: 10/737,079

(22) Filed: Dec. 16, 2003

(65) Prior Publication Data

US 2004/0128515 A1   Jul. 1, 2004

Related U.S. Application Data

(62) Division of application No. 09/305,572, filed on May 5, 1999, now Pat. No. 6,697,948.

(51) Int. Cl.
*G06F 11/30* (2006.01)

(52) U.S. Cl. .............................. 726/18; 726/22; 726/28

(58) Field of Classification Search .................. 726/35, 726/31, 28–30, 18, 21, 22
See application file for complete search history.

(56) References Cited

U.S. PATENT DOCUMENTS 3,609,697 A    9/1971    Blevins et al.

(Continued)

FOREIGN PATENT DOCUMENTS

| JP | 411136618 A | 5/1999 |
|---|---|---|
| WO | WO 98/45768 | 10/1998 |

OTHER PUBLICATIONS

Digimarc: Digimarc Watermarking Technology Receives U.S. Patent, *Business Wire*, File 810, Jun. 11, 1997.

(Continued)

*Primary Examiner*—Norman M. Wright
(74) *Attorney, Agent, or Firm*—Hamilton, Brook, Smith & Reynolds, P.C.

(57) ABSTRACT

System, methods and apparatus are applicable to enable owners and vendors of software to protect their intellectual property and other rights in that software. The system also enables vendors or distributors of software to charge per-use for an instance of software. The system produces a unique, unforgeable, tag for every vendor supplied instance (copy) of specific software. Each user device is equipped with a supervising program that ensures, by use of the tag and other information, that no software instance will be used on the device in a manner infringing on the vendor, distributor, or software owner's rights. When installing or using a vendor-supplied software instance, the supervising program verifies the associated tag and stores the tag. When installing or using untagged software, the supervising program fingerprints selected portions of the software and stores the fingerprints. Software is used on a user's device through the supervising program which ensures proper use of the software. A vendor can submit a copy of infringing software to a guardian center which fingerprints appropriate portions of the infringing software. A user device's (104) supervising program periodically calls up, or can be called up, by the guardian center. During call-up, the supervising program can securely sends to the guardian center information about the use of the software instances associated with tags and fingerprints. The guardian center detects unauthorized use of software by comparison of current call-up data with records of past call-ups involving the same tags, and/or by comparing call-up supplied fingerprints with fingerprints of infringing software stored by the guardian center. The guardian center completes the call-up by enabling continued use of properly used software instances and generating appropriate punitive actions upon detection of improperly used software instances on the calling user's device. The data supplied by a supervising program during call-up is also employed by the guardian center to prepare data on usage by a user's device of vendor or distributor supplied software instances, for pay-per-use or pay-per-view billing.

21 Claims, 18 Drawing Sheets

U.S. PATENT DOCUMENTS

| | | | |
|---|---|---|---|
| 3,996,449 | A | 12/1976 | Attanasio et al. |
| 4,458,315 | A | 7/1984 | Uchenick |
| 4,658,093 | A | 4/1987 | Hellman |
| 4,866,769 | A | 9/1989 | Karp |
| 5,023,907 | A | 6/1991 | Johnson et al. |
| 5,109,413 | A * | 4/1992 | Comerford et al. ............ 705/54 |
| 5,132,992 | A | 7/1992 | Yurt et al. |
| 5,375,206 | A * | 12/1994 | Hunter et al. ................ 717/176 |
| 5,483,658 | A | 1/1996 | Grube et al. |
| 5,598,470 | A * | 1/1997 | Cooper et al. .............. 713/165 |
| 5,606,663 | A | 2/1997 | Kadooka |
| 5,613,004 | A | 3/1997 | Cooperman et al. |
| 5,646,997 | A | 7/1997 | Barton |
| 5,719,941 | A | 2/1998 | Swift et al. |
| 5,724,425 | A | 3/1998 | Chang et al. |
| 5,745,569 | A | 4/1998 | Moskowitz et al. |
| 5,761,651 | A | 6/1998 | Hasebe et al. |
| 5,825,883 | A | 10/1998 | Archibald et al. |
| 5,892,900 | A | 4/1999 | Ginter et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,920,861 | A | 7/1999 | Hall et al. |
| 5,922,208 | A | 7/1999 | Demmers |
| 5,933,498 | A | 8/1999 | Schneck et al. |
| 5,943,422 | A | 8/1999 | Van Wie et al. |
| 6,052,780 | A | 4/2000 | Glover |
| 6,115,802 | A | 9/2000 | Tock et al. |
| 6,134,327 | A | 10/2000 | Van Oorschot |
| 6,170,058 | B1 | 1/2001 | Kausik |
| 6,170,060 | B1 | 1/2001 | Mott et al. |
| 6,240,184 | B1 | 5/2001 | Huynh et al. |
| 6,341,352 | B1 | 1/2002 | Child et al. |
| 6,691,229 | B1 | 2/2004 | Nelson |
| 6,697,948 | B1 | 2/2004 | Rabin et al. |
| 6,889,209 | B1 * | 5/2005 | Rabin et al. ................. 705/57 |
| 6,889,325 | B1 | 5/2005 | Sipman et al. |
| 6,920,436 | B1 * | 7/2005 | Stefik et al. ................. 705/51 |
| 6,963,859 | B1 * | 11/2005 | Stefik et al. ................. 705/51 |
| 2005/0010475 | A1 * | 1/2005 | Perkowski et al. ........... 705/14 |

OTHER PUBLICATIONS

Kaplan, Mark A., "IBM Cryptolopes™, Super Distribution and Digital Rights Management," http://www.research.ibm.com/peop...plan/cryptolope-docs/crypap,html, 7 pages (1996).

* cited by examiner

TAG TABLE

| 210 | | | | |
|---|---|---|---|---|
| HEADER_TAG_TABLE=(ID_TAG_TABLE, LAST_GC_CM, LAST_CALLUP_TIME, NUMBER_DEVICE_BOOTUPS) | | | | |
| TAGS | USAGE STATUS | ACTION TIME | RUN COUNT | USE TIME |
| TAG_INST_SW1 | CONTINUED | 11/22/98 11:02 | 10 | 00:58 |
| TAG_INST_SW2 | INSTALLED REMOVED | 11/24/98 21:36 11/26/98 09:31 | 3 | 00:11 |
| TAG_INST_SW3 | GC_DISABLED | 11/22/98 11:02 | 0 | 00:00 |
| TAG_INST_SW4 | CONTINUED | 11/25/98 14:17 | 4 | 10:34 |
| UNTAGGED_SW1 | UNTAGGED | 11/25/98 14:17 | 0 | 00:00 |

NOTE: ID_TAG_TABLE = (ID(USER)*, ID(DEVICE)*, ID(PP)*, ID(OS)*)

* MAY OR MAY NOT BE AVAILABLE

FIG. 6

INSTALLING UNTAGGED SOFTWARE (UNTAGGED_SW) ON USER DEVICE

USAGE SUPERVISION PROCESSING 320
(NUM_INST_SW, TAG_INST_SW, NAME_SW, HASH(SW), POLICY(TAG_INST_SW), POINTER TO SPARSE_SET(SW)) ---> CALLUP_RECORD1 ---> CALLUP_RECORD2 ---> CALLUP_RECORD3 ---> ...

321
CALLUP_RECORD-N = (CALLUP_TIME, HEADER_TAG_TABLE OF CALLING DEVICE, LAST_CALLUP_TIME FROM DEVICE, HASH(TAG_TABLE), ACTIONS)

GUARDIAN CENTER DATA

FIG. 10

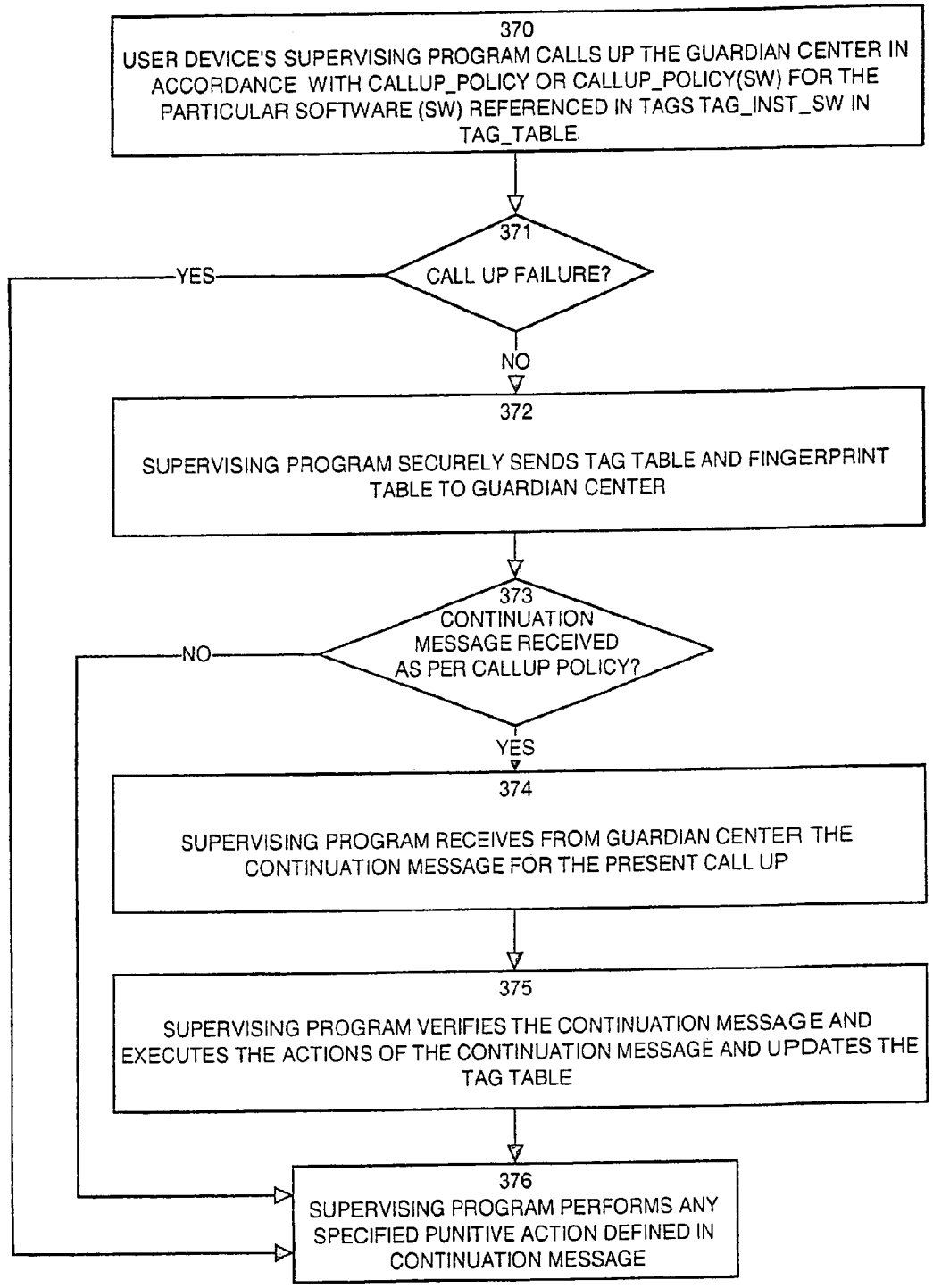
FIG. 12  CALL UP OF GUARDIAN CENTER FROM USER DEVICE

GUARDIAN CENTER CALLUP PROCESSING

GUARDIAN CENTER CALLUP PROCESSING

600

ID_TAG_TABLE, TAG_INST_SW,
TIME_OF_LAST_ACCESS, HASH(ID_TAG_TABLE,
TAG_INST_SW, TIME_OF_LAST_ACCESS)

DATA TRANSFERRED WITH SHARED SOFTWARE DATA

| TAG | ACCESS TIMES |
|---|---|
| TAG_INST_SW1 | FEBRUARY 2, 1999 09:11 AM, DECEMBER 2, 1999 07:24 AM, FEBRUARY 1, 1999 09:36 PM, FEBRUARY 2, 1999 011:17 AM... |
| TAG_INST_SW2 | JANUARY 5, 1999 10:19 PM, FEBRUARY 8, 1999 08:34 AM, FEBRUARY 5, 1999 01:33 PM... |
| TAG_INST_SW3 | JANUARY 12, 1999 06:41 AM |

601

SHARED SOFTWARE DATA SSD ACCESS TABLE

FIG. 14

METHODS AND APPARATUS FOR PROTECTING INFORMATION

RELATED APPLICATION

This application is a divisional of U.S. application No. 09/305,572, filed May 5, 1999 now U.S. Pat. No. 6,697,948. The entire teachings of the above application are incorporated herein by reference.

BACKGROUND OF THE INVENTION

Software or information piracy is the activity of using or making copies of software of information without the authorization of the creator or legitimate owner of that software or information. Piracy is most prevalent in the computer software application industry where people frequently make unlicensed illegal copies of a software application. The application may be copied for personal use or for re-production and commercial profit. Other types of piracy include acts of copying information such as musical recordings or an electronically readable version of documentation or an electronic book. In all cases, piracy costs billions of dollars of lost profits to business annually.

The software and information technology industries have responded to the threat of piracy through the use of locking schemes. Locking schemes can include software locking mechanisms, licenses and specialized hardware devices which prevent unauthorized use of software, information, or an entire electronic device. These schemes seek to prevent adversaries from being able to freely copy software.

There are many types of software locking mechanisms. For example, a manufacturer can encrypt portions of a software program with the unique key. A customer who purchases the software is given the key which allows decryption and execution of the software. An example of such a software protection mechanism is a "Certificate of Authenticity" supplied with the purchase of software programs such as Microsoft Windows 98, manufactured by the Microsoft Corporation of Redmond, Wash. Microsoft and Windows98 are trademarks of the Microsoft Corporation. The Certificate of Authenticity indicates a unique product number. During installation of the software, the product number is requested by the software application and must be entered correctly by the user. If the product number entered matches a number expected by the application, the copy of the application is assumed to be legitimate and is allowed to be installed and executed as normal. If the number entered is incorrect, the software will not install properly.

Hardware piracy protection schemes attach a device to the processor, typically through a communications port. These types of hardware devices are often called "dongles". An example of a hardware protection scheme is provided in U.S. Pat. No. 3,996,449 which discloses a method for determining if a program or a portion of a program is valid when running on a computer. In this system, a hash function is applied to a users identification code or key along with the text of the program itself in a special tamper-proof hardware checking device. The checking device compares a resulting value from the hash function with a verifier value to see if the program text is correct. If the text is correct, the program is allowed to execute on the device.

Another hardware related approach assigns a unique identifier to each processor that can execute programs. Software programs are then encoded with the identity of a designated processor identifier to which that program is assigned or authorized to execute. No other processor identifications are provided for the software and thus the software will not run on other processors. Obviously, such systems can provide usage limitations when attempting to execute software on a processor with which the software is not specifically associated. The number assignment mechanism may be supervised through the use of an authorization network which can associate a piece of software with a specific processor identification number.

Aside from the electronic hardware and computer software application and data protection mechanisms noted above, little has been done to thwart the piracy of other types of encoded information that is accessed by electronic devices, such as musical recordings.

SUMMARY OF THE INVENTION

Characteristics of Prior Art Systems

Prior art techniques for protecting the unauthorized use of software and information suffer from a variety of problems. Systems which use a certificate of authenicity or key suffer in that one key allows unlimited usage of the program and nothing prevents copying of the key. As such, the owner of a copy of the software can pass his key or certificate along with the software or information to someone else who can use the certificate or key to install and run the software or to access the information. If one key allows only a single usage or a one-time execution, the problem of copying may be solved but then each usage requires a separate key to be entered. To be commercially acceptable most programs require multiple uses.

Software locks are also easy to break on personal computers because the owner of the machine has unrestricted privileges and unlimited time to attempt to break locks.

Hardware protection solutions lack flexibility since the hardware designer needs to know the nature of the software to be protected in advance of the production of the hardware device. Furthermore, if different pieces of software using different hardware protection mechanisms are to be run, separate individual hardware devices must be provided. Costs associated with custom hardware production and the fact that consumers have found hardware protection schemes difficult to deal with, prevent widespread deployment of hardware protection mechanisms.

Hardware protection schemes thus limit the flexibility to move software from device to device. Users may not be able to buy software before buying their computational devices, because they do not know the identities of the devices at the time of purchase. Hardware manufacturers may cheat users by giving the same identifier to many machines. Finally, skilled hackers may be able to forge identities of hardware devices by reverse engineering techniques or change software so it fails to check the hardware identifier.

Characteristics of Embodiments of the Invention

The invention overcomes these and other problems. The invention provides methods and apparatus to enable owners or vendors or distributors, each of whom will be hereinafter referred to as a vendor, of software to protect their intellectual property and other rights in that software. Software is defined hereinafter in a broad sense to include such things as computer programs, text, data, databases, audio, video, images, or any other information capable of being represented digitally or as a signal, said software being accessed by or used by users on devices (hereinafter referred to as user devices or devices) such as computers or special purpose devices. The invention also enables vendors of software to charge on a pay per-use basis for an instance of software.

Specifically, the invention provides a system methods and apparatus for supervising usage of software on a user's device and for a monitoring regime that prevents a device from employing any instance of software in a manner not authorized by the legitimate vendor or owner of the rights to that software.

A vendor's rights in a particular software may be infringed upon in a number of ways, including but not limited to the following. A user may make copies of a vendor's software purchased by him and give them to other users who install the software on their devices, when this is not allowed under the first user's terms of purchase of the software. An organization purchases or rents a vendor's software and is allowed to make and use a specified number of copies of the software and then exceeds that specified number. A pirating vendor makes illegal copies of a legitimate vendor's software and sells these copies. A pirating vendor modifies a legitimate vendor's software, for example recompiling an application program or renaming and otherwise changing a song, and distributes and sells copies of the infringing software.

The invention achieves the above mentioned protection of legitimate vendor's rights in software and prevents any infringement of these rights by users, without resorting to encryption of instances or parts of instances of software and requiring the user to decrypt before access, without requiring special hardware devices or attachments ("dongels") or special processors, and without requiring manufacturers to build identifying numbers into hardware. Thus the disadvantages and weaknesses associated with these solutions are avoided in the present invention. Furthermore, the methods and apparatus of the invention do not enable denial of service, where an unscrupulous adversary attempts to use the protection mechanisms of the system to prevent a legitimate user from accessing software which this user is employing in accordance with the rightful vendor's specified regime.

Using this invention, a software vendor may have a specific piece of software, such as a specific application program or a specific book or song, which the vendor wishes to sell or lease, or otherwise distribute in a controlled manner, to users. Each particular copy of the software which is intended to be installed on or used on a user's device, is referred to as an instance of that software, or as a software instance. In general, software can be installed on, accessed by, or used on a user device, with each of these access modes referred to hereinafter as use or use of software. Thus, for example, use of an instance of software which is an application program includes, but is not limited to, installing that instance or reading it or copying it or executing it. And use of text includes, but is not limited to, installing the text on the device or reading the text by use of the device or copying portions of that text on or by use of the device.

Components and Steps of Specific Embodiments of the Invention

Specifically, the invention provides a system for supervising usage of software. The system includes a software vendor producing instances of software and a tag server accepting the instances of software. The tag server produces a plurality of tags, one per instance of software, and each tag uniquely identifies an instance of software with which it is associated. A user device receives and installs an instance of software and securely receives a tag uniquely associated with that instance of software. The user device includes a supervising program which detects attempts to use the instance of software and which verifies the authenticity of the tag associated with the instance of software before allowing use of the instance of software. The supervising program on the user device verifies the authenticity of the tag and maintains or stores the tag in a tag table and maintains or stores the instance of software, preferably on a storage device, if the tag is authentic. The supervising program rejects the instance of software if the tag associated with the software is not authentic.

A tag is preferably unique to an instance of software. The tags created by the authentication server include at least one of a name of an instance of software, a unique number of an instance of software, and/or a hash function value on portions of an instance of software. Preferably, the unique number of the instance of software is selected from a sparse set of numbers. In other embodiments, each tag further comprises a unique identifier of the supervising program. In yet another embodiment, each tag includes at least one fingerprint computed on portions of the instance of software associated with the tag.

To verify and determine if a tag is authentic, the supervising program can verify a hash function value in the tag or can verify a digital signature of the tag. In another embodiment, the supervising program verifies that the unique identifier of the supervising program in a tag is the same as an identifier of the supervising program on the user device. In the embodiment using fingerprinting, the supervising program verifies that the software instance associated with a tag satisfies a same-location fingerprint check against the at least one fingerprint included in the tag associated with the instance of software. The same-location fingerprint check may be performed by the supervising program at at least one time of before, during, and after use of the instance of software.

In embodiments that use fingerprinting, each tag further includes at least one list of locations containing values from which the at least one fingerprint is computed and the supervising program verifies that the software instance associated with each tag satisfies a same-location fingerprint check against the at least one fingerprint associated with the software at locations specified in the at least one list of locations. Alternatively, general location fingerprinting may be used. (In same-location fingerprinting, two sequence of fingerprints on a common sequence of locations match if the first fingerprint from the first sequence matches the first fingerprint from the second sequence, the second fingerprint from the first sequence matches the second fingerprint from the second sequence, and so on. In general-location fingerprinting, two sequences of fingerprints match if each fingerprint in the first sequence matches some fingerprint in the second sequence and each fingerprint in the second sequence matches some fingerprint in the first sequence.) Since the tag is separate from the instance of software, the invention provides protection for software without the need to modify the software.

According to another aspect of the invention, whenever any data file is accessed by an instance of software, information associated with an instance of software performing the access is stored in a location associated with the data file. The information associated with the instance of software may be the tag associated with the instance of software as well as the time of modification performed by the instance of software. Preferably, the information associated with the instance of software performing the access is written to a secure location which the supervising program alone can access. Essentially, this aspect of the invention is used to track piracy of software that uses shared software data.

In this case, when an instance of the software attempts to access a data file (i.e., shared software data) having associated information stored in the location associated with that data file, the supervising program tests whether the associated information stored is information associated with the instance of software currently attempting access. If so, the supervising program determines whether that instance was a pirated copy. To do so, the supervising program according to one aspect can use an unaliasable hash function to verify the associated information stored in the location associated with the data file for which access is currently being attempted. In addition, the supervising program can use the time of the last modification. The idea is to see whether this data file was written by a software instance having a tag of the software instance on this device and if so whether the software instance on this device in fact wrote that data file at the time of the last modification. If not, at least two software instances having the same tag are in circulation and piracy has taken place.

Another embodiment of the invention includes a guardian center having a tagged software database and a verification program. The guardian center periodically communicates with the user device via a call-up procedure to receive tags from the user device. The tags are associated with instances of tagged software used on the user device. The verification program examines each tag received from the user device against the tagged software database to ensure that the tags are in compliance with at least one usage supervision policy. Preferably, the usage supervision policy is associated with at least one individual instance of software with which at least one tag is associated. The verification program returns a continuation message to the user device. The continuation message indicates for the instance of software associated with each tag on the user device an action to follow. The supervising program on the user device receives and verifies the continuation message for authenticity and if authentic, performs the action to follow indicated in the continuation message. In this manner, the guardian center can ultimately determine access to software on user devices, by controlling tag usage status.

Preferably, all messages between the guardian center and the user device are sent in a secure fashion and the secure fashion involves public key encryption.

According to another aspect of the invention, at least one of the software vendor, the tag server, and the guardian center are combined with another of the at least one of the software vendor, the tag server and the guardian center.

According to another aspect of the invention, when the supervising program on a user device communicates with the guardian center, the process is called a call-up. The maximum allowed time interval between successive call-up procedures is preferably determined by at least one of a combination of the time elapsed in the user device, a number and duration of uses of instances of software, a number of times the user device is powered on, and a measure of use of the user device. When a user device fails to perform a call-up procedure with the guardian center before the end of a maximum allowed interval since the last call-up procedure, the user device is disabled for a period of time or usage of certain instances of software is denied for a period of time. Preferably, a call-up occurs when an instance of software is used (i.e., accessed, installed, or otherwise detected) a first time on a user device. Alternatively, a call-up may occur due to an request from the guardian center.

According to one aspect of the invention, during a call-up, the supervising program tests the authenticity of the continuation message by verifying that a hash function value of a tag table in the continuation message is the same as a hash function value of a tag table sent in a call-up message from the user device. Verifying a digital signature in the continuation message may also be used.

When a user device that receives no continuation message following a call-up message to the guardian center, the user device can resend a call-up message with a cancellation command for a previous call-up message. This aspect allows the user device to attempt call-up again.

In the guardian center, the usage supervision policy may be associated with the entire user device with which the guardian center communicates during the call-up procedure, or the usage supervision policy is associated with an individual user of the user device with which the guardian center communicates during the call-up procedure, or usage supervision policy is associated with a usage supervision history of the user device with which the guardian center communicates during the call-up procedure.

According to another aspect of the invention, the guardian center maintains a tag data structure in the tagged software database for each tag associated with each instance of software on each user device. Each tag data structure includes a tag of an instance of software, a usage supervision policy associated with the instance of software, and a collection of references to call-up records. Each call-up record in the collection of call-up records represents information concerning one call-up procedure. The continuation message associated with the call-up procedure includes at least one of a call-up time, a header of a tag table transferred to the guardian center during the call-up procedure, a last call-up time indicating a time stamp of a former call-up procedure, a hash function value of the tag table transferred to the guardian center during the call-up procedure, and actions to follow on the user device. The reason for keeping previous call-up records is to enable the guardian center to ensure that only one device has a given header of a tag table. Otherwise it would be possible for different physical devices to share the same software instances in violation of usage supervision policies.

In an alternative or combined implementation of the guardian center, the guardian center includes a verification program. According to this aspect, the guardian center periodically communicates with the user device via a call-up procedure to receive a unique identifier for the user device's supervising program from the user device. The verification program examines the unique identifier to ensure that at most one supervising program has that identifier, and the verification program returns a continuation message to the user device. The continuation message indicates an action to follow upon attempted use of the instances of software associated with each tag on the user device. The user device's supervising program verifies the continuation message for authenticity and if authentic, performs the action in the continuation message.

According to this embodiment of the guardian center, the supervising program identifier is generated a first time that the supervising program is invoked, based on a rarely duplicated number. Preferably, the rarely duplicated number is a very precise clock value occurring when the supervising program is first invoked in the machine. Alternatively, the rarely duplicated number is provided by a guardian center. Alternatively or in combination, the number may depend on the values of some memory locations.

According to another system of the invention, the system also includes an untagged instance of software used on the user device. In this system, the supervising program detects the use of the untagged instance of software and performs a fingerprinting process on the untagged instance of software and stores fingerprints resulting from the fingerprinting process on the user device. The user device's supervising program further performs a fingerprinting process on a tagged instance of software used on the device and stores the fingerprints resulting from the fingerprinting process in a fingerprint table on the user device. The supervising program stores locations from which the fingerprints are computed. The fingerprints may be based on contents of the instance of software. Alternatively, the fingerprints are based on known sequences of behavior of the instance of software.

According to an embodiment of the guardian center in this system, the guardian center includes a fingerprint data structure and a verification program. The guardian center periodically communicates with the user device via a call-up procedure to receive all fingerprints from the user device for an instance of software used on the user device. The verification program compares every fingerprint received from the user device against the fingerprint data structure to determine if an instance of software used on the user device is an infringing instance of software. If the verification program detects more than a specified number of matches between fingerprints in the guardian center's fingerprint data structure and fingerprints received from the user device, the verification program specifies a punitive action to be performed, and the verification program returns a continuation message to the user device. The continuation message indicates the punitive action to be performed on the user device.

The software vendor transmits a copy of an infringing instance of software to the guardian center and the guardian center computes fingerprints on the copy of the infringing instance of software and incorporates and stores the fingerprints into the fingerprint data structure on the guardian center.

According to one aspect of this system, the fingerprint matching process is general location fingerprint matching. For speed, the fingerprint matching uses an inverted guardian center fingerprint table.

The punitive action can specify that the user device be disabled for a specified length of time, or can specify that the instance of software associated with the fingerprint that was matched to a fingerprint in the fingerprint data structure of the guardian center should be disabled for a specified length of time. The punitive action depends on at least one of a combination of the history of the behavior of the user device, the history of the behavior of a particular user on the user device, and the collection of software present on the user device.

Another embodiment of the invention provides a tag table data structure encoded on a user device's readable medium, such as a computer readable medium. The tag table data structure includes at least one tag that is uniquely associated with one instance of software and includes at least one field associated with the tag in the tag table, and includes at least one field indicating a usage status associated with the tag associated with the instance of software. The at least one field may also indicate use statistics for the one instance of software associated with the tag. The tag table may also include a tag table header that uniquely identifies the tag table. The tag table header can includes information concerning user device use statistics and can include a continuation message as well. The tag table is used to store information concerning the ability of instances of software to be used on user devices.

Apparatus and methods of the invention includes a software vendor comprising a software production mechanism creating instances of software each having at least one of a name and software content. Each instance of software is usable only in conjunction with a tag that is unique to that instance of software. The tag is preferably a unique unforgeable collection of information concerning the instance of software with which the tag is associated and includes at least one of the name of the software, a unique number of the instance of software and hash function value on portions of content of the software, an identifier of the supervising program associated with a user device upon which the instance of software is to be used, or a list of fingerprints of portions of the instance the software with which the tag is associated.

According to certain embodiments of the invention, the software vendor may include an infringing software detection mechanism that detects software that is infringing on the vendor's rights and that transfers a copy of the infringing software to a guardian center so that usage supervision can be implemented to detect attempted use of an instance of the infringing software on a user device.

According to another aspect of this embodiment, the guardian center can invalidate any tag associated with an instance of the infringing software and can send a punitive action to any user device detected by the guardian center to have used the instance of infringing software.

Another embodiment of the invention is a user device that includes an input port that receives an instance of software and receives a tag uniquely associated with that instance of software and also receives a request to use the instance of software. A processor included in the user device executes a supervising program. The supervising program detects the request to use the instance of software and verifies the authenticity of the tag associated with the instance of software before allowing use of the instance of software by the user device. The supervising program also verifies the authenticity of the tag and stores the tag in a tag table and maintains the instance of software if the tag is authentic and rejects the instance of software if the tag associated with the software is not authentic.

According to one aspect of the user device, the supervising program computes a hash function value on the instance of software and compares the computer value with a hash function value in the tag to determine whether the tag is authentic and is properly associated with the instance of software. The tag is preferably digitally signed and the supervising program verifies the authenticity of the tag by verifying a digital signature of the tag.

Within the user device, the tag table is a data structure stored in storage on the user device and contains at least one tag that is uniquely associated with an instance of software and includes at least one field associated with the tag in the tag table, the at least one field indicating a usage status for the instance of software associated with the tag. The supervising program periodically or otherwise determines that a call-up procedure is required as defined by a call-up policy and the supervising program performs the call-up procedure to update the usage status of tags stored in the tag table.

The supervising program can also verify that each data file used by tagged software is produced by a legitimate instance of software.

During performance of the call-up procedure, the supervising program securely transmits the tag table from the user device via an interconnection mechanism coupled to the user device and awaits reception of a continuation message returned to the user device, the continuation message indicating actions to be performed for each tag in the tag table. Also during the performance of the call-up procedure, the supervising program securely transmits a tag table header from the user device via an interconnection mechanism coupled to the user device and awaits reception of a continuation message returned to the user device that indicates an action to be performed for each tag in the tag table.

Another embodiment of the invention allows control over the use of untagged software. A user device according to this embodiment includes an untagged instance of software used on the user device. The supervising program detects the untagged instance of software and performs a fingerprinting process on the untagged instance of software and stores fingerprints resulting from the fingerprinting process in a fingerprint table on the user device. The supervising program periodically or otherwise determines that a call-up procedure is required as defined by a call-up policy and the supervising program performs the call-up procedure to update the usage status of untagged instances of software stored on the user device. Thus, the control of untagged software may take place regardless of the existence or the control of tagged software.

When performing the call-up procedure, the supervising program transmits a portion of the fingerprint table from the user device via an interconnection mechanism coupled to the user device and awaits reception of a continuation message returned to the user device that indicates actions to be performed for each untagged instance of software stored on the user device.

According to another embodiment of the invention, a guardian center is provided that comprises a tagged software database and a verification program executing on a processor in the guardian center. The guardian center periodically executes a call-up procedure to receive, via an interconnection mechanism, tags for instances of software. The verification program examines each tag received against the tagged software database maintained on the guardian center to ensure that the tags are in compliance with at least one usage supervision policy. The verification program transmits a continuation message via the interconnection mechanism indicating actions to follow upon attempted use of the instances of software associated with each tag received by the guardian center during the call-up procedure.

According to aspects of this embodiment, the usage supervision policy may be associated with each instance of software with which at least one tag is associated. Also, the usage supervision policy may be associated with a user device with which the guardian center communicates to receive tags. The usage supervision policy may also be associated with an individual user of the user device with which the guardian center communicates to receive tags.

The guardian center maintains a tag data structure in the tagged software database for each tag associated with each instance of software on each user device and receives newly created tags associated with instances of software from a tag server and further receives tags associated with instances of software used on a user device in a tag table transmitted from the user device. Each tag data structure includes at least one of a tag of an instance of software, a name of the instance of software, a unique number of the instance of software, a hash function value on the instance of software, a usage supervision policy associated with the instance of software, and a collection of references to call-up records associated with the tag associated with the said instance of software.

Each call-up record in the collection of call-up records represents information concerning one call-up procedure and includes at least one of a call-up time, a header of a tag table transferred to the guardian center during the call-up procedure, a last call-up time indicating a time stamp of a former call-up procedure, a hash function value of the tag table transferred to the guardian center during the call-up procedure, and the action to follow on the user device contained in the continuation message associated with the call-up procedure.

A variation of the guardian center according to this invention includes a fingerprint data structure and a processor executing a verification program. The verification program periodically executes a call-up procedure with a user device to receive, via an interconnection mechanism, fingerprints for instances of software used on the user device. The verification program examines each fingerprint received against the fingerprint data structure to determine if an untagged instance of software used on a user device is an infringing instance of software, and if so, the verification program prepares a punitive action to be executed on the user device.

In one embodiment, all vendor software is fingerprinted and infringements of one vendor's software upon another vendor's software are detected based on general location fingerprint checking. If the verification program detects a sufficient number of matches between a fingerprint in the fingerprint data structure and a fingerprint within the fingerprints received, the verification program specifies punitive action to be performed, and the verification program transmits a continuation message, the continuation message indicating a punitive action to be performed on a receiver of the continuation message. The sufficient number of matches may be equal to one, or greater than one, or may be computed as a weighted sum of matches where the weight of each match depends on a fingerprint that matches According to other aspects of this embodiment, punitive action can specify disablement of the receiver, or that the instance of software associated with the fingerprint that was matched to a fingerprint in the fingerprint data structure should be disabled.

In another variation, in the guardian center, the verification program receives, via the interconnection mechanism, a copy of an infringing instance of software and computes fingerprints on the copy of the untagged infringing instance of software and incorporates and stores the fingerprints in the fingerprint data structure.

Embodiments of the invention also encompass a tag server that accents a copy of specific vendor software and produces a plurality of tags, one tag per instance of the software, with each tag uniquely identifying an instance of software with which it is associated. Each tag preferably comprises at least one of the name of the software associated with the tag, a unique number of the instance of software associated with the tag, and hash function values computed on portions of the instance of software associated with the tag. A digital signature mechanism may be used to digitally sign the tags and to securely transmit the tags to an intended receiver, such as a user device or guardian center or to the software vendor.

Methods encompassed by the invention include a method for supervising usage of software. The method includes the steps of creating an instance of software and creating a tag that is uniquely associated with the instance of software. The method then distributes the instance of software and securely distributes the tag to a user device and receives the instance of software and the associated tag at the user device. The method then detects an attempt to use the instance of the software on the user device and determines if the attempt to use the instance of the software is allowable by determining a status of the tag that is associated with the instance of software to be used.

In the method, tag creation includes steps of assigning a unique number to the instance of software and computing a first hash function value on portions of the content of the instance of software. Then computing a second hash function value for the instance of software, the second hash function value combining the name of the software, the unique number of the instance of software, and the first hash function value. Next, the method includes the step of computing a tag that is uniquely associated with the instance of software, the tag including the name of the software, the unique number of the instance of software and the second hash value.

The step of computing a tag may create a digitally signed tag by applying a digital signature function to the second hash function value to produce a signature and including the signature in the tag.

The step of distributing the tag to a user device may include the step of securely distributing the tag to a software vendor and user device using a public key encryption technique.

The step of receiving the instance of software can include the step of obtaining the instance of software at the user device. And the step of receiving the tag at a user device can include the steps of securely obtaining the tag associated with the instance of software at the user device and determining if the tag associated with the instance of software is signed, and if so, verifying a signature on a hash function value in the tag and if the signature on the hash function value is verified, installing the software on the user device, and if the tag associated with the instance of software is not signed, installing the instance of software on the user device.

The step of detecting an attempt to use the instance of the software on the user device can include the steps of invoking a supervising program on the user device to intercept a user request for use of the instance of software. The step of determining if the attempt to use the instance of the software is allowable can also include the steps of determining if a call-up procedure is needed based on a call-up policy and if so performing a call-up procedure to verify the authenticity and to determine the usage supervision policy of the tag associated with the instance of software. Also included are the steps of updating tag information in the user device based upon an outcome of the call-up procedure an examining status information associated with the tag to determine if use of the instance of software associated with the tag is allowed.

The step of performing a call-up procedure includes the step of transmitting a tag table storing the tag associated with the instance of software from the user device and awaiting reception of a continuation message returned to the user device that indicates an action to be performed for each tag in the tag table. The user device may continue processing local requests for execution while waiting for the continuation message.

The method embodiments can also including the step of verifying that the continuation message is directed towards a specific device and that the event history corresponds to the event history at this device.

In the method embodiments, the step of performing a call-up procedure can include the steps of receiving a tag table including the tag associated with the instance of software and examining each tag received in the tag table against a tagged software database to ensure that tags in the tag table are in compliance with at least one usage supervision policy. Also included is the step of transmitting a continuation message indicating an action to follow at the user device upon detecting an attempted use of the instances of software associated with each tag.

In the method embodiments, the continuation message can include a supervising program identifier of the supervising program to which the continuation message is to be sent, as well as the time when the continuation message was prepared, as well as an encoding of the tag table header that accompanied the call-up from the device.

A method for supervising use of software is also provided as part of the invention and includes the steps of detecting use of an untagged instance of software on a user device and then creating and storing fingerprints associated with the untagged instance of software on the user device. The method continues by detecting an attempt to use the untagged instance of the software on the user device and determining if the attempt to use the instance of the software is valid by comparing the fingerprints associated with the untagged instance of software with a fingerprint data structure of infringing fingerprints and disabling use of the untagged instance of software if a fingerprint match is found.

The above method can also include the steps of detecting use of a tagged instance of software on a user device and creating and storing fingerprints associated with the tagged instance of software on the user device. The step of detecting an attempt to use the tagged instance of the software on the user device is also included, as is the step of determining if the attempt to use the instance of the software is valid by comparing the fingerprints associated with the tagged instance of software with a fingerprint data structure of infringing fingerprints and disabling use of the tagged instance of software if a fingerprint match is found.

The method may be supplemented by the steps of detecting, by a software vendor, an instance of infringing software and submitting a copy of the instance of infringing software to a guardian center. Also included are the steps of computing fingerprints at the guardian center on the infringing instance of software and incorporating and storing the fingerprints in a fingerprint data structure. This supplemental method may also be an alternative embodiment on its own regardless of the existence of tagged software.

Another embodiment of the invention includes a method for uniquely identifying instances of software comprising the steps of obtaining an instance of software, assigning a name to the instance of software, and assigning a unique number to the instance of software. The unique number can be different from any unique number assigned to another instance of the same software. This method also includes the steps of computing a hash function value on portions of the instance of software and computing a second hash function value on a concatenation of the name of the instance software, the number of the instance software, and the first computed hash function value to produce an unsigned hash function value unique to that instance of software. The method continues with the steps of signing the unsigned hash function value using a key to produce a signed hash function value for the instance of software and creating a tag associated with the instance of software that uniquely identifies that instance of software, the tag including the signed hash value of the instance of software, the name of the instance of software, the unique number of the instance of software, and the unsigned hash value of the instance software.

According to this embodiment, the steps of obtaining the instance of software and assigning a name to the software are performed by a software vendor and the steps of assigning a unique number to the instance of software, computing the first and second hash function values, signing the second hash value, and creating the tag are performed by a tag server.

The invention also includes embodiments related to a computer readable medium encoded with instructions that when read and executed on a processor perform the steps of detecting a request to use an instance of software and determining if a tag corresponding to the instance of software has an associated status that allows the instance of software to be used and periodically performing a call-up procedure to validate the authenticity of the tag and to ensure that the instance of software corresponding to the tag is used in accordance with an usage supervision policy.

The invention also includes embodiments directed to a propagated signal transmitted via a carrier over a communications medium. One such signal carries an encoded tag table data structure which includes at least one tag that is uniquely associated with one instance of software and includes at least one field associated with the tag in the tag table, the at least one field indicating a use control status for the one instance of software associated with the tag.

Another such signal carries an encoded continuation message, the continuation message containing an indication of actions to be performed at a receiver of the propagated signal when an attempt to use an instance of software associated with the actions is detected at the receiver.

Another method is provided by the invention for ensuring that a software program hasn't been altered. This method embodiment includes the steps of computing an unaliasable hash function value on the contents of the software program and comparing the result of the unaliasable hash function with a result of a previously held hash value to determine if the results are the same, thus indicating if a software program has been altered. In one version of this method, the operating system computes the unaliasable hash function value and the software program is the supervising program.

Also provided by the invention is a method for ensuring that data has not been altered by means of computing an unaliasable hash function value on the contents of that data and comparing the said value with a previously computed hash function value. The supervising program preferably computes the unaliasable hash function value and the data used by the supervising program in this method.

General Summary of Operation of Above Embodiments of the Invention

Before the detailed description of the embodiments noted above are given, the following summary of the general high-level operation of various embodiments of the invention is provided to aid the reader in understanding certain complexities in portions of the invention's embodiments.

As noted in the above described embodiments, each instance of vendor's specific software is accompanied by a unique unforgeable tag. All software instances of the same specific software, however, are identical and un-encrypted, each consisting of a copy of the specific software and, possibly, including the name of the software. For example, an instance of the specific application program software Spread will include the program code for a spreadsheet application as well as the name "Spread." Since no specialized hardware devices are required for the invention, instances or arbitrary kinds of software can be used together on a common device or on different devices.

A software vendor produces instances (copies) of some specific software and sending one instance of that software to a tag server, together with a request for a certain number of tags for instances of that software. The tag server produces the requested number of different unique tags. Each unique tag will be associated by the vendor with one instance of the software and will serve to uniquely identify the instance of software with which it is associated. A user device receives and attempts to use an instance of the vendor's software and securely receives the tag uniquely associated with that instance of software.

The user device includes the supervising program running on that device, which verifies the authenticity of the associated tag and stores the tag in a tag table and stores the instance of software on a storage device or allows use of the software instance, only if the tag is authentic. The supervising program rejects an instance of software if the tag associated with the instance is not authentic. Every tag in the tag table has a status such as "usable" or "removed" or "pay-per-use", associated with it by the supervising program. The supervising program detects commands to the device to use the said instance of software and verifies that the status currently associated with the tag associated with that instance of software, permits use of that instance.

Securely sending or receiving data or an object containing data means that the data or the object are sent or received in a manner that does not allow the data or the data contained in the object to be altered by or revealed to anyone other than the authorized sender or receiver. For example, a tag may be securely sent from a vendor to a user device over a network by use of the TETS ISPEC or NETSCAPE SSL or any other protocol for secure communication, or the tag may be handed over by the vendor to the user on a diskette placed in a tamper-proof sealed envelope. Secure communication is employed in the invention just to protect sensitive information from being divulged to eavesdroppers and is not part of the invention's protection mechanisms proper. Any standard protocol for secure communication between parties will serve this purpose.

As noted in the embodiments above, the tag created by the tag server for an instance of vendor software includes the name of that software, a unique identifying number for that instance of software, hereinafter referred to as the instance number, a hash function value on some portions of the instance of software, and a hash function value combining all the previous data. The instance numbers employed in the present invention can be integers or any sequences of any symbols, the said sequences serving as unique identifiers. Optionally, the tag server may digitally sign the last mentioned hash function value, and include the signature in the tag.

Tags which include a signature will hereinafter be referred to as signed tags. Tags which do not include a signature will be referred to as unsigned tags. When preparing an unsigned tag for an instance INST_SW of software SW, the tag server selects the unique identifying number for the instance from a secret sparse set of numbers, hereinafter referred to as the secret sparse set, associated with the software SW. Numbers in the secret sparse set may, for example, be produced by a physical process.

To determine whether a tag associated with an instance INST of software is authentic, the supervising program of the device on which INST is to be installed or used, extracts the instance number NUM_INST of INST and the name NAME_SW of SW from the tag. The supervising program computes a hash function value on some specified portions of the contents of the software instance INST. The supervising program then computes a hash function value combining the instance number NUM_INST, the name NAME_SW, and the previously computed hash function value. The supervising program compares the hash function values it computed with hash function values found in the tag. It must also verify any digital signature which is a component of a signed tag. The authenticity of an unsigned tag is further checked by the supervising program before allowing the first or some subsequent use of the associated instance of software by securely sending the tag to the tag server or to a guardian center described next, for authentication of the tag.

As indicated above, the system also includes a guardian center which includes a tagged software database and a verification program. The guardian center periodically communicates with the user device via a call-up procedure to receive all tags from the user device for each instance of software installed on the user device. The verification program examines each tag received from the user device against the tagged software database to ensure that the tags are in compliance with at least one usage supervision policy. The verification program returns a continuation message to the user device which indicates an action to follow upon attempted access to the instances of software associated with each tag on the user device.

The usage supervision policy can be associated with individual instances of software to which at least one tag is associated, or can be associated with the entire user device with which the guardian center communicates, or can be associated with an individual user of the user device with which the guardian center communicates.

The guardian center maintains a tag data structure in the tagged software database for each tag for each instance of software on each user device. Each tag data structure can include a tag of an instance of software, a name of the instance of software, a unique number of the instance of software, a hash value on the instance of software, a policy associated with the instance of software, and a series of call-up records associated with the instance of software. Each call-up record in the series of call-up records represents information concerning one call-up procedure and includes a call-up time, a header of a tag table transferred to the guardian center during the call-up procedure, the last call-up time indicating a time stamp of a former call-up procedure, a hash of the tag table transferred to the guardian center during the call-up procedure, and the action to follow on the user device contained in the continuation message associated with the call-up procedure. Using these mechanisms, the guardian center can track usage statistics of instance of software for such activities as paying per use of an instance.

According to another aspect of the invention, an untagged instance of software may be installed on the user device. The protection program detects the untagged instance of software and performs a fingerprint process on the untagged instance of software and stores fingerprints resulting from the fingerprint process in a fingerprint table on the user device. The guardian center, according to this aspect, includes a fingerprint database. The guardian center periodically communicates with the user device via a call-up procedure to receive all fingerprints from the user device for each untagged instance of software installed on the user device. The verification program examines each software received from the user device against the fingerprint database to determine if an untagged instance of software is an infringing instance of software. In this manner, the invention can detect the use of modified software that is an illegal copy.

If the verification program detects a match between a fingerprint in the fingerprint database and a fingerprint within all fingerprints received from the user device, the verification program specifies punitive action to be performed, and the verification program returns a continuation message to the user device. In this case, the continuation message indicates the punitive action to be performed on the user device. As such, a user device can be disabled, for example, if caught using untagged infringing software.

Alternatively, the punitive action may specify that the untagged instance of software associated with the fingerprint that was matched to a fingerprint in the fingerprint database should be disabled.

To obtain fingerprints at the guardian center, the software vendor transmits a copy of an untagged infringing instance of software to the guardian center and the guardian center computes fingerprints on the copy of the untagged infringing instance of software and stores the fingerprints in the fingerprint database.

Another embodiment of the invention provides a tag table data structure encoded on a computer readable medium. The tag table data structure includes at least one tag that is uniquely identified with one instance of software and includes at least one field associated with the tag in the tag table. The field indicates a usage supervision status for the one instance of software identified with the tag and may also indicate use statistics for the one instance of software identified with the tag. The tag table data structure may also include a tag table header that uniquely identifies the tag table and that uniquely associates the tag table with one user device. The tag table header includes information concerning user device use statistics and includes a continuation message. The continuation message indicates punitive action and usage supervision status for an instance of software associated with a tag.

A software vendor is provided as an aspect of the invention and includes a software development mechanism that creates instances of software having a name and having software content. Each instance of software is executable only in conjunction with a tag that is unique to that instance of software. The tag is a unique unforgeable collection of information concerning the instance of software to which the tag is associated and includes the name of the software, a unique number of the instance of software and a hash of the content of the software. The software vendor also includes an infringing software detection mechanism that detects an infringing instance of software that is infringing intellectual property rights. The software vendor transfers the infringing instance of software to a guardian center so that usage supervision can be implemented to detect attempted uses of the infringing instance of software.

In an alternative embodiment of this invention, a software vendor is provided which produces at least one instance of software incorporating a device identifier inside a test. The test will be an "if statement" in a typical programming language. The test comprises the comparison of the incorporated identifier with the identifier of the device upon which the software instance is to be used. If the incorporated identifier equals the device identifier then the software instance can be used normally, otherwise punitive action is taken by the supervising program on the device. For added protection, a digital signature of the hash of the software instance (including the incorporated identifier) is sent, a second test determines whether the digital signature is authentic, and a third test determines whether the signed value is the same as the hash of the software instance. If not, punitive action is taken by the supervising program in the device.

As noted above in the embodiment construction section, a user device is provided and includes an input that receives an instance of software and securely receives a tag uniquely associated with the instance of software and receives an attempt from a user of the user device to access the instance of software. A processor in the user device executes a protection program. The protection program detects the attempt to access the instance of software and verifies the authenticity of the tag associated with the instance of software before allowing access to the instance of software by the user of the user device. The protection program determines that a call-up procedure is required as defined by a call-up policy and the protection program performs the call-up procedure to update the status of tags stored in the tag table. During the call-up procedure, the protection program securely transmits the tag table from the user device via an interconnection mechanism coupled to the user device and awaits reception of a continuation message returned to the user device that indicates an action to be performed for each tag in the tag table. In this manner, the user device does not need to be concerned with setting an usage supervision policy, but rather, merely maintains a policy that is centralized to all devices.

For untagged instances of software installed on the user device, the protection program detects the untagged instance of software and performs a fingerprint process on the untagged instance of software and stores fingerprints resulting from the fingerprint process in a fingerprint table on the user device. For untagged software, during the call-up procedure, the protection program transmits the fingerprint table from the user device via an interconnection mechanism coupled to the user device and awaits reception of a continuation message returned to the user device that indicates an action to be performed for each untagged instance of software stored on the user device.

For untagged software, the verification program in the guardian center periodically executes a call-up procedure to receive, via an interconnection mechanism, fingerprints for untagged instances of software. The verification program examines each fingerprint received against the fingerprint database to determine if an untagged instance of software is an infringing instance of software, and if so, the verification program prepares punitive action for the user device. If the verification program detects a match between a fingerprint in the fingerprint database and a fingerprint within the fingerprints received, the verification program specifies punitive action to be performed, and the verification program transmits a continuation message to the user device. The continuation message indicates the punitive action to be performed on a receiving user device of the continuation message.

Another embodiment of the invention provides an authentication server that accepts instances of software and produces a plurality of tags, one tag per instance of software. Each tag uniquely identifies the instance of software to which it is associated and each tag includes encoded information concerning the name of the instance of software associated with the tag, a unique number of the instance of software associated with the tag, and a hash value computed on the instance of software associated with the tag.

In the method for controlling access to software, a step of creating an instance of software is performed. A tag is then created that is uniquely associated with the instance of software. The instance of software and the tag are then distributed to a user device. The method then detects an attempt to access the instance of the software on the user device and determines if the attempt to access the instance of the software is valid by determining a status of the tag that is associated with the instance of software to be accessed.

To create the tags, the method assigns a unique number to the instance of software and computes a first hash value on the content of the instance of software. A second hash value is computed for the instance of software. The second hash value includes a name of the software, the unique number of the instance of software, the content of the instance of software, and the first hash value. Finally, the method computes a tag that is uniquely associated with the instance of software. The tag includes the name of the software, the unique number of the instance of software and the second hash value.

The step of computing a tag can create a digitally signed tag by applying a digital key signature function of the second hash value to produce a signature hash value and including the signature hash value in the tag. This allows secure distribution of the tag. A public key encryption technique can be used to securely distributing the tag to a software vendor and user device.

The software may be distributed by obtaining the instance of software at the user device and securely obtaining the tag associated with the instance of software at the user device. The user device can determine if the tag associated with the instance of software is signed, and if so, can verify a signature hash value in the tag and if the signature hash value is verified, the user device can install the software.

To detect an attempt to access the instance of the software on the user device the method of the invention includes the steps of invoking a protection program on the user device to intercept a user request for access to the instance of software. To determine if the attempt to access the instance of the software is valid, the method determines if a call-up procedure is needed based on a call-up policy. The method performs a call-up procedure to verify the authenticity and to determine the use policy of the tag associated with the instance of software and updates tag information in the user device based upon an outcome of the call-up procedure. Status information associated with the tag is examined at the user device to determine if access to the instance of software associated with the tag is valid. In this manner, protection to software is provided.

During the call-up procedure, a tag table storing the tag associated with the instance of software is transmitted from the user device and the user device awaits reception of a continuous message returned to the user device that indicates an action to be performed for each tag in the tag table.

The guardian center receives the tag table including the tag associated with the instance of software and examines each tag received in the tag table against a tagged software database to ensure that tags in the tag table are in compliance with at least one usage supervision policy. The guardian center transmits a continuation message indicating an action to follow at the user device upon detecting an attempted access to the instances of software associated with each tag.

Other embodiments of the invention include a computer readable medium encoded with instructions for the above processes, as well as a propagated signal transmitted via a carrier over a medium which carries an encoded tag table data structure as described above.

Using these mechanisms, the system of the invention allows a rightful vendor/owner of the rights in an instance of software to police those rights. If the vendor discovers that the vendor rights are being infringed, such as by discovering a bootleg, stolen, reverse engineered, modified or disassembled instance of software which essentially identical in operation to the vendor produced software, the system can police the use of these illegal copies of software.

The system of the invention at the same time protects a rightful user of software from denial of service by dishonest parties who attempt to create a false impression of illegal use of software by the rightful user/owner.

The invention also allows pay-per-use statistics to be tracked at each user device for software which is purchased on a per use basis. During the call-up procedure, the guardian center can determine the use statistics for a pay-per-use instances of software and can provide the use information back to the software vendor for billing purposes.

As indicated above, the system includes a guardian center that includes a tagged software database and a verification program. Every user device must periodically communicate with the guardian center via a call-up procedure and securely send, for each instance of vendor software installed on that user device, or used on the device since the last preceding call-up procedure, the tag associated with that instance. Additional data from the tag table, up to and including the complete tag table, may also be securely sent by the supervising program to the guardian center during a call-up procedure. The call-up procedure may be initiated by either the guardian center or the user device. The guardian center's verification program authenticates each tag it received from the user device.

Essentially, the verification program examines each tag and its associated data received from the user device against the tagged software database to authenticate it and to ensure that the tag is in compliance with at least one usage supervision policy applying to the software instance with which the tag is associated. For example, the verification program may check whether a tag received during a call-up was, at any time since the previous call-up from the same supervising program, in usable status in the calling device's tag table and, simultaneously, in usable status in some other device's tag table, such an occurrence being a violation of a possible usage supervision policy. The verification program securely returns a continuation message to the user device and updates the tagged software database, using the tags and the associated information it has received during the call-up procedure.

When creating an unsigned tag for an instance of software, the tag server securely sends the tag to the guardian center and the guardian center's verification program stores the received tag in the tagged software database.

In another implementation, the tag server sends all newly created tags to the guardian center and the guardian center's verification program stores each received tag in the tagged software database. When the guardian center receives a tag from a user device during a call-up procedure, the guardian center's verification program authenticates the tag by searching for it in the guardian center's tagged software data base and, if not found there, declaring it as not authentic if said tag is an unsigned tag. If said tag is a signed tag then the verification program authenticates the tag by either finding it in the tagged software database or by verifying that said tag has the correct form and further verifying the digital signature included in the tag.

The guardian center's continuation message to a user's device is signed by the guardian center and includes identifying data such as a time-stamp, a hash function value of the tag table or of other data it has received from the user device's supervising program during the current call-up. In addition, the continuation message contains commands, hereinafter called actions, to the supervising program in the user device.

Examples of actions used by the invention include but are not limited to: Instructing the supervising program to (1) allow continued use of a particular instance of software; or (2) to refuse use of a software instance for a specified time period; or (3) to refuse to install or allow use of software having a given name or a given list of fingerprints for a specified period of time; or (4) to disable the user device for a specified period of time. Actions of types 2–4 are sometimes called punitive actions.

Upon receiving, during the call-up procedure, the continuation message from the guardian center, the user device's supervising program checks the guardian center's digital signature. The supervising program further checks whether the continuation message is for the current call-up of this device by comparing hash function values or other data present in the continuation message, with hash function values of portions of the device's tag table or with the hash function value of the tag table or with other data present in the tag table.

If the above signature is verified as being authentic and the above comparisons produce matches, the supervising program accepts the continuation message as being the guardian center's response in the current call-up procedure. In this case the supervising program stores the continuous message in the tag table and proceeds to update the status of tags and execute actions according to the actions and punitive actions present in said continuous message.

A usage supervision policy can be associated with an individual tagged instance of software, or with a specific software or type of software, or with the entire user device with which the guardian center communicates, or with an individual user of the user device with which the guardian center communicates.

Examples of usage supervision policies defined by a vendor of instances of software include but are not limited to the following and any combination thereof. That an instance of software once used on one user device will not be used on a different user device. That an instance of software not be used or be in usable status simultaneously on two different user devices. That an instance of software be used or be in usable status simultaneously only on user devices within a specified set of devices. That an instance of software be used for no more than a specified number of times. That an instance of software not be used after a specified date. That use of an instance of software be allowed only if pay-per-use fees for that instance were transferred to a specified account.

The methods and apparatus of the invention make it possible to enforce any usage supervision policy defined by a vendor or consortium of vendors with respect to use of an instance or a class of instances of software.

The guardian center maintains a tag data structure in the tagged software database for each individual tag associated with some instance of software on some user device. The tag data structure for a tag is associated with the tag itself and not with any particular user device from which that tag was transmitted to the guardian center during some call-up procedure. Each tag data structure comprises the tag of an instance of software, the name of the software of which the instance is a copy, the instance number of the instance of software, a hash function value of the instance of software or of portions of that instance, a usage supervision policy associated with the instance of software, and a collection of references to call-up records, or a collection of call-up records, associated with the instance of software. Each call-up record in the said collection of call-up records represents information concerning one call-up procedure and may include a call-up time, a header of a tag table or some other identifying information transferred to the guardian center during the call-up procedure, the last call-up time indicating a time stamp of a former call-up procedure, a hash function value of the tag table transferred to the guardian center during the call-up procedure, and the continuation message sent to the user device's supervising program during the call-up procedure.

Using data gathered and stored during call-up procedures, the guardian center can compile usage statistics for each instance of software, for such purposes as billing for paying per-use for a software instance.

An untagged instance of software may be installed or used on the user device. The supervising program detects that the instance is untagged and computes fingerprints of selected portions of the untagged instance of software and stores these fingerprints in a fingerprint table on the user device. The guardian center, according to this aspect, includes a fingerprint data structure. During the above mentioned call-up procedure with a user device, the guardian center receives all fingerprints from the user device for each untagged instance of software installed on the user device. The verification program compares each fingerprint received from the user device against the fingerprints in its fingerprint data structure to determine if an untagged instance of software used on a user device is an infringing instance of software. In this manner, the invention can detect the use of a software instance that is a pirated copy of vendor software whose tag has been removed, or a pirated derivative of vendor software.

If the verification program detects a match between more than a specified number of fingerprints in the guardian center's fingerprint data structure and the fingerprints received from the user device, the verification program can specify a punitive action or actions in the continuation message returned to the user device. According to one such punitive action, a user device can be disabled for a specified period of time, if detected by the guardian center as using untagged infringing software.

In another example, a punitive action may specify that the untagged instance of software associated with a fingerprint that was matched to a fingerprint in the guardian center's fingerprint data structure, should be disabled.

The fingerprint data structure at the guardian center is constructed by having software vendors who detect that infringing software is being distributed or used as untagged software, send a copy of such untagged infringing software to the guardian center. The guardian center computes fingerprints of portions of this copy of the infringing software and incorporates and stores these fingerprints in the fingerprint data structure.

Protection against infringement of vendor's rights in software is also provided by fingerprinting selected portions of any instance of software, tagged or untagged, used on a user device and storing these fingerprints in the device's fingerprint table. As before, the fingerprints in the fingerprint table are sent by the device's supervising program to the guardian center during execution of a call-up procedure and the guardian center's verification program searches for matches between the received fingerprints and fingerprints in the guardian center's fingerprint data structure. This aspect of the invention protects against infringement on a legitimate vendor's rights by a pirating vendor who makes an infringing version of a legitimate vendor's software and distributes tagged instances of the said infringing software.

A tag table data structure encoded on a device-readable medium accessible by the user's device. If any tagged software has been installed on the device or used by the device, the tag table data structure includes at least one tag that is uniquely associated with one instance of software and includes at least one field associated with the tag in the tag table. The field indicates a usage supervision status for the one instance of software associated with the tag and may also indicate use statistics for the one instance of software associated with the tag. The tag table data structure may also include a tag table header that uniquely identifies the tag table and that uniquely associates the tag table with one user device or with one user device's supervising program. The tag table header includes information concerning user device use statistics and includes a continuation message. The continuation message indicates possible actions and usage supervision status for an instance of software associated with a tag.

A software vendor provides a software development process that creates instances of software having a name and having software content. Each instance of the vendor's software is accessible or usable only in conjunction with a unique tag that is associated with that instance of software. The tag is a unique unforgeable collection of information concerning the instance of software with which the tag is associated and includes the name of the software, a unique identifying number of the instance of software and a hash function value of portions of the content of the software. The software vendor also comprises an infringing software detection mechanism that detects an instance of software that is infringing on the vendor's intellectual property or other rights. The software vendor transfers a copy of the infringing instance of software to a guardian center so that the methods of the present invention can be employed by the guardian center to detect attempted uses and access to the infringing instance of software, and when detected, to impose punitive actions on the user device involved.

A user device includes an input port that receives an instance of software and securely receives a tag uniquely associated with that instance of software. The device also receives requests to install or to use the instance of software. A processor in the user device executes a supervising program. The supervising program detects the attempt to install or to use the instance of software and verifies the authenticity of the tag associated with the instance of software or the status associated with the tag, before allowing installation of or use of the instance of software. From time to time the supervising program determines that a call-up procedure is required as defined by a call-up policy, and the supervising program performs the call-up procedure to update the status of tags stored in the tag table.

During the call-up procedure, the supervising program securely transmits the tag table from the user device via an interconnection mechanism coupled to the user device and awaits reception of a continuation message returned to the user device that indicates actions to be performed for each tag in the tag table. In this manner, the user device does not need to be concerned with setting a usage supervision policy, but rather just enforces a usage supervision policy that is common to all devices or vendor's usage supervision policies associated with software instances distributed by those vendors.

Call-up policies implemented by a user device's supervising program may be associated with the device, with a particular instance of software used on the said device, or with a particular user of the device. Examples of call-up policies include, but are not limited to, the following. The latest time for the next call-up for a user device may be determined by a combination of the time elapsed since the last call-up, the number of times that the device was turned on since the last call-up, and the total time that the device was used since the last call-up. Similarly a call-up policy associated with a tag or with the instance of software associated with that tag may determine the latest time for the next call-up as a function of the time elapsed since the last call-up, the number of times that the instance of software was used, and the total time that the instance of software was used on the device. Another call-up policy associated with an instance of software may specify execution of a call-up every time that an attempt to use the instance of software on the user device occurs.

The invention enforces the behavior of a user device and its supervising program to conform to a call-up policy applicable to the said user device or to any tag in the said device's tag table, by having the supervising program execute a specified punitive action in case of failure to call-up the guardian center and to receive from the guardian a continuation message before the latest time for call-up specified by the call-up policy. The invention ensures that a user device's supervising program accept a message received during execution of a call-up procedure as the guardian center's continuation message for this call-up, only if the said message is in fact sent by the guardian center as the continuation message for the said call-up. This is achieved by the guardian center signing its continuation message and including in it identifying data uniquely linking it with present call-up by the user device's supervising program, as explained before, and by the supervising program verifying the said signature and the said identifying data. The above provisions of the invention prevent a user or a user's device from circumventing the invention's protections by either not calling-up the guardian center according to a call-up policy or by attempting to create or use an improper continuation message.

Examples of the above mentioned punitive action on a user device executed by the said device's supervising program upon failure to conform to a call-up policy include, but are not limited to, the following. The supervising program may disable the device from any activity, except for executing a call-up procedure, for a specified length of time. The device may disable use of an instance of software if a call-up policy associated with that instance of software was violated, for a specified length of time. For untagged instances of software installed or used on the user device, the supervising program detects the untagged instance of software and performs a fingerprinting process on the untagged instance of software and stores fingerprints resulting from the fingerprinting process in a fingerprint table on the user device. For untagged software, during the call-up procedure, the supervising program transmits the fingerprint table from the user device via an interconnection mechanism to the guardian center and awaits reception of a continuation message from the guardian center the to user device, said message indicating an action or actions to be performed for each untagged instance of software stored on the user device.

For untagged software, the user device's supervising program periodically executes a call-up procedure to send, via an interconnection mechanism, fingerprints for untagged instances of software. This call-up procedure may be initiated by the user device's supervising program or by the guardian center. The guardian center's verification program examines each fingerprint received against the guardian center's fingerprint data structure to determine if an untagged instance of software is an infringing instance of software, and if so, the verification program prepares punitive action for the user device. For example, if the verification program detects a sufficient number of matches between the fingerprints associated with some specified software in the fingerprint data structure and the fingerprints associated with untagged software in the user device, the verification program specifies punitive action to be performed, and the verification program transmits a continuation message to the user device. The continuation message indicates the punitive action to be performed on the user device receiving the continuation message.

The aforementioned tag server generally accepts a copy of specified software and produces a plurality of tags, one unique tag per instance of said software. Each tag uniquely identifies the instance of software with which it is associated and each tag comprises information concerning the name of the instance of software associated with the tag, a unique number of the instance of software associated with the tag, and a hash function value combining the said name of software, the said unique number of the instance of software, and a hash function value computed on the contents of the software associated with the tag.

In the method for supervising the usage of software, the step of creating an instance of software is performed as noted above. A tag is then created that is uniquely associated with the instance of software. The instance of software and the tag are then distributed to a user device. The method then detects an attempt to use the instance of the software on the user device and determines if the attempt to use the instance of the software is allowed by determining a status of the tag that is associated with the instance of software to be used.

To create the tag, the method assigns a unique number to the instance of software and computes a first hash function value on the content of the instance of software. The method then computes a second hash function value combining the name of the software, the unique number of the instance of software, and the first hash function value. Finally, the method forma a tag that is uniquely associated with the instance of software. The tag includes the name of the software, the unique number of the instance of software and the second mentioned hash function value.

The step of creating a tag can further produce a digitally signed tag by applying a digital signature function to the second mentioned hash function value included in the tag and including the signed hash function value in the tag.

Software may be distributed by having the user device obtain an instance of software at the user device as well as the tag associated with the instance of software. The user device can determine if the tag associated with the instance of software is signed, and if so, can verify hash function values in the tag and the signature in the tag. If the said verifications succeed, the user device can install or use the instance of software.

To detect an attempt to access the instance of the software on the user device the method of the invention includes the steps of invoking a supervising program on the user device to intercept a user request for use of the instance of software. To determine if the attempt to use the instance of the software is valid, the method determines if a call-up procedure is needed based on a call-up policy. The method performs a call-up procedure to verify the authenticity and to determine the usage supervision policy of the tag associated with the instance of software and updates tag information in the user device based upon an outcome of the call-up procedure. Status information associated with the tag is examined at the user device to determine if use of the instance of software associated with the tag is allowable. In this manner, usage supervision of software is provided.

During the call-up procedure, a tag table storing the tag associated with the instance of software is securely transmitted from the user device to a guardian center and the user device awaits reception of a continuation message returned to the user device that indicates an action to be performed for each tag in the tag table.

The guardian center receives the tag table including the tag associated with the instance of software and examines each tag received in the tag table against a tagged software database to ensure that tags in the tag table are in compliance with at least one usage supervision policy. The guardian center transmits a continuation message indicating an action to follow at the user device upon detecting an attempted use of the instances of software associated with each tag.

Other embodiments of the invention include a computer readable medium encoded with instructions for the above processes, as well as a propagated signal transmitted via a carrier over a medium which securely carries a tag table data structure as described above.

Using these mechanisms, the system of the invention allows a rightful vendor/owner of the rights in an instance of software to police those rights. If the vendor discovers that the vendor rights are being infringed, such as by discovering a bootleg, stolen, reverse engineered, or modified instance of software which is essentially identical in operation to the vendor produced software, the system can police the use of these illegal copies of software.

The system of the invention at the same time protects a rightful user of software from denial of service by dishonest parties who attempt to create a false impression of illegal use of software by the rightful user.

The invention also allows pay-per-use statistics to be tracked at each user device for an instance of software which is purchased on a per use basis. During the call-up procedure, the guardian center can determine the use statistics for a pay-per-use instance of software and can provide the use information back to the software vendor for billing purposes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 illustrates the contents of a tag table according to one embodiment of the invention.

FIG. 10 shows the contents of a guardian center record for an instance of software according to one embodiment of this invention.

FIG. 12 is a flow chart of the processing steps performed by a user device's supervision program when executing a call-up procedure to the guardian center according to one embodiment of the invention.

FIG. 14 shows the data structures used in an embodiment of the invention without guardian center call-ups.

DETAILED DESCRIPTION OF THE INVENTION

Figure 1:
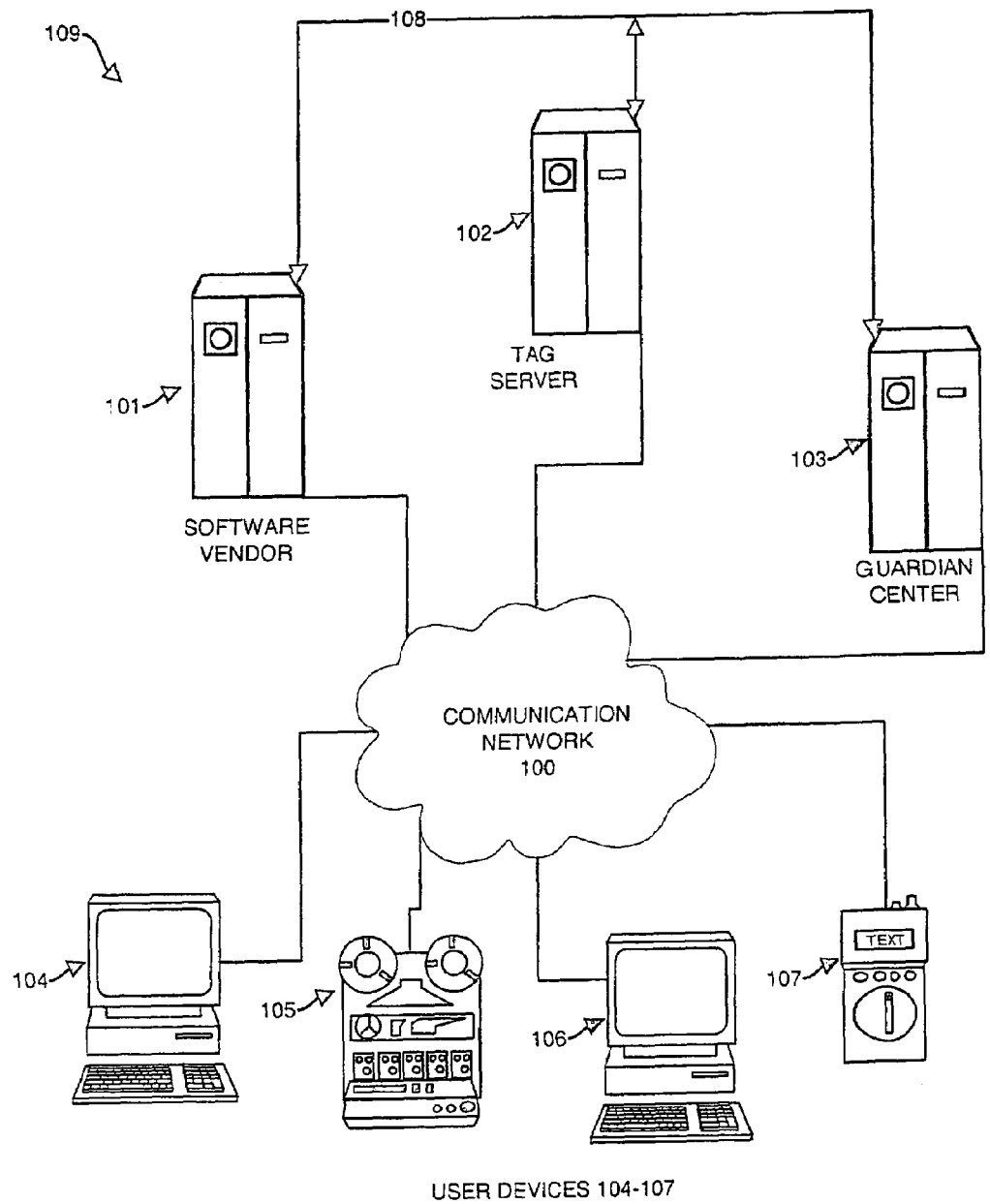
FIG. 1 illustrates an information system configured according to one embodiment of the invention.

FIG. 1 illustrates an example information system 109 configured according to the invention. FIG. 1 is provided to describe the main component elements of the invention and to generally describe their operational interrelationships within the context of the invention. Information system 109 includes a communication network 100 which interconnects a plurality of user devices 104 through 107 and one or more software vendors 101, tag servers 102, and guardian centers 103 (one of each shown in this example embodiment). The invention is intended to supervise usage of information (not shown) which is used with the assistance of one of the user devices 104 through 107, so as to prevent a user device from installing or using any information in a manner infringing on intellectual property or other rights of an owner or distributor or vendor in that information.

Information, the use of which is supervised by the invention for the purpose of protecting intellectual property or other rights, may be any type of electronically, magnetically, optically or otherwise represented information. Examples of information are a computer software application or program, data, a web page or web site, a downloadable application program such as a Java applet, an electronic book, images, video, recorded music or other information on a compact disk, magnetic disk or tape, and so forth. Generally, the usage of any type of information that is used with the assistance of a computer or other device (for example, user devices 104 through 107) can be supervised and the rights in that information can protected by the invention, regardless of what the information is or what the actual physical medium upon which the information is stored or transmitted.

Any such information, as well as any other type of information recognized by people skilled in the art to be protectable by the invention will be referred to hereinafter as software. Any individual copy of a specific software, such as for example, a copy of a specific application program or a specific book or video, will be hereinafter referred to as an instance of software or a software instance. An owner or vendor or distributor of software will be hereinafter referred to as a vendor or software vendor. The installation of, use of, execution of, reading of, displaying of, playing of, viewing of, printing of, copying of, transmitting of, or access to an instance of software by use of or on a device will hereinafter be referred to as use of that instance of software.

User devices 104 through 107 may be any type of device that is employed to use software, including but not limited to a computer system, book reader, music player (e.g., tape player, compact disc player, mini-disc player), video cassette recorder, Digital Video Disc (DVD) player, special purpose devices and so forth. Any such device will hereinafter be referred to as a user device or just device.

In a preferred embodiment of the invention, the user device (i.e., one of 104 through 107) is a computer system and the information is a computer application program or data and the invention provides a mechanism to supervise usage of the software or data by a user of the computer system so as to protect vendors' rights in that software.

The communication network 100 may be any type of communications mechanism which enables the component elements of the invention (101 through 107) to exchange information such as messages or signals. Examples of communication network 100 are a computer network such as the Internet, a Public Switched Telephone Network (PSTN), a wireless network (i.e., a cellular network), or other type of computer or information network.

According to the general operation of the invention, the software vendor 100, and of whom there may be more than one, produces and distributes instances of software (not shown in FIG. 1). The instances of software can be installed or used on each user device 104 through 107 on which the software is intended to be used. By way of example, if the software is in the form of music on tape, the tape can be installed on user device 105, which is illustrated as a tape player in the figure. The software may be physically or manually transported from the software vendor 101 and installed on a user device 104 through 107 (i.e., as in the case of a physical tape), or the software may be electronically disseminated and installed via the communication network 100 using known data transport mechanisms (i.e., as in the case of downloading an instance of software from the software vendor 101 to a user device 107).

The tag server 102, which is a computer system coupled to the communication network 100, creates or generates a tag (not shown in FIG. 1) for each instance of software. Typically, all instances of a specific software are identical. Preferably, a single tag is uniquely associated with a single instance of software produced by the software vendor 101. The tag server 102 has access to the software created by the software vendor 101 preferably via the private communications path 108 and the tag is preferably created based on the contents of the software, the name, and other information generated by the tag server (such as an instance number) or provided by the vendor. The tag server 102 can also obtain software for tagging by using the communication network 100.

Alternatively, there may be a single software vendor 101 selling a variety of instances of different software, and there may be a single tag server 102 and one guardian center 103 for that single software vendor 101. The tag server 102 and guardian center 103 may be part of the software vendor 101 (i.e., contained within the same computer system). Alternatively, there may be a consortium of software vendors 101 which rely on and which are served by one or more commonly shared tag servers 102 and guardian centers 103.

Once a tag is created for an instance of software, the tag is securely disseminated to one of the user devices 104 through 107 that contains the installed corresponding instance of software for that tag. Secure tag dissemination preferably takes place electronically via the communication network 100, for example, by use of the TETS IPSEC or the NETSCAPE SSL protocols for secure communication. Manual secure tag dissemination may be used by the system of the invention as well. An example of manual secure tag dissemination would be to distribute the tag within a tamper proof package containing the tag and possibly also the associate instance of software.

Once an instance of software and the tag associated with that instance of software are installed on a user device 104 through 107, a user (not shown) of that device or the device itself can attempt to use the software. However, before use of the instance of software is allowed, the supervising program (not shown) in the user device 104 through 107 that contains the software verifies that a valid tag exists within the user device for the instance of software requested by the user or by the device. Periodically, each user device communicates with the guardian center 103 via communication network 100 to ensure that all tags associated with the instances of software on that user device are valid and are being used in compliance with a usage supervision policy.

In other words, the invention ensures that use by means of a device of the instance(s) of software is linked to the presence of valid associated tags which are periodically validated and checked for usage characteristics by having the user device communicate with the guardian center. An example of an enforced usage supervision policy is that a tag is present on only one device. The determination of whether or not a user device 104 through 107 can use an instance of software is based on a tag processing procedure called a call-up (explained in detail later) that is performed between the user device and the guardian center 103.

Before further description of detailed embodiments of the invention are provided and explained, Table 1 below provides a glossary of terms to aid in understanding the various elements associated with the invention:

TABLE 1

| TERM | Definition of Terms |
|---|---|
| | DEFINITION |
| ACTIONS | Action commands included in a continuation message CM that describe which software on the device may be used, and specify punitive actions for detected improper use of vendor software. |
| CALL-UP_POLICY_SW | An optionally specified call-up policy associated with specific software SW or with a specific instance of software INST_SW, said policy dictating when a |

TABLE 1-continued

Definition of Terms

| TERM | DEFINITION |
|---|---|
| CM | Device must perform a call-up procedure with the guardian center. A Continuation Message sent from a guardian center to a user device indicating the current state of usage permissions for instances of software in the user device. |
| DEVICE IDENTIFIER | A method to identify a device either through a hardware identifier or by using the supervisor identifier ID(SP). This identifier is used in an embodiment in which each software instance incorporates a device identifier in a test. |
| FP(X) | A fingerprint computed by a fingerprint function (e.g., a hash function) on an input string X. |
| GC | Guardian Center |
| HASH_INST_SW | A hash function value computed on HASH_SW, NAME, NUM_INST_SW and possibly other fields. |
| HASH_SW | A hash function value computed on the contents of software SW. Every instance of SW has the same value of HASH_SW. HASH_SW is another notation for HASH(SW). Sometimes HASH_SW is the result of a hash function value only on portions of the software. |
| ID(X), ID(SP) | A unique identifying number optionally associated with an object X. For example, ID(Supervising Program) is the identification number of the supervising program computed when a device is first turned on by combining the time when the turn-on event occurred and possibly other information, including information provided by the Guardian Center and the values of one or more memory locations. |
| INF_SW | An unauthorized copy or derivative of a vendor's software SW that is infringing on intellectual property or other rights as established by a vendor. It is assumed that the vendor detects the distribution of the infringing software and has a legal right to prevent infringing uses of that software. Infringing software includes software whose tag has been inappropriately removed, whose tag has been altered, or whose device identifier test, if any, has been altered. |
| INST_SW | A specific instance (copy) of specific software selected from the entire set of instances of the software SW. All instances of SW are identical. |
| NAME_SW | A name for the specific software SW. |
| NUM_INST_SW | A unique number associated with a specific instance of software INST_SW. The number can be any mixed sequence of digits, characters, letters or symbols or any other pattern. The same generality applies to the above identifiers ID(X). |
| POLICY (TAG_INST_SW) or USAGE SUPERVISION POLICY | Policies and rules prescribed by a software vendor or other organization with respect to the protection of intellectual property and access rights or pay-per-view use limitations associated with software. The policies and rules may depend on the particular instance of software. The POLICY(TAG_INST_SW) is enforced by the guardian center GC and the supervising program SP. |
| SP, SUPERVISING PROGRAM | Supervising Program. A program integrated into a user device that provides the mechanisms described herein which provide usage supervision for instances of software on the user device. |
| PRIVATE_KEY_X | A private secret key used by X for producing digital signatures. |
| PUBLIC_KEY_X | A public key used by a recipient of data purported to be digitally signed by X, to check and authenticate the signature. |
| SIGN_TS | The digital signature of the tag server. |
| SIGN_X(M) | A digital signature by X on a message M, having the following properties: (1) only X can have produced SIGN_X(M); (2) the recipient of the digital signature can verify that X has signed M. |
| SPARSE_SET | A sparse, secret set of numbers from which, in one embodiment, unique instance numbers are chosen for instances of all software. The instance numbers may be produced by a physical process. |
| SPARSE_SET_SW | A sparse, secret set of numbers from which, in one embodiment, unique instance numbers NUM_INST_SW are chosen for instances of one specific software SW. So, an instance of software X could have the same instance number as an instance of software Y. The numbers may be produced by a physical process. |
| SW | Specific vendor software protected by the invention, e.g. the code of software named Spread. |
| TAG_INST_SW | A unique unforgeable signed or unsigned tag associated with a specific instance of software INST_SW. |
| TAG TABLE | A table or file stored in a device containing information related to tags associated with instances of software as well as information relating to the use or usage supervision of software instances on that device. |
| UNTAGGED_SW | Software which does not have an associated tag TAG_SW and which a user attempts to install or use on a user device. E.g., shareware or freeware or user created software. |
| VRP | Verification Program in the Guardian Center GC. |

DETAILED DEFINITIONS FOR TECHNICAL TERMS

Certain embodiments of the invention are complex in nature. As such, other supporting definitions are provided below for some of the technical terms used by certain embodiments of the invention:

1. A fingerprinting or hash function F: a mathematical function for mapping data X to smaller data F(X) such that if X and Y are unequal, then it is highly likely that F(X) and F(Y) are unequal. As an example of a hash function, X may be a sequence of bytes. In addition, there is a number p which is a preferably randomly chosen, but henceforth kept fixed, 64 bit prime number. The sequence X of bytes is viewed as a number (written to the base 256, where the bytes are the digits of that number) and F(X)=X mod p. Thus the value F(X) is a 64 bit string, no matter how large X is.

2. An unaliasable hash function H: a fingerprinting function having the further property that given X, it is easy to compute H(X), but it is intractable to produce an X' such that H(X)=H(X') and X and X' are different. The term "intractable" means that the computational time required is generally understood to be exponential or practically unfeasible in the size of X, according to the present state of the art. An example of an unaliasable hash function is MD5.

3. Use of an instance of software: installing, using, executing, running, connecting with, reading, otherwise retrieving from a storage medium or modifying a storage medium, displaying, playing, viewing, printing, copying, transmitting, or accessing to an instance of software by use of or on a device.

4. A portion of an instance of software includes all of the text or data of that instance or a sequence of parts of the text or data of that instance of software. The parts need not be contiguous and may overlap with one another.

5. Fingerprinting process: given a sequence of locations in an array of data, a computation of some function value on the values of those locations. For example, if locations 16, 32, and 64 have values 3, 4, and 17 respectively, then a fingerprinting process computes a function of 3, 4, and 17. This function may simply be the list of those values (the three numbers in this example) or may be a hash function of the list of those values. In another example, the locations may be i_1 to j_1, i_2 to j_2, up to i_k to j_k. A fingerprinting process may compute a hash function value of each of these k subsequences of the array and list the k computed values.

6. Fingerprint checking: a method for comparing two sequences of fingerprints. This invention uses two kinds of fingerprint checking: same-location fingerprint checking and general-location fingerprint checking. In both forms of fingerprint checking, a list of fingerprints is computed based on the values in a list of lists of locations. For example, suppose there are three fingerprints in the list f1, f2, and f3 and f1 is computed from the values in locations 10, 20, 30, and 40, f2 is computed from the values in locations 30 and 60, and f3 is computed from the values in locations 100 and 200. Let us call this list the Send List. In both forms of fingerprint checking, the receiver of the Send List computes the fingerprint list based on the values at the same location lists as the sender. This fingerprint list is called the Receive List.

In same-location fingerprint checking, a match is declared if each element of Send List is equal to the corresponding element of Receive List. That is the first element of Send List equals the first element of Receive List, the second element of Send List equals the second element of Receive List, and so on.

Figure 9:
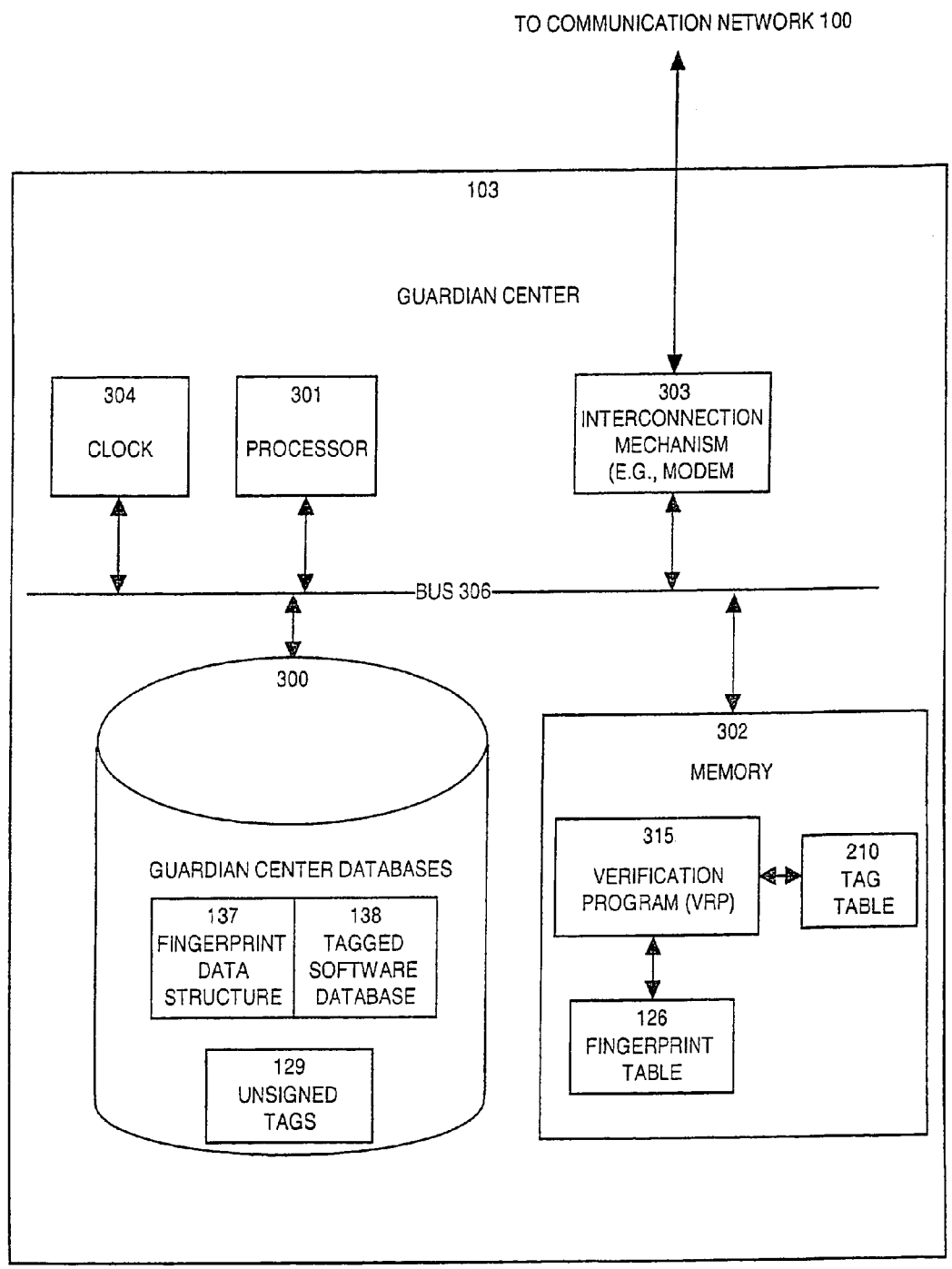
FIG. 9 illustrates the architecture of a guardian center configured according to one embodiment of the invention.

In general-location fingerprint checking, a match is declared if there is a sufficiently large number of common elements in Send List and Receive List regardless of location. How many is sufficient may depend on policy considerations and on the length of the data text from which the fingerprints are taken, defined by a parameter k. If k is 50 bytes, for example, then as few as one or a small number of matches may be sufficient to establish that a Device List is likely to represent the same software as a list in the Guardian Center's Fingerprint Data Structure (FIG. 9, 137). Furthermore, certain matches may be given more weight than others, so fewer matches of higher weight may be sufficient.

In addition to sending the Send List of fingerprints, the sender may send the list of location lists whose values produced Send List. This permits the fingerprints to be calculated to depend on an unpredictable random process.

7. Unforgeability: a tag is unforgeable if it is computationally infeasible for an adversary to produce a valid tag without knowledge of the secret information used by the Tag Server (FIG. 1, 102) to produce tags upon a vendor's request. This invention uses digital signatures (FIG. 3A) and sparse sets (FIGS. 3B and 3C) as two preferred ways to achieve unforgeability of tags.

8. Secure transmission: a way of sending a value X such that only the intended recipient can see X, though other agents may observe the network protocol or see the package by which X is transported. A sealed envelope delivered by a reliable courier is one way to securely transmit the contents of an envelope. Sending a message by use of the TETS IPSEC or the NETSCAPE SSL protocols for secure communication, is another way to ensure secure transmission over the communication network (FIG. 1, 100).

9. Event history: is a timed record of all attempted uses, successful uses, duration of uses, and/or other events such as power-ups associated with a tag table. It is unlikely for two devices to have the same event history, even if they have the same software instances and the same identifiers. An event history may be based upon a record of use of a particular device by one or more users over time.

Figure 2:
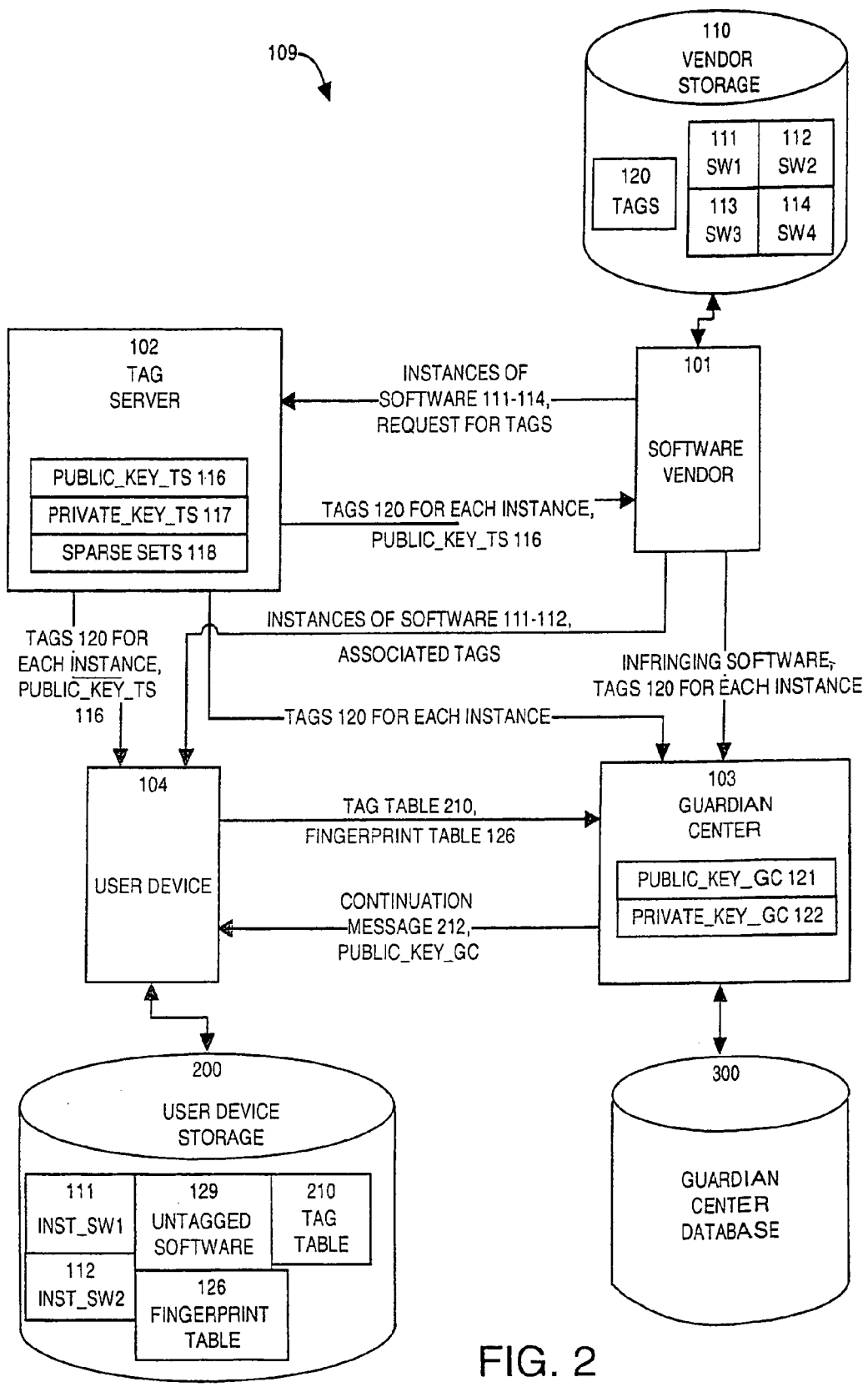
FIG. 2 illustrates a more detailed view of the flow of information within a system configured according to one embodiment of the invention.

Returning now to a discussion of the figures, FIG. 2 provides a more detailed illustration of the architecture of the system 109 configured according to the invention. FIG. 2 will be used as an outline for the overall description of the entire operation of the invention. Throughout this description, reference will be made to other figures describing in more detail each aspect of this invention.

In operation of the system 109, instances of software (INST_SW) 111 through 114 (labeled as SW1, SW2, SW3, SW4) are created by the software vendor 101 and stored in vendor storage 110. There may be more than one software vendor 101. Examples of software vendors 101 are publishing houses (creating reproducible performance recordings or electronically readable books), computer software developers (creating computer software application programs), data collection companies (creating databases of information), individual programmers, and so on. The software (SW) produced by software vendor 101 represents actual software content (SW), which may include information, data or code. The software (SW) may have an associated name (NAME_SW) which is typically assigned by the software vendor 101. Each instance of software (INST_SW) 111–114 can be thought of as a separate physical copy of the named software (SW). That is, each instance of software (INST_SW) for particular software (SW) is merely a copy of that software (SW) having the same name (NAME_SW) and the same code, data or other informational content.

By way of example, if a word processing application program is created by the software vendor 101 and is given the name (NAME_SW) "Write", the binary or executable code, data or other information that comprises the Write program is termed software (SW). Each individual copy of the Write software (SW) (e.g., each disk containing a copy of the program) is a distinct instance of that software (INST_SW) but has the same software content (SW). Thus in FIG. 2, each instance 111–114 may contain the same software content (SW), in which case each instance 111–114 would have the same name (NAME_SW), or, each instance 111–114 may be representative of a copy of different software (SW) (i.e., different data, code or other information) and the name of each instance (NAME_SW) 111–114 that has different software content (SW) would typically be different.

The tag server (TS) 102 creates, upon the vendor's 101 request, a unique unforgeable tag (TAG_INST_SW) 120 for each instance of software 111–114. In a preferred embodiment of the invention, a single unique tag is prepared for an instance of software and is associated with that instance. In other embodiments, multiple unique tags may be associated with one instance of software, but preferably, two different instances of software do not share a common associated tag.

In order to create the requested tags, the TS 102 (FIG. 1) obtains (FIGS. 3A, 3B, & 3C, step 150) one copy of each specific software for instances of which it will create tags. For example, it may have one copy of "Write 7.2" where Write 7.2 is a release or version of the program family Write. Generally, a tag 120 is a unique, unforgeable sequence of data bits that is associated with a particular instance of software (INST_SW) (i.e. one of 111–114). As will be explained, according to embodiments of the invention, a user device 104 is unable to use an instance of software 111–114 without first examining a valid tag 120 associated with that instance of software 111–114.

Tags 120 for instances of software 111–114 are preferably stored in a tag table 210 on a storage device 200 that is coupled to or that is integrally part of the user device 104. An instance of software 111–114 can be used on a user device 104 only by reference to a tag 120 associated with that instance of software (one of 111–114) which is stored in the tag table 210, and only if the associated tag 120 for that instance 111–114 has a usage status (Example Tag Table shown in FIG. 6, with Usage Status indicated in column 2) allowing use of the software instance on or by the user device 104. That is, certain specific software includes the indication that it can run only if a tag for an instance of that software is present. (A pirate may remove this indication in which case the protection mechanisms for untagged software, detailed below, will apply.) In this manner, aspects of the invention allow and provide control over the use of software in certain embodiments by requiring a valid tag specifically associated with that instance of software to be present on the user device 104.

As will be explained further, the ability of components in a system configured with the invention to track and manage tag creation, validation, and enforcement provides unique advantages over prior art systems for software usage control. Before further discussions of the remaining components of the system 109 in FIG. 2 are provided, details of tag creation will be discussed.

Figure 3A:
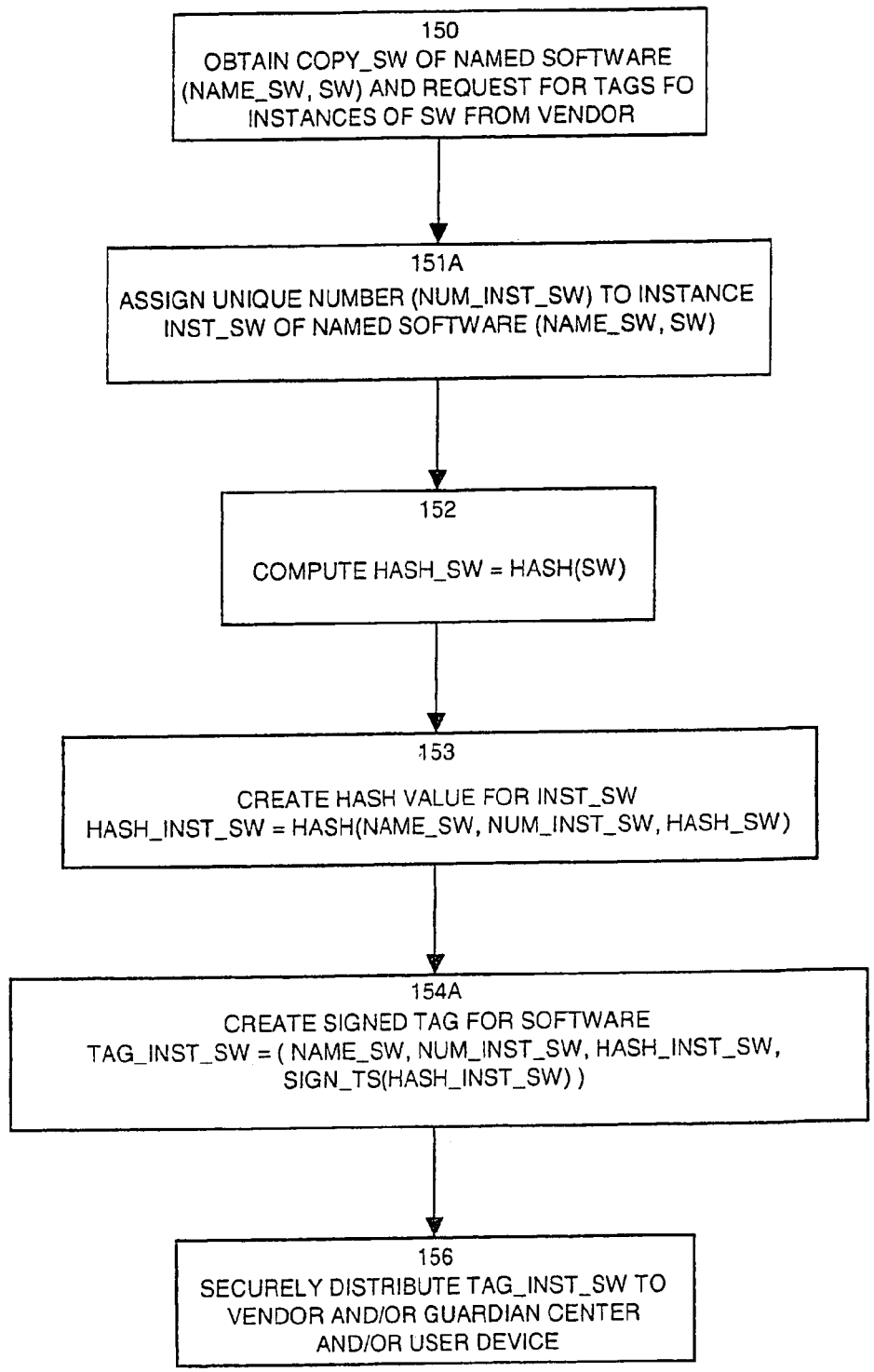
FIG. 3A is a flow chart showing the processing steps performed to create a signed tag for an instance of software according to one embodiment of the invention.
Figure 3B:
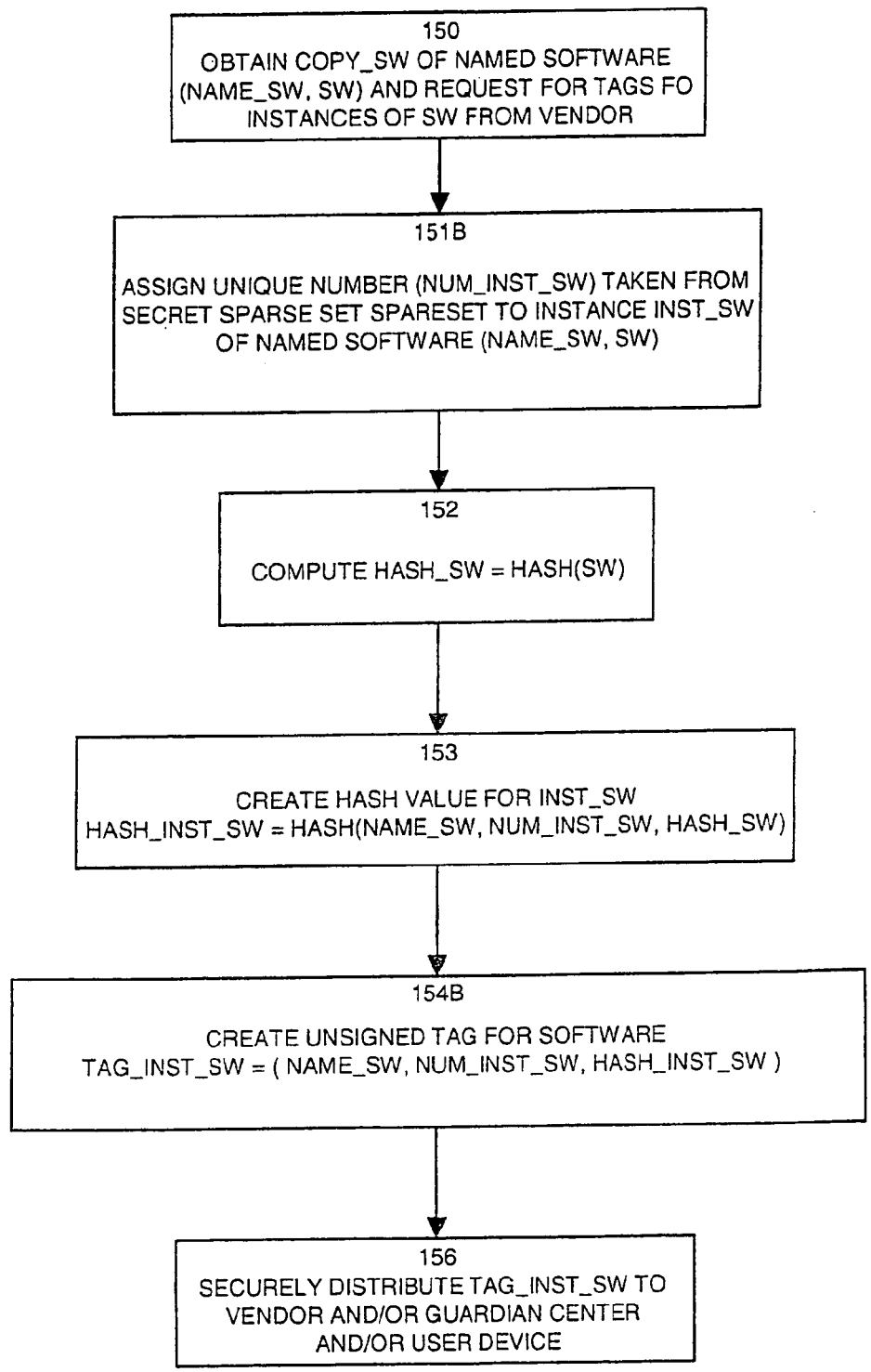
FIG. 3B is a flow chart showing the processing steps performed to create an unsigned tag for an instance of software according to one embodiment of the invention.
Figure 3C:
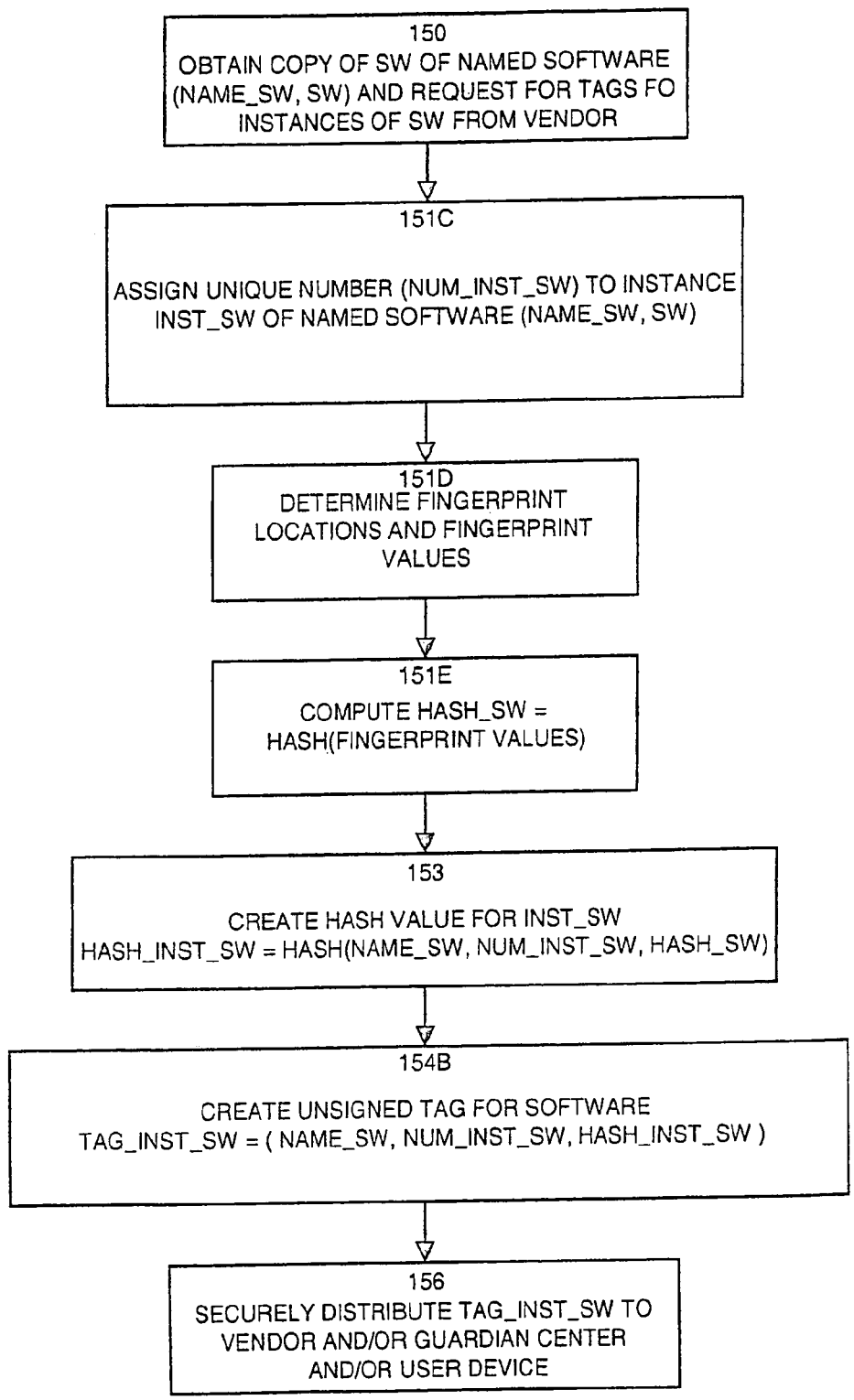
FIG. 3C is a flow chart showing the processing steps performed to create an unsigned tag with fingerprints for an instance of software according to one embodiment of the invention.

FIGS. 3A, 3B, and 3C are flow charts showing preferred embodiments of the processing steps performed during the tag creation process within the tag server 102 configured according to the invention. Since the figures are similar, many of their step numbers are the same and the two figures will be explained simultaneously.

In step 150, the tag server 102 obtains from its local storage a copy 111–114 of named software (NAME_SW_SW) to be tagged. In addition, the tag server 102 obtains a request for a tag (FIG. 2) from the vendor 101. In step 151A (FIG. 3A) and 151B (FIG. 3B) and 151C (FIG. 3C), the tag server 102 generates a unique number (NUM_INST_SW). In step 151A in FIG. 3A, the number is simply unique. However, in step 151B in FIG. 3B and 151C in FIG. 3C, the unique number (NUM_INST_SW) is selected from sparse sets 118 (FIG. 2).

Sparse sets 118 (FIG. 2) are sets of secret numbers from which instance numbers (NUM_INST_SW) are chosen for instances of named software (NAME_SW, SW). Preferably there are relatively few such numbers compared with the available range of numbers (e.g. if there are 100 million instances of a particular software, and more than 10 billion billion possible numbers in the range defined by 64 bits). As such, the sets 118 are referred to as sparse.

Sparseness makes it difficult for an adversary or software pirate to generate a valid instance number. There may be one sparse set for all software, or a different sparse set for each specific software defined by a set of related instances. In the preferred embodiment one sparse set 118 is used as a source of instance numbers for all software. However, having a separate sparse set 118 for each specific software may permit simpler distributed management of instance number generation.

For example, there may be a sparse set of numbers 118 (SPARSE_SET_SW) associated with the "Write" application software noted earlier, from which instance numbers (NUM_INST_SW) are selected for each instance (INST_SW) of the Write software. For security reasons, new members of sparse sets may be materialized or generated on demand, by access to a physical process such as an photo-electric counting device (not shown in the invention) for example.

In step 152 (FIGS. 3A and 3B), the tag server 102 computes a hash function value on the software (SW) content or on a portion of the SW content. In the preferred embodiment, if more than one instance of software (INST_SW) 111–114 that contains the same software content SW is to be tagged, then the hash function value HASH_SW is computed only once for the software (SW), since each instance 111–114 contains the same code, information, and/or data (i.e., has the same SW content). Further, only the value HASH_SW needs to be retrieved or generated by the tag server 102 once, rather than for each copy of the full software. This aspect of the invention saves tag creation time when many instances of the same software (SW) are to be tagged. In such cases, the hash function value HASH_SW needs to be computed only once. In alternative embodiments, computing the hash function value on only a portion of the software content may be a further optimization, since this may reduce the time required for building the hash function value on both the tag server 102 and on the user device(s) 104–107.

In step 153 (FIGS. 3A, 3B and 3C), a second hash function value HASH_INST_SW is computed, to be incorporated into the tag to be associated with the software instance (INST_SW). Step 153 differs from step 152 in that the hash value HASH_SW computed in step 152 is the same for all instances INST_SW of the same software SW, whereas in step 153, the hash value HASH_INST_SW is unique for each NUM_INST_SW of the same software SW. In one embodiment, the second hash function value NUM_INST_SW combines together the name of the software (NAME_SW), the unique number of the instance of the software (NUM_INST_SW), and the previously computed (Step 152) hash function value HASH_SW. Other hash value combinations such as name and software only, of software and number only, or others, may now be recognized as providing a similar functionality as understood by those skilled in the art. Such combinations of data encoded via a hash function are meant to be within the scope of this invention.

After the hash value HASH_INST_SW is computed for each instance of software 111–114, either a signed (FIG. 3A) or unsigned (FIGS. 3B and 3C) tag may be created for those instances 111–114 by steps 154A and 154B. In step 154A in FIG. 3A, a signed tag is created for an instance of software 111–114, whereas in step 154B in FIGS. 3B&3C an unsigned tag is created for instances of software 111–114. A signed tag ensures that the tag will be unforgeable by digitally signing portions of the tag prepared, even if the instance numbers are predictable (e.g., even if they are consecutive number). An unsigned tag may not offer this protection, but since the unsigned tag created in step 154B preferably includes an instance number NUM_INST_SW taken from the sparse set 151B, this alternative still assures unforgeability of the tag. The signed tag TAG_INST_SW is computed in step 154A as follows:

TAG_INST_SW=(NAME_SW,NUM_INST_SW,
       HASH_INST_SW, SIGN_TS(HASH-
       _INST_SW))

where the term SIGN_TS is a digital signature function performed on the HASH_INST_SW hash function value. The digital signature SIGN_TS is produced by the tag server 102 using the private key PRIVATE_KEY_TS 117, which is a digital key that is kept secret from all potential adversaries and all entities in FIG. 2, except the tag server 102 itself.

The unsigned tag TAG_INST_SW is computed in step 154B (FIG. 3B) as follows:

TAG_INST_SW=(NAME_SW,NUM_INST_SW,
       HASH_INST_SW).

After creation of a tag TAG_INST_SW by the tag server 102, the tag is preferably securely transmitted (as shown by TAGS 120 in FIG. 2, and as will be explained in more detail with respect to FIGS. 13A & 13B, in step 156) to the requesting software vendor 101 and to the guardian center 103 where the tag(s) 120 are stored in various tag data bases (as will be explained with respect to FIG. 9, 129, 138).

A tag 120 associated with an instance of software (e.g. 111) and the manner in which the tag 120 is prepared by the tag server 102 serve a number of important purposes in the invention:

(1) A device (e.g. 104) cannot use an instance 111 of a vendor's 101 software 111 unless the device 104 stores or has access to the associated valid tag 120, preferably maintained in the device's 104 tag table 210 (shown in detail in FIG. 6) and unless that associated tag 120 has a usage status (column 2 in FIG. 6) in the tag table 210 that allows or indicates proper usage for the associated instance 111.

(2) Through mandated call-up procedures (FIG. 12, 13A & B), to be detailed later, between a device (e.g. 104) and the guardian center 103, the guardian center 103 can supervise, authenticate, track, validate and generally control tag properties and ensure that the instance of software 111 associated with a tag 120 is used in accordance with the vendor's 101 usage supervision policy (maintained preferably at guardian center 103) for that instance of software 111.

(3) The unforgeability of a tag 120 and the fact that tags 120 are preferably transmitted in a secure manner ensure that only a user or user device 104 who or that has rightfully obtained a tag 120 from a vendor 101 (or tag server 102) and has used the associated instance of software 111–114 in accordance with the vendor's 101 specified usage supervision policy (not shown in this figure) for this instance of software 111, has this tag 120. This aspect of the invention prevents an adversary or pirate from trying to create and/or attempt to use a copy of a valid tag 120 which in turn would result, according to the mechanisms of the invention, in punitive actions against the copying adversary/pirate as well as against the rightful user or user device using the instance of software 111 and the associated tag 120.

It is to be understood that there may be several alternative compositions of a tag 120. One alternative is to have a subset of the fields described herein. Specifically, the hash value HASH_INST_SW may not be included in a tag 120, thus leaving NAME_SW and NUM_INST_SW in a tag 120. An advantage of such an embodiment is that less data needs to be sent between system components (e.g. 101, 102, 103, 104) and computed for each tag 120. A disadvantage may be that the owner of a tag 120 might then attempt to associate the tag 120 with a different specific software instance 111. This is prevented when HASH_INST_SW is available in a tag 120 since the value HASH_INST_SW depends on HASH_SW and HASH_SW can be used to verify that the software SW within an instance 111 is correct or unaltered.

An alternative tag composition may be as follows: NAME_SW, NUM_INST_SW, HASH_SW. Using this composition, every tag 120 will be associated with software whose content (i.e. SW) matches with a hash function to HASH_SW. A possible disadvantage of this scheme is that it may allow the possibility that a pirate might generate illegitimate tags 120 that appear correct. Depending upon the complexity of the embodiments of the invention selected to protect the use of software, the systems described herein are designed to alleviate the various noted problems.

As another example, a third alternative composition of a tag 120 may be as follows: NAME_SW, NUM_INST_SW, HASH_SW, SIGN_TS(NAME_SW, NUM_INST_SW, HASH_SW). In this type of tag 120, the digital signature SIGN_TS prevents tag forgery, since preferably only the tag server 102 possesses the secret key SECRET_KEY_TS required for computation of the signature function SIGN_TS.

Another tag field that may be removed is the field NAME_SW. An advantage of this embodiment is to reduce the amount of data sent between system components. The name may be unnecessary if the software instance INST_SW indicates by some means other than the name which tag must be present for INST_SW to run or be used. A nameless tag may work, for example, if there is only one kind of software being distributed from a given software vendor 101, in which case a software vendor 101 identifier can serve as a name for the software produced by that vendor. Alternatively, the NUM_INST_SW may be globally unique across all kinds of software in which case the NAME_SW is unnecessary.

Another field that may be removed from a tag 120 is NUM_INST_SW. An advantage to this tag composition is a reduction in the amount of data that must be sent over network 100 and a more simplistic tag generation scheme can be uesd without a need for a unique number selection process (e.g. step 151 as will be explained in FIGS. 3A, 3B, and 3C). A possible disadvantage is that different tags having the same NAME_SW (if that field is kept) may become indistinguishable, so duplicate instances 111–114 might be allowed.

Another alternative embodiment of tags is to include additional fields. A unique identifier of a user device's (e.g. 104) Supervising Program (discussed later in detail as 209 in FIG. 4), denoted ID(SP) (209-A in FIG. 4), may be computed, for example, from a combination of a hardware identifier, if available, the time when the device's 104 supervising program 209 was first invoked and, if available, a unique number securely obtained by the device's supervising program 209 from the guardian center 103 and the values of at least one memory location within the device. This will be discussed in more detail later, but is mentioned now to provide the reader with a more comprehensive understanding of various tag creation processes. Including the identifier ID(SP) 209-A of the user device's 104–107 supervising program 209 in a tag 120 associated with an instance of software 111 used on that device, may support less expensive Guardian Center 103 call-ups as described in more detail below.

An additional field that may be included in an alternative tag and tag creation embodiment of the invention is a list of fingerprints for specified locations of data within an instance of software INST_SW. Fingerprints will be explained in more detail, but as their name suggests, a fingerprint is a unique encoding of one or more portions or data areas selected from an instance of software. The usage of fingerprints is illustrated in steps 151D and 151E of FIG. 3 in which locations are selected and then a fingerprint is computed on those locations and the a hash is computed on that result. Including a fingerprint of an instance of software 111 within a tag 120 associated with that instance permits a supervising program (FIG. 4, 209, used to access the software) in a user device 104–107 to verify that the association between INST_SW and the tag is correct by performing a same location fingerprint checked (Detailed Definitions, following Table 1, FIG. 6) on INST_SW and comparing with the list of fingerprints in the associated tag. While the use of fingerprints may overlap the functionality of HASH_SW, they permit greater efficiency for the validation of the correctness of the association of a tag with an instance of software.

For large instances of software INST_SW, such as for example, an encyclopedia or a video, the computation of HASH_SW, which requires the supervising program to scan the whole of INST_SW, will require considerable time. If the tag associated with INST_SW contains the above fixed location fingerprint values computed by the tag server, the supervising program (209 in FIG. 4) only needs to access those locations in INST_SW and compute the corresponding fingerprint values. Using the above fingerprints provides additional protection benefits, since the locations on which the fingerprints are computed by the tag server can be changed over time in response to piracy attacks.

Figure 4:
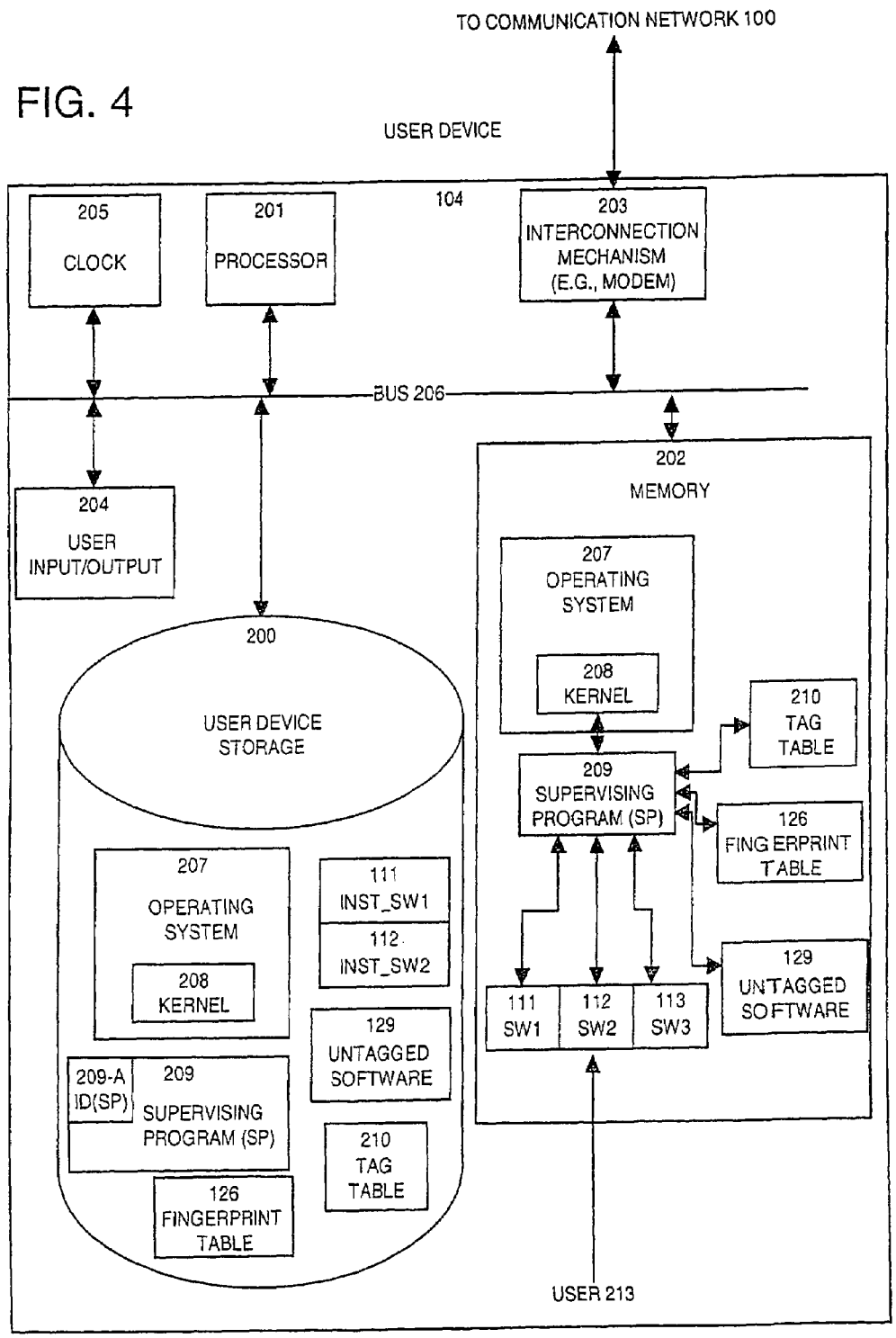
FIG. 4 illustrates the architecture of a user device configured according to one embodiment of the invention.

Similar efficiency and security benefits are obtained if the hash function value HASH_SW is computed (FIGS. 3A & B, step 152) by the tag server 102 only on specified portions of SW, instead of the whole of SW. The specified locations in an instance of software INST_SW 111–114 for which fingerprints are computed by the tag server 102, may explicitly accompany the fingerprints in the tag 120 or may be included in the instance INST_SW or in the device's 104–107 supervising program (FIG. 4, 209). The advantage of incorporating these fingerprint locations in a tag 120 is that the fingerprints can vary for each instance INST_SW being sent, with the fingerprints serving as a kind of unique NUM_INST_SW and permitting random checks of software code alterations.

Accordingly, tags 120 consisting of the following field combinations all fall within the scope of this invention: the tags produced as a result of processing in FIGS. 3A, 3B, and 3C; any of the above combinations of fields plus a form of supervising program identifier 209-A (FIG. 4) for a user device (e.g.: 104) such as ID(SP), where the value ID(SP) may be combined in computing the hash function value HASH_INST_SW; any of the above combinations of fields plus a list of fingerprints associated with the contents of SW, where the values of these fingerprints may be combined in the computation of the hash function value HASH_INST_SW; and any superset of any of the above combinations of fields. Though the above tag and processing descriptions describe specific implementations of embodiments of the invention, those skilled in the art should understand that tags are generally provided by the invention to uniquely identify and control use of one or more specific instances of software.

Once the tags 120 are created for the instances of software 111 through 114, the tags 120 are securely transmitted by the tag server 102, in step 156, to the guardian center's database(s) (to be explained with respect to FIG. 9, 129, 138) or to the user device 104, or to the software vendor or to any combination of the above entities.

Turning attention now back to FIG. 2, the tags 120 can be securely distributed by the tag server 102 to one or more of the software vendor(s) 101, the guardian center(s) 103, and the user device(s) 104. If the tags 120 are securely transmitted by the tag server 102 back to the software vendor 101 but not to user devices 104–107, then the tags 120 will be securely distributed by the software vendor 101, along with the instances of software 111–114, to the user devices 104–107. Alternatively, the instances of software 111–114 are obtained by the user device(s) 104–107 separately from the tags 120, which can be obtained directly by the user device(s) 104–107 from the tag server 102. Alternatively, the tags 120 can be obtained from one or more guardian center(s) 103.

The instances of software 111–114 themselves are not required to be securely distributed, though they may be in alternative embodiments of the system 109 of the invention. Distribution of the instances of software 111–114 can take place in a number of ways. The instances 111–114 may be downloaded from the software vendor(s) 101 via downloading mechanisms supported over the communication network 100 (FIG. 1). Examples of downloading mechanisms are the File Transfer Protocol (FTP), PUSH protocols that send information to a receiver, TCP/IP and World Wide Web related protocols, and other protocols used to transfer data over busses between computer processors, or over other types of computer networks such as communication network 100, which may be the Internet, for example.

Alternatively, the user device(s) 104 may be pre-equipped with the instances of software 111–114 that are pre-installed by a user device manufacturer (not shown) which may or may not be the same entity as the software vendor(s) 104. An example would be an instance of software 111–114 embedded in firmware within a user device 104. As another alternative, users (not shown in this figure) of the user device(s) 104 may purchase the instances of software 111–114 on a user device readable medium, such as a magnetically encoded hard or floppy disk or an optical medium such as a CD-ROM, DVD disc, video or audio tape, holographic storage device, or another medium that can carry information. In each of the above alternative ways for the user devices 104–107 to obtain an instance of software 111–114, the associated tag 120 which according to the invention is required for using that instance of software can directly accompany the instance of software or can be separately and preferably securely transmitted to the device.

The user device device 104, as shown in FIG. 2, includes a coupling to a user device storage mechanism 200. The user device storage 200 is able to maintain each instance of software 111–114, a tag table 210 and a fingerprint table 126. The purpose and details of fingerprint and tag tables 126, 210 will be explained in more detail shortly.

FIG. 4 illustrates a preferred architecture of a user device 104 configured according to the invention. The user device 104 includes an internal bus 206 which couples the user device storage 200, a processor 201, a memory 202, an interconnection mechanism 203, and a user input/output mechanism 204. A user 213 interacts with the user device 104. The user 213 is preferably a human being, though the invention can be applied to systems in which usage supervision as explained herein is implemented on electronic components within larger non-human interaction environments. In this illustration, the user 213 is shown to be interacting directly with the instances of software 111–114 to highlight the purposes of the invention. In practice, the user 213 may actually interface with the user input/output mechanisms 204 which indirectly supplies input and output to and from the instances of software 111–114 under the control of the processor 201.

The user input/output mechanism 204 may be one or more of a keyboard, mouse, microphone, speaker, monitor, heads-up or virtual reality display, or other input/output device used to communicate information to and/or from the user 213 or other mechanism (i.e., non human) that interacts with the user device 104. The input/output mechanism 204 may also serve as a means by which the user device 104 is provided with the instance of software 111–114. In this case, the input/output mechanism 204 may include such mechanisms as a CD-ROM or DVD drive, scanner, floppy disk drive, or another mechanism that can be used to load information onto the user storage device 200 or into the memory 202 or into buffers (not shown in FIG. 4) which may be included in or associated with the user device (e.g.: 104).

The interconnection mechanism 203 is used to interface to the communication network 100 and may be a device such as a modem, network, interface card, wireless transceiver, or other device used for communications.

The user storage device 200,, which may be a hard, floppy or optical disk drive, RAID array, file server, or other read/write storage mechanism is used to maintain various components and data used by the invention. Specifically, as illustrated in this embodiment, the user storage device 200 maintains the instances of software 111–114, the tag table 210, the fingerprint table 126, a supervising program 209 (FIG. 4) and an operating system 207 including a kernel 208. The operating system 207, as understood in the art, is typically loaded into memory 202 upon startup of the user device 104 and executes in conjunction with the processor 201 to control the overall operation of the various components of the user device 104. Alternatively, the operating system and components of this invention may be embedded in the architecture of the processor or system embodying the invention.

An example of a user device 104 is a personal computer or workstation. Examples of the processor 201 are an Intel-based processor such as a Celeron, Pentium, Pentium II, Pentium III, or 80×86 family or a SPARC-based processor using RISC technology or a MIPS processor. These processor names may be trademarks of respective microprocessor manufacturing companies. Examples of the operating system 207 are any of the Windows-based operating systems such as Windows NT, Windows98, Windows95, WindowsCE or Windows 3.1 manufactured by the Microsoft Corporation of Redmond, Wash., or the operating system 207 may be, for example, a UNIX-based system such as Solaris from Sun Microsystems, Inc. of Mountain View, Calif. Other embodiments of the user device 104 may be dedicated devices that use specialized processors 201 which have custom or embedded operating systems 207. Those skilled in the art should understand that the user device 104, as stated previously, can be any type of device that is microprocessor controlled. The invention is not meant to be limited by the architecture of the user device 104 shown in FIG. 4. Rather, any device that can access software for a user is meant to be within the scope of this invention.

In order to provide the usage supervision aspects of the system of the invention, the supervising program (SP) 209 is provided and executes in conjunction with the operating system 207, the tag table 210, the instances of software 111–114, and optionally, the fingerprint table 126 (FIG. 4). The supervising program (SP) 209 is preferably a separate entity from the operating system 207, though it may be an extension thereof. The supervising program (SP) 209 is also preferably a software program written in any programming language (e.g., C, C++, Java, Assembler, or any other language) and preferably uses an application programming interface (API) provided by the operating system 207 to interface with and control certain functions of the operating system 207. Alternatively, in an embedded system user device 104, the operating system 207, supervising program (SP) 209, and other data and or components within user device 104 may all be embedded or completely represented via electronic circuitry or stored in a memory.

In a preferred embodiment of the invention, upon each startup (i.e., power-up) of the user device 104, the operating system 207, supervising program (SP) 209 and tag table 210 are read into memory 202 from the user storage device 200. On the first startup of the user device 104, preferably, an identifier ID(SP) 209-A for the device's supervising program 209 (FIG. 4) is computed and stored in a secure location. This identifier 209-A, as discussed in the glossary above (Table 1, ID(SP)), is computed based on some combination of the following: a hardware identifier, if available; a number provided by a guardian center 103 (FIG. 2), if available; and the value of a high precision timer (e.g., microsecond) within the device 104. In the system of this invention, the supervising program (SP) 209 serves as a usage supervision interface between the instances of software 111–114 and the operating system 207. Before the operational aspects of usage supervision provided by the supervising program (SP) 209 are explained in detail, the installation of instances of software 111–114 and the associated tags 120 onto user device 104 will be discussed.

Figure 5:
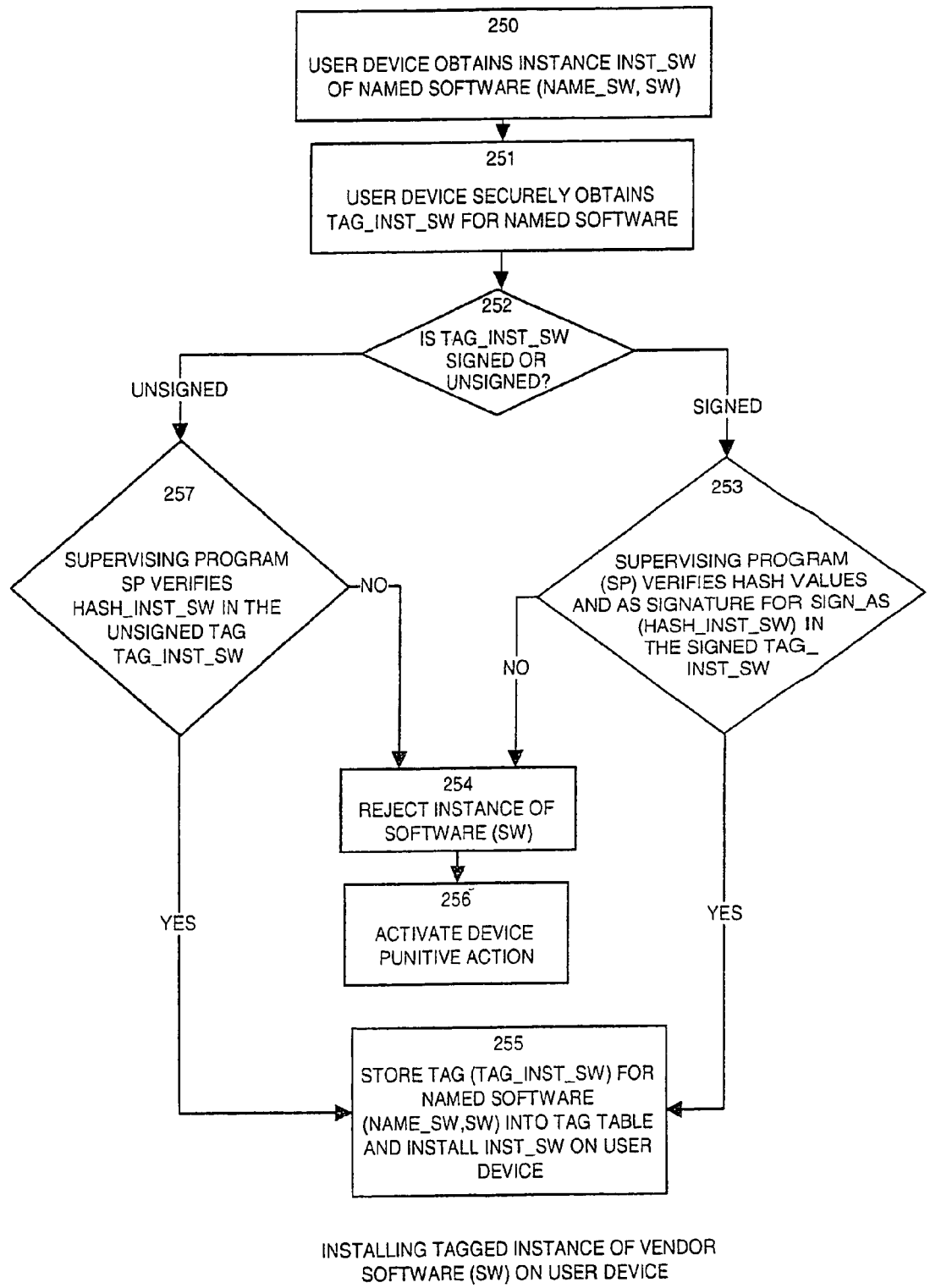
FIG. 5 is a flow chart showing the steps performed to install vendor software on a user device according to one embodiment of the invention.

FIG. 5 illustrates the steps involved to install an instance of software INST_SW and the associated tag TAG_INST_SW onto a user device 104 according to a preferred embodiment of the invention. Both the tags 120 and the instances of software 111–114 may be installed by being loaded onto the user device 104 through a user input/output mechanism 204, or may be electronically installed via reception from the communication network 100 through the interconnection mechanism 203. The steps in FIG. 5 are preferably performed by the processor 201 executing the supervising program (SP) 209 code provided as part of the invention. The supervising program 209 can reside in the operating system 207, as an extension to the kernel 208, for example, or may reside and execute as a separate process above the kernel 208 and operating system 207.

In either case, the user device 104 (in this example a personal computer, but the provisions of the invention apply to any other device in the sense of the invention) obtains an instance INST_SW of a specific named software (NAME_SW, SW) in step 250 in FIG. 5. In step 251, the user device 104 securely obtains the tag TAG_INST_SW associated with the instance of the named software obtained in step 250. In step 252, the system of the invention determines if the tag TAG_INST_SW is a signed or unsigned tag. Step 252 may be performed by examining the tag information received to determine if the SIGN_TS function value is present or not within the tag TAG_INST_SW. Next, the supervising program proceeds to validate the tag and its proper association with the instance of software as follows.

In a preferred embodiment of the invention the tag is created by the tag server 102 according to the steps in FIG. 3A, 3B or 3C and has the contents produced by step 154A (FIG. 3A) for a signed tag and 154B (FIGS. 3B and 3C) for an unsigned tag. If the tag TAG_INST_SW is a signed tag, step (FIG. 5, 253) invokes a part of the supervising program (SP) 209 to compute the hash function value V=HASH (INST_SW) and a hash function value U=HASH (NAME_SW, NUM_INST_SW, V). The supervising program 209 then compares the value U with the value HASH_INST_SW found in the tag TAG_INST_SW. If the two compared values do not agree then the tag is invalid. If the values U and V agree then the supervising 209 program further verifies, by use of the tag server's 102 public key PUBLIC_KEY_TS (FIG. 2, 116), the digital signature on SIGN_TS (HASH_INST_SW) that exists within the tag TAG_INST_SW. If the tag server's signature in SIGN_TS (HASH_INST_SW) is not validated, then the tag TAG_INST_SW is not valid. When the instance of named software (NAME_SW, SW) obtained in step 250 is found in step 253 to be associated with an invalid tag TAG_INST_SW obtained in step 251, the instance of software is rejected in step 254.

If the tag TAG_INST_SW is an unsigned tag, step 257 invokes a part of the supervising program (SP) 209 to verify the hash values for the hash function value HASH_INST_SW that exists within the tag TAG_INST_SW by the same steps that were used above for the case of a signed tag. If the HASH_INST_SW value does not properly evaluate, then there is an error in the tag TAG_INST_SW and the instance of named software (NAME_SW, SW) obtained in step 250 that is associated with the invalid tag TAG_INST_SW is rejected in step 254.

Rejection in step 254 can simply mean that the user device 104 discards or removes or does not allow use of the instance of software INST_SW and its associated tag TAG_INST_SW that were obtained in steps 250 and 251. Step 256 can also be executed which activates a user device (e.g., 104) punitive action. Punitive action for a user device 104 may include shutting down or disabling the device for future use. Punitive actions will be discussed in more detail with respect to usage supervision features of this invention.

If the hash function values and the signature SIGN_TS (HASH_INST_SW) are verified in step 253 for a signed tag, or if the hash function value HASH_INST_SW is verified in step 257 for an unsigned tag, then step 255 stores the instance of software INST_SW (111–114 in FIG. 2) associated with the tag onto the user storage device 200, and also stores the associated tag TAG_INST_SW for the instance of software (e.g., 111) into the tag table 210 with the status "INSTALLED" attached to the tag (in column one of the table 210 illustrated in detail in FIG. 6, as will explained more completely later).

In an alternative embodiment in which a tag contains a supervising program identifier ID(SP) 209-A, the supervising program 209 verifies that the supervising program identifier 209-A in the tag 120 is the same as the supervising program identifier 209-A stored on the user device 104. In an alternative embodiment in which a tag 120 contains a fingerprint list based on specified locations on the software content SW, the supervising program 209 verifies that the fingerprint list matches the fingerprints computed at the same specified locations in the software SW, where matching is based on the same-location fingerprinting, as described in the definitions above and as explained in detail herein.

FIG. 6 illustrates the contents of an example tag table 210. Generally, the tag table 210 includes information required by the supervising program (SP) 209 to make a determination of whether or not a user 213 of the user device 104 or the device 104 itself is allowed usage of an instance of software 111–114. Through a process which will be explained shortly, the supervising program 209 can detect the attempted use of an instance of software 111–114 and can check information maintained in the tag table 210 to determine usage supervision characteristics for a tag TAG_INST_SW associated with the requested instance 111–114.

Periodically, the supervising program (SP) 209 will perform a call-up procedure which interfaces the user device 104 with the guardian center 103 (FIG. 2). During the call-up procedure, tag information in the tag table 210 for each instance of software 111–114 installed on a user device 104 which is performing the call-up is verified by the guardian center's 103 (FIG. 2) verification program (FIG. 9, 315) so as to instruct the supervising program 209 on the user device 104 to make usage supervision determinations with respect to the instance of software 111 for which the user 213 is requesting use.

FIG. 6 shows a device's (i.e., 104) tag table 210 in a preferred embodiment of the invention. Each valid tag TAG_INST_SW 120 obtained via Step 251 in FIG. 5 for each installed instance of software 111–114 is stored in the first column labeled "TAGS" in the tag table 210. The tags in the TAGS column in tag table 210 are labeled TAG_INST_SW1, TAG_INST_SW2, TAG_INST_SW3, TAG_INST_SW4 and UNTAGGED_SW. Other information in the tag table 210, which will be described in more detail, includes, for each tag, a USAGE STATUS list (Column 2), an ACTION TIME (Column 3), a RUN COUNT (Column 4), and a USE TIME (Column 5). The supervising program (SP) 209 uses the tag table information for each tag entry (i.e. each tag table row) to determine how to process a request for use of each instance of software 111–114 associated with a respective tag TAG_INST_SW.

Briefly, the USAGE STATUS column in tag table 210 generally indicates to the supervising program 209 whether an instance of software 111–114 is usable or not for a user 213 or a device 104–107. If use of software is to be allowed, the status column will indicate "CONTINUED" or "INSTALLED", while if use is to be denied, this condition is indicated by the term "GC_DISABLED". "INSTALLED" followed by "REMOVED" status terms indicate that a tag TAG_INST_SWn for an instance of software 111–114 was formerly installed on the user device 104 but is no longer installed and consequently is not usable. The ACTION TIME column indicates a time stamp (e.g., Day and Time) of the last status determination (e.g., the time of the last call-up and tag verification procedure—to be explained) performed by the supervising program (SP) 209 (FIG. 2). The RUN COUNT column in tag table 210 indicates the number of times an instance of software 111–114 associated with a tag TAG_INST_SWn (where n is a number 1 through 4 in this example) has been used on a user device 104–107. Finally, the USE TIME column in tag table 210 indicates the total elapsed time during which the instance of software 111–114 associated with TAG_INST_SWn has been used since the last call-up procedure between the device and the guardian center or, in another embodiment, since being installed.

The various fields (i.e., rows) associated with each tag (Column 1) are used by the system of this invention for various purposes explained herein. Tags serve to identify the row of the tag table 210 that the supervising program (SP)

209 must examine to determine whether a given software instance 111–114 can be properly or validly used, based on the content of that associated row. The current USAGE STATUS field of the chosen row determines whether use of the software instance (i.e., one of 111–114 in this example) is allowed.

As will be explained, when use is allowed, the supervising program (SP) 209 can track use times and run counts for the instance 111–114 being used. This information can be used to construct the event history of a user device 104–107, and can also serve other purposes such as tracking use on pay-per-use or pay-per-view instance of software 111–114. The event history is a timed record of all attempted uses, successful uses, duration of uses, and other events such as power-ups at a device. It is unlikely for two devices to have the same event history, even if they have the same software instances and the same identifiers.

In one embodiment, no two devices have the same software instances and the same tag or supervising program or device identifiers. However, knowledgeable software pirates may attempt to exactly copy the disk image of one device to another, in which case tag, device, and supervising program identifiers might be exactly duplicated. The invention contemplates avoidance of such piracy in certain embodiments by allowing at least one of the unique identifiers (i.e., one of either a software tag 120 or a supervising program identifier 209-A) to contain information such as a hardware processor identification number (i.e., processor serial number for example) which associates that identifier (e.g., tag 120 (Column 1 in FIG. 6), SP ID209-A, of device ID) with a particular processor or hardware chassis. That is, if a pirate attempts to circumvent the usage supervisional protection of the invention by duplicating the entire disk information and transferring the duplicated disk to another device, the invention can allow hardware device identification mechanisms to be incorporated into tag information and during tag validation (i.e. during call-up processing—to be explained), the hardware identification information can be checked accordingly.

It should be understood that this embodiment supplements the invention mechanisms which uses device usage statistics maintained at the guardian center 103 (FIG. 2) to track two devices trying to use the same tag information. That is, if a pirate copies a disk from a legitimate device 104 into another device (i.e. 107), it is almost impossible, according to the aspects of this invention, for the illegitimate user 213 of the pirated device 107 to use the device 107 in such a manner that exactly duplicates the use of the legitimate device 104. As such, when each device 104, 107 performs a call-up to the guardian center 103 (FIG. 2) to perform tag validation, the guardian center 103 (FIG. 2) will detect one of either device 104, 107 as having inconsistent usage or call-up statistics, with respect to the other device (i.e. the other of 104, 107). Thus, once each device 104, 107 has made a call-up, one of the devices 104, 107 will appear as fraudulently attempting software use. At that point, the system of the invention can perform punitive action contained in a continuation message (to be explained shortly) to disable one or both devices, the software on the devices, use of the devices, or any combination thereof. Reporting illegal or illegitimate use to the proper authorities (e.g., law enforcement, software vendors) can also be performed by the invention.

As an example of pay-per-use or pay-per-view, each time an instance of pay-per-use software 111–114 is used, the supervising program (SP) 209 can record this in the RUN COUNT field (Column 4) in the tag table 210 for the tag TAG_INST_SW associated with that instance 111–114. RUN COUNT information can later be used for billing purposes.

Also included in the tag table 210 is a header field HEADER_TAG_TABLE which uniquely identifies this particular tag table 210 for this particular user device 104. The header HEADER_TAG_TABLE may be unique on either a per user 213 or per user device 104 basis. If tag tables 210 are unique on a per user 213 basis, each user account (i.e., login account) on a user device 104 can have its own tag table 210 for that user 213. The per user tag table 210 can maintain the tags TAG_INST_SW for instances of software 111–114 to be used that may, for example, have been purchased by that user 213 only. In other words, while only one tag table 210 is illustrated, the invention may track tag use and usage supervision for many users 213, or each user may have a separate tag table 210.

The HEADER_TAG_TABLE preferably includes an ID_TAG_TABLE field which indicates a unique identification for this tag table 210. The ID_TAG_TABLE field preferably includes an identification of the supervising program's 209 ID(SP) 209-A. In addition, it may include the identification of the user 213 ID(USER) with which this tag table 210 is associated, as well as an identification of the user device 104 ID(DEVICE) (e.g., serial number or host-id as noted above), and an identification of the operating system 207 ID(OS).

An example of the user identification ID(USER) may be a username and/or password combination. An example of the identification of the user device ID(DEVICE) may include the hostname, host id, IP address, serial number or other hardware or device specific information that can uniquely distinguish this user device 104 from other user devices (e.g., 104–107 in FIG. 1).

ID(SP) 209-A may be, for example, comprised of information having to do with the time when a device 104–107 is first powered on based on a high precision clock (205 in FIG. 4). Two ID(SP)'s 209-A from different devices (i.e., 104, 105) will rarely be equal if the high precision clocks 205 are at microsecond accuracy. To reduce the risk of equal ID(SP)'s the ID(SP) 209-A may also include a hardware serial number if available and a number from a guardian center 103 (FIG. 2) if available. It is possible for a would-be pirate to copy the disk image in which case two devices might have the same ID(SP). As briefly noted above and as will be discussed further, this can be caught by the guardian center 103 (FIG. 2) during call-up. The operating system 207 may also have unique identification information such as serial numbers or the like which can be used for identification in the ID_TAG_TABLE field.

The header field HEADER_TAG_TABLE (top row of tag table 210 in FIG. 6) also includes a "last guardian center continuation message" field LAST_GC_CM, a "last call-up time" field LAST_CALLUP_TIME, and a "number of device power-ups" field NUMBER_DEVICE_POWERUPS. In addition, the header includes two fields having to do with the event history: the current event history: HASH (EVENT_HISTORY) and the hash of the event history as of the most recent call-up HASH(EVENT_HISTORY_AS_OF_MOST_RECENT_CALLUP)).

The LAST_GC_CM field in the header (row 1 of table 210) contains a continuation message value which is an unforgeable message from the guardian center (GC) 103 (FIG. 2) that contains an encoding of tag table 210 update information as well as actions and punitive actions specified by the GC 103 (FIG. 2) for the user device's supervising program SP. The LAST_CALLUP_TIME in the tag table 210 header is used, in combination with other tag table data, by the supervising program 209 to determine when a next call-up to the GC 103 (FIG. 2) may be required according to a CALL-UP_POLICY. The NUM_DEVICE_POWERUPS is used locally as part of the method to determine when a call-up is needed.

The event history may include information such as when each software instance 111–114 on a device 104–107 is invoked and possibly when external inputs to the user device 104–107 (i.e., user 213 interaction) occur. The purpose of the event history is to characterize a device 104–107 based on its past behavior or use of the device. This may be useful because static information such as supervising program identifiers 209-A and tags 120 may be copied from one device 104–107 to another, but dynamic information as embodied in the event history is likely to diverge even for devices 104–107 having the same static information. Since the event history can be large, a hash function value of the event history is maintained instead of the event history itself. Preferably, two event history hash function values are retained in order to allow processing to continue during a call-up procedure.

As will be explained, a continuation message CM (FIG. 2, 212; FIG. 13B, 423) is preferably also stored in the LAST_GC_CM field of the tag table header (top row of table 210 in FIG. 6). The CM 212 is a message prepared by the guardian center 103 (FIG. 2) during a call-up procedure with the user device 104 and is preferably securely transmitted by the guardian center 103 (FIG. 2) to the device 104–107 performing the call-up. A continuation message CM 212 includes information so that the supervising program (SP) on the user device 104 can determine which instances of software 111–114 are allowed to continue to be used or should be disabled because of improper use, and can also define other actions or punitive actions to be executed by the device's supervising program 209.

The LAST_CALLUP_TIME field contains a time stamp of the last call-up process (to be explained) that occurred, and the NUM_DEVICE_POWERUPS field contains the number of times that the user device 104 has been powered up. As will be explained, the supervising program (SP) 209 in each user device 104 is responsible for maintaining (though not necessarily generating) accurate information in the tag table 210, including header information such as NUM_DEVICE_POWERUPS, LAST_CALLUP_TIME, and the LAST_GC_CM continuation message. That is, a continuation message (CM) 212 (FIG. 2) is generated by the guardian center 103 (FIG. 2) and securely passed to the supervising program (SP) 209 on a user device 104. Upon receipt, the supervising program (SP) 209 is preferably responsible for parsing the continuation message (CM) 212 (FIG. 2) and updating the tag table 210 with the most recent usage supervision information (i.e., updating tag table fields).

The information in the header field HEADER_TAG_TABLE can uniquely identify the tag table 210 and can be used by the supervising program (SP) 209 to update usage supervision information for each instance of software 111–114 installed on the user device 104. The idea is that the tag table 210 for each user or each user and/or user device 104 combination is uniquely identifiable via HEADER_TAG_TABLE from other tag tables 210 for other users 213 or other user devices 104 or user/user device combinations.

When a new instance of software 111–114 and its associated tag 120 are obtained and installed or used via the steps in FIG. 5, the tag table 210 entry (i.e., the row in tag table 210) for that tag TAG_INST_SWn has the ACTION column value set to INSTALLED to indicate the instance of software 111–114 associated with that tag is newly added or installed on that user device 104. The ACTION TIME value is either left blank or indicates the time of installation. The RUN COUNT and USE TIME column values are set to zero or "0" or are left blank.

According to another aspect of the invention, usage supervision can be provided for software instances 111–114 which do not have an associated tag TAG_INST_SW (Column 1) created for insertion in the tag table 210. Any such instance 111–114 is referred to as an untagged instance of software or simply as untagged software. An example of untagged software would be user 213 created software. User created software may be legitimately created, as in the case of a user 213 writing or creating a software program or a song. User created software may also be illegitimately created, in which case it is referred to as infringing software INF_SW. It is desirable to allow a user device 104–107 to use legitimate untagged software and the invention's usage supervision enables such use. However, at the same time, according to the mechanisms of the invention, the present invention can detect and prevent use, as well as, if so desired, enact punitive actions on a user device 104–107, if that device attempts to use infringing software that is either tagged or untagged.

Infringing software INF_SW might, for example, be created as follows. A pirating vendor may create instances of pirated software by taking a legitimate specific software instance 111–114, such as a book or an application program on a CD-ROM and, and removing from the included installation program for that software all references to any required tag 120. The pirating vendor might then sells copies of the changed software (i.e., that no longer requires reference to an associated tag) under a different name as untagged software. Another example of tagless software is infringing software created by a pirate as a modified or derived version of a legitimate vendor's software SW, such as for example, an unauthorized translation of a vendor's book into another language or a recompiled version of an application program. The system of the invention prevents, tracks, and protects against the used of such unauthorized software on user devices 104–107.

To do so, the invention introduces a concept called fingerprinting. Essentially, fingerprinting produces values associated with an instance of software which are unique to the content of the software (SW) for that instance. If fingerprints of an illegally made copy of an instance of software can be obtained, the invention provides a way to detect other attempts by other user devices 104–107 to use similar illegally made copies. According to the invention, fingerprints associated with a particular piece of software are preferably when a user 213 attempts to install or use untagged software on the user device 104.

Figure 7:
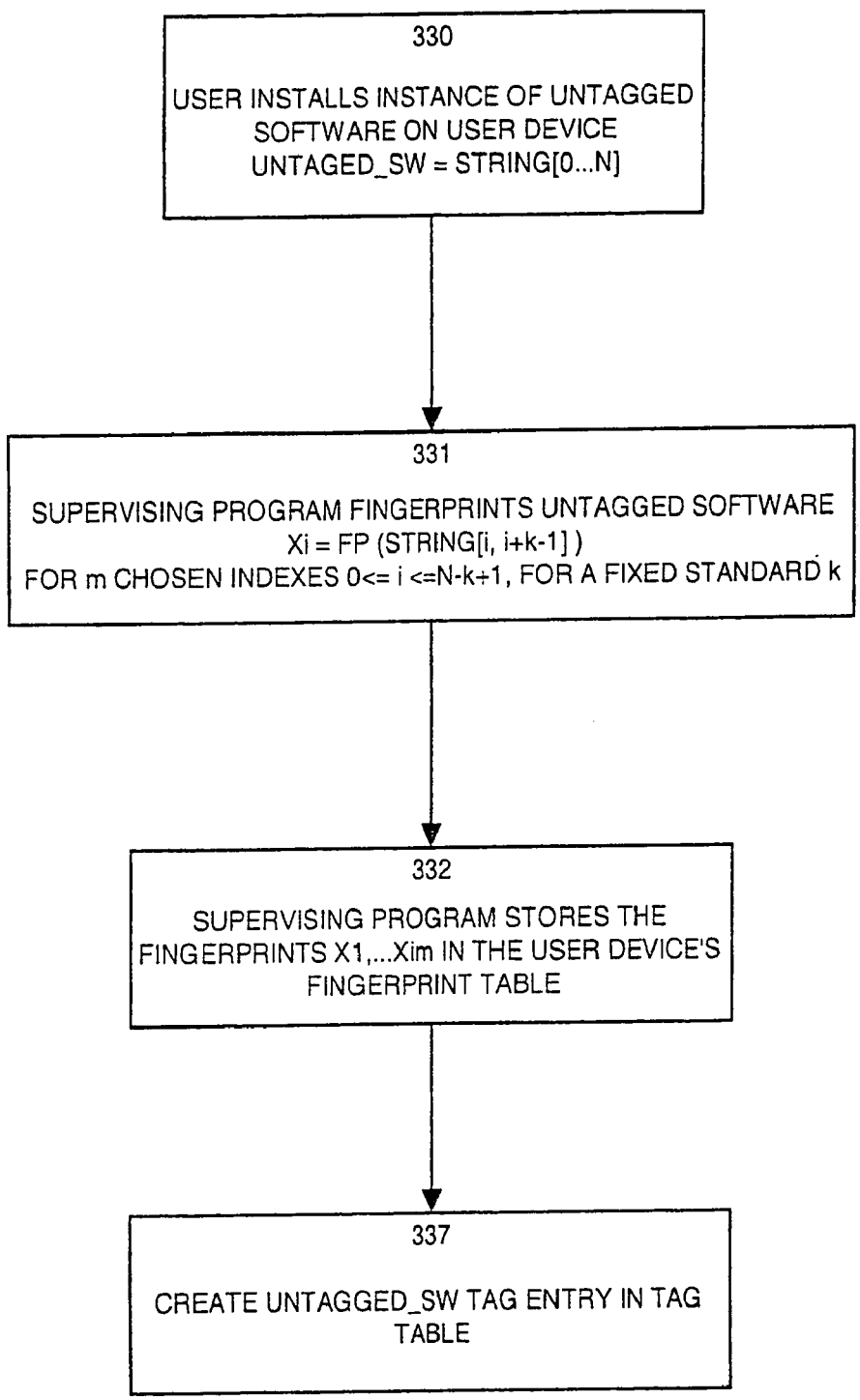
FIG. 7 is a flow chart showing the processing steps performed to install untagged software on a user device according to one embodiment of the invention.

FIG. 7 illustrates the process of installing untagged software on a user device (in this example, user device 104 will be used in the discussion). In step 330, the user 213 installs (or creates) an instance of untagged software (i.e., an untagged instance of 111–114) on the user device 104. The untagged software UNTAGGED_SW may, for example, appear simply as a string of binary data (STRING[0 . . . N]) and initially has no associated tag. Upon an attempt to use the untagged instance 111–114, in step 331, the supervising program (SP) 209 detects that no tag TAG_INST_SW exists in the tag table 210 for this instance of software and thus the supervising program (SP) 209 fingerprints the untagged software instance 111–114 using a fingerprint function FP. The fingerprint function may, for example, be a hash function.

In step 331, each fingerprint Xi is equal to the value produced by the fingerprint function FP which preferably operates on a portion of the untagged software STRING[i, i+k−1], where 0<=i<=m−k+1 for a fixed standard k. There can be m chosen indexes. In other words, a fingerprint function FP is performed on selected segments of the untagged software data STRING[0 . . . N], where N is the total length of the untagged software in bits. Preferably, the fingerprint function FP produces a number of fingerprints (m), each offset from the next. In step 332, the supervising program (SP) 209 stores the fingerprints Xi1 through Xim in the fingerprint table 210 of the user device 104.

In an alternative embodiment, fingerprints are created based on non-consecutive portions of the untagged software.

In another alternative embodiment, fingerprints are computed when software is used, based on the behavior of the software. An example of behavior may be the sequence of system calls the software makes. Game software for example may have specific patterns for writing to the screen. These patterns may be incorporated into the fingerprint of the instance of software.

Finally, in step 337, the supervising program (SP) 209 creates an untagged tag entry UNTAGGED_SW in the tag table 210 to indicate the presence of an untagged instance of software 111–114 on the user device 104. The UNTAGGED_SW tag in tag table 210 can use a hash function or other means to uniquely associate the tag UNTAGGED_SW with the untagged instance of software which was fingerprinted. Using the above described process, any attempt to use or install an untagged instance of software 111–114 on a user device 104 results in that untagged instance being fingerprinted and also results in an UNTAGGED_SW tag being created in the tag table 210.

As will be explained later, the fingerprint table 126 will be used by the guardian center 103 (FIG. 2) to detect uses of infringing software INF_SW of which the guardian center 103 (FIG. 2) has been made aware. Details of the use of the fingerprint aspect of this invention will be discussed in more detail later.

Figure 8:
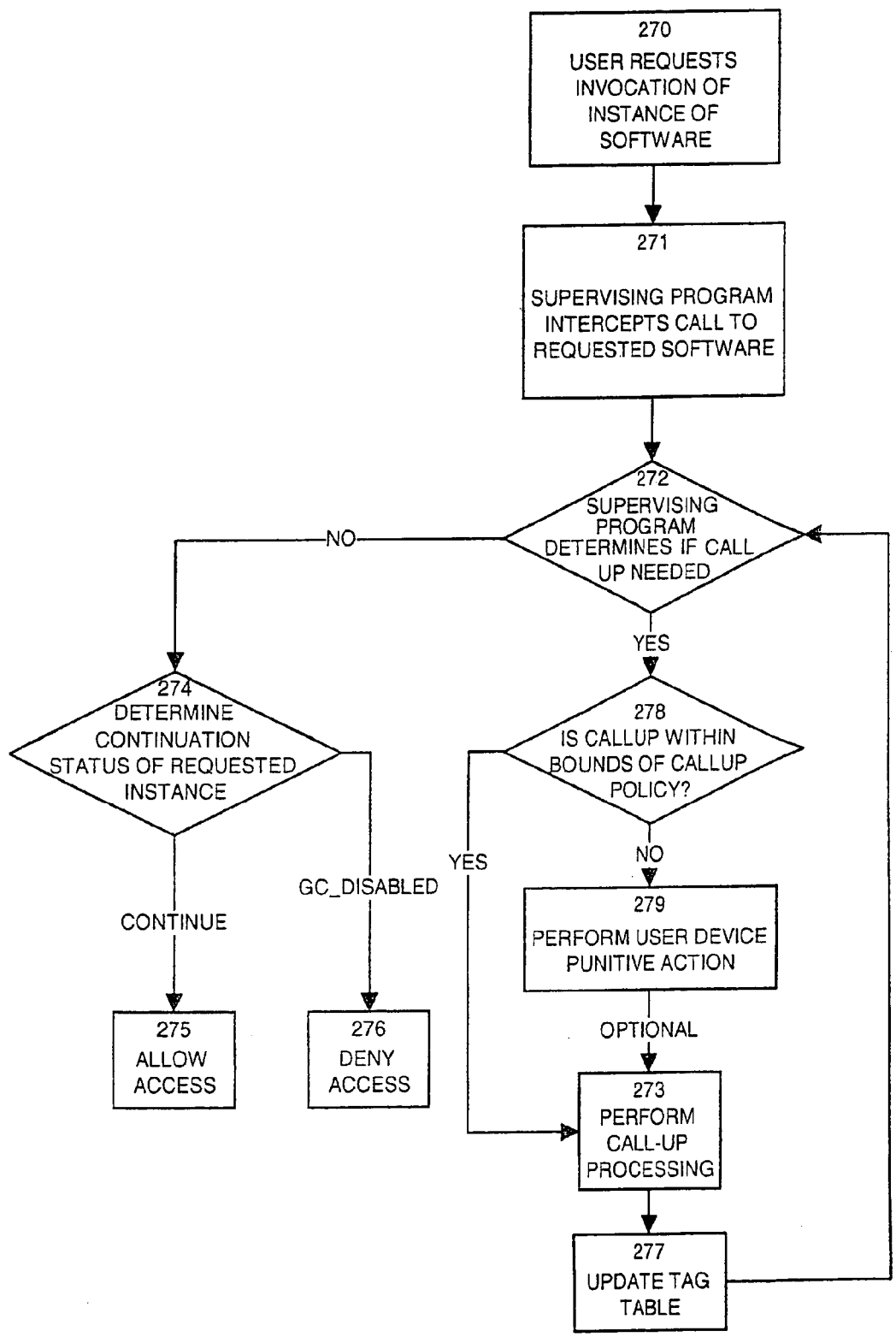
FIG. 8 is a flow chart showing high level processing steps performed by the system of this invention to implement software usage supervision according to one embodiment of the invention.

FIG. 8 shows the high level steps performed by the system 109 of this invention when a user 213 attempts to use an instance of software (INST_SW) 111–114 on a user device 104. In step 270, the user 213 interfaces with the user input/output mechanism 204 on the user device 104 to use an interface of the software 111–114. In step 271, the supervising program (SP) 209 intercepts the call to invoke use of the instance of software 111–114. At this point, the supervising program (SP) 209 will ensure that the instance of software 111–114 requested has a tag TAG_INST_SW that indicates a "CONTINUED" status in the tag table 210. However, before checking the individual tag TAG_INST_SWn, in a preferred embodiment, the supervising program (SP) 209 ensures that the tag table 210 itself is in a valid or updated state. By valid state, what is meant is that the tag table 210 is not outdated and in need of a call-up procedure to update its contents. Accordingly, in step 272, the supervising program (SP) 209 accesses the tag table 210 to determine if a call-up to the guardian center 103 (FIG. 2) is required at the current time.

In an alternative embodiment, if a fingerprint is included in the tag, the supervising program SP 209 may check that the software instance being used is properly associated with this tag by using a same location fingerprint.

Periodically, a call-up process is performed by the system of the invention to effectively re-authenticate the validity and enforce the usage supervision policy of each tag TAG_INST_SWn in the tag table 210. The call-up process takes place between the guardian center 103 (FIG. 2) and the user device(s) 104. There may be many triggering events that can cause a call-up to be made to the guardian center 103 (FIG. 2).

For example, the call-up determination made in step 272 by the supervising program (SP) 209 can be made by examining the LAST_CALL-UP_TIME field in the tag table header HEADER_TAG_TABLE. If the time stamp in LAST_CALL-UP_TIME has exceeded a certain elapsed time, then a call-up to the guardian center 103 (FIG. 2) is needed and is made by proceeding to step 273 where call-up processing is performed. Alternatively, there may be a call-up policy (CALL-UP_POLICY) for the tag table 210 itself which defines a set of rules or conditions that must be met in order for a call-up to be required.

In other embodiments, there may be call-up policies (CALL-UP_POLICY_SW) associated with individual instances of software 111–114. In this case, step 272 can examine the rules or tests of the call-up policy (CALL-UP_POLICY_SW) associated with the software content SW or the instance of software (INST_SW) 111–114 that was requested access by a user 213 in step 270. In another embodiment, if the user 213 of a user device 104 attempts to use an untagged instance of software, step 272 may mandate that a call-up is needed. In another embodiment, if the user 213 of a user device 104 uses tagged software for the first time, then step 272 may mandate that a call-up is needed. In another embodiment, the maximum allowed interval between successive call-up procedures is preferably determined by a combination of elapsed time in a user device 104, the number and duration of uses to instances of software 111–114, the number of times the device 104 is powered on, and/or by any other measure that is related to time or use of the device 104.

Call-up processing will be discussed in more detail later. Essentially however, during call-up processing, the supervising program (SP) 209 in a user device 104 securely transfers a copy of the tag table 210 and the fingerprint table 126 to the guardian center 103 (FIG. 2). After verification, the guardian center 103 (FIG. 2) compares each tag TAG_INST_SWn in the tag table 210 against a list of compromised tags. The guardian center 103 (FIG. 2) can detect tags that are invalid or compromised in some manner.

A usage supervision policy POLICY(TAG_INST_SW) associated with each tag can also be checked at the guardian center 103 (FIG. 2) to ensure that tags 120 (and therefore instances of software associated with the tags) are being used in compliance with the usage supervision policy POLICY(TAG_INST_SW). The policy may be for an entire user device 104–107 or on a per user 213 or per tag 120 basis. Also, for untagged software, the fingerprint table 126 can be compared against a fingerprint data structure (explained later) in the guardian center 103 (FIG. 2) to detect uses of infringing software INF_SW. After analysis of the tag table 210 and fingerprint table 126 are complete, the guardian center 103 (FIG. 2) prepares and sends a continuation message (CM) 212 (FIG. 2) back to the user device 104.

In an alternate embodiment, tagged software may also be checked by fingerprinting. This embodiment prevents a pirating vendor from distributing instances of specific software that is infringing on intellectual property or other rights of a legitimate vendor (i.e., 101), as tagged software, i.e. accompanied by legitimate tags obtained from a tag server 102. In this embodiment the user device's 104–107 supervising program 209 performs a fingerprinting process on tagged software instances 111–114 as well, and stores the computed fingerprints in its fingerprint table 126. During a call-up procedure, the fingerprints obtained from tagged software instances 111–114 used on the user device 104–107 will also be sent to the guardian center 103 (FIG. 2) to detect use of infringing software.

The continuation message (CM) 212 (FIG. 2) contains various information that can affect the operation of instances of software 111–114 on a user device (e.g., 104), or operation of the user device 104 itself. For example, if the guardian center 103 (FIG. 2) detects an invalid tag TAG_INST_SWn in a tag table 210 for a user device 104, the continuation message (CM) 212 returned to that user device 104 may cause the user device 104 to become inactivated or disabled for a specified period of time or indefinitely. Alternatively, the continuation message (CM) 212 may cause the user device 104 to inactivate use of the particular instance of software (INST_SW) 111–114 associated with an invalid tag 120.

The action(s) taken at a user device 104 are defined in an ACTIONS portion of the continuation message (CM) 212, and will be described in more detail later. The continuation message 212 is also used by the supervising program (SP) 209 in the user device 104 to update information in the tag table 210. For example, the ACTION TIME column of that tag table 210 may be updated with a time stamp of the most recent continuation message (CM) 212, thus providing an indication of when each tag TAG_INST_SWn was most recently checked by the guardian center 103 (FIG. 2).

Continuing with the description of the processing in FIG. 8, after call-up processing is complete in step 273, the tag table 210 is updated on the user device 104 in step 277 (i.e., via the continuation message 212), and processing returns to step 272.

Once the user device 104 determines that a call-up to the guardian center 103 (FIG. 2) is not required at this time, processing proceeds to step 274 to determine the usage status of the particular instance of software 111–114 for which use was requested by a user 213 in step 270.

In step 274, the supervising program (SP) 209 in the user device 104 essentially examines the USAGE STATUS column in the tag table 210 for the tag TAG_INST_SWn associated with the requested instance of software 111–114. If the USAGE STATUS column indicates "CONTINUED", then the supervising program (SP) 209 signals to the kernel 208 of the operating system 207 to allow use of the requested instance of software 111–114 in step 275. If the USAGE STATUS column in the tag table 210 for the tag (TAG_INST_SWn) associated with the requested instance of software 111–114 indicates "GC_DISABLED" or "REMOVED", then the supervising program 209 denies use of the instance of software 111–114 in step 276.

If use is allowed to the requested instance of software 111–114, the supervising program (SP) 209 increments by one the value in the RUN COUNT column for the tag TAG_INST_SWn associated with the requested instance of software 111–114. The supervising program (SP) 209 also tracks the amount of time that the requested instance of software 111–114 is in use and updates the USE TIME column for the tag accordingly.

FIG. 9 illustrates a preferred embodiment of the architecture of the guardian center 103 (FIG. 2). The guardian center 103 (FIG. 2) includes a bus 306 which couples a processor 301, a memory 302, an interconnection mechanism 303, a clock 304 and a guardian center authorization database 300.

The guardian center 103 (FIG. 2) is preferably a high-powered computer system such as a multi-processor server which can perform many transactions for multiple processes at one time. The interconnection mechanism 303 is, for example, a modem bank or one or more high bandwidth network connections allowing the guardian center 103 (FIG. 2) to communicate with many user devices 104 simultaneously via communication network 100.

The guardian center's 103 (FIG. 2) authorization database (GCDB) 300 is preferably a large database sub-system or disk or RAID array having the capability to store vast amounts of information. In this embodiment, the GCDB includes a tagged software database 138 (FIG. 9) which holds data for instances of tagged software, and a fingerprint data structure 137. The tagged software database 138 (FIG. 9) includes call-up records (FIG. 10, 320, 321) for each tagged instance of software on each user device 104. The content and use of each of these databases 137 and 138 (FIG. 9) will be explained in more detail shortly.

During operation of the guardian center 103 (FIG. 2), memory 302 is used to store a verification program (VRP) 315 which executes in conjunction with processor 301 to perform the guardian center functions described herein. Memory 302 also stores user device tag tables 210 and fingerprint tables 126 which get transferred to the guardian center 103 (FIG. 2) for tag verification and usage supervision determination during the call-up procedure explained briefly above.

FIG. 10 shows the data structures 320, 321 maintained in the tagged software database 138 (FIG. 9) in the guardian center 103 (FIG. 2) for each instance of tagged software (e.g., 111–114). The tag data structure 320 is initially provided to the guardian center 103 (FIG. 2) from the tag server 102 upon creation of tags 120 for each instance of software 111–114. Preferably, the manner in which the tags 120 are provided to the guardian center 103 (FIG. 2) from the tag server 102 is via electronic and secure distribution over the communication network 100. Alternatively, software vendors 101 can be responsible for ensuring that the guardian center 103 (FIG. 2) is kept aware of tag information for each instance of software 111–114 that is distributed to user devices 104–107.

A tag data structure 320 exists in the tagged software database 138 (FIG. 9) for each instance of software that is used on a user device 104. As illustrated, each tag data structure 320 includes various fields. These fields include the tag for that instance of software TAG_INST_SW, the usage supervision policy POLICY(TAG_INST_SW) for that software, and a list of references to one or more call-up records CALL-UP_RECORDn 321 for that instance of software.

The policy POLICY(TAG_INST_SW) associated with a tag TAG_INST_SWn for an instance of software 111–114 is prescribed by the software vendor 101 or another organization and defines the rules and policies with respect to the protection of usage rights or pay-per-use access limitations for the instance of software associated with that tag. For example, for a tag data structure 320 associated with a specific instance of software 111–114, the POLICY(TAG_INST_SW) data may include a rule stating that for each use to the instance of software, the user device 104 must pay a prescribed fee.

During call-up processing (to be explained shortly), when the guardian center 103 (FIG. 2) receives the tag table 210 from a user device 104, the number of times a particular instance of software 111–114 has been used by that user device 104 can be determined from the RUN COUNT column of the tag TAG_INST_SWn associated with the tag TAG_INST_SWn for that instance of software in the tag table 210. The guardian center 103 (FIG. 2) can then look to the policy POLICY(TAG_INST_SW) for the tag data structure 320 associated with that software TAG_INST_SWn in the tagged software database 138 (FIG. 9). The guardian center 103 (FIG. 2) can determine if the number of uses as indicated by the RUN COUNT field in the tag table 210 is greater than a previous number obtained from a former call-up process. If the number is greater, the guardian center 103 (FIG. 2) can record this information for billing purposes to be sent to the owner or user 213 of the user device 104.

Other usage supervision policies POLICY(TAG_INST_SW) may be defined to cause the guardian center 103 (FIG. 2) to allow only a certain number of uses to a particular instance of software 111–114. When the number of uses is exceeded, the guardian center 103 (FIG. 2) can cause the USAGE STATUS field associated in the user device's tag table 210 with the tag associated with the above instance of software, to be set to the value "GC_DISABLED". The change is effected at the user device 104 by specifying the appropriate information in the continuation message (CM) 212 sent from the guardian center 103 (FIG. 2) to that user device 104 after analysis of tag table 210. When the user device 104 attempts to use the instance of software 111–114 associated with the tag TAG_INST_SWn that is disable (i.e., TAG_INST_SW3 in Tag Table 210 in FIG. 6), use will be denied as explained above in FIG. 7.

Each tag data structure 320 in the tagged software database 138 (FIG. 9) within the guardian center 103 (FIG. 2) includes a number of references to call-up records CALL-UP_RECORDn 321 as shown in FIG. 10. A call-up record CALL-UP_RECORDn 321 includes a call-up time CALL-UP_TIME, the header field HEADER TAG_TABLE from the tag table 210 of the calling user device 104, an optional hash function value of the tag table 210 HASH(TAG_TABLE), and an ACTIONS field. Thus, there is one CALL-UP RECORD per call-up, regardless of the number of tags sent.

The CALL-UP_TIME field indicates the time-stamp of the call-up for the current CALL-UP_RECORDn. The HEADER_TAG_TABLE contains the tag table header of the tag table 210 that contains the TAG_INST_SWn for this tag data structure 320 as received from the calling user device 104 during the call-up procedure n. The HASH (TAG_TABLE) field contains an unaliasable hash function value computed on all of the data in the tag table 210 which included the tag TAG_INST_SWn associated with the tag data structure 320. Finally, the ACTIONS field lists the actions prescribed by the guardian center during the call-up procedure n, to be performed for the instance of software 111–114 that is associated with a tag TAG_INST_SW for the tag data structure 320. Using the tag data structures 320 for each instance of software 111–114, the guardian center 103 (FIG. 2) can maintain detailed information related to usage supervision mechanisms for instances of software 111–114 used via user device(s) 104.

Figure 11:
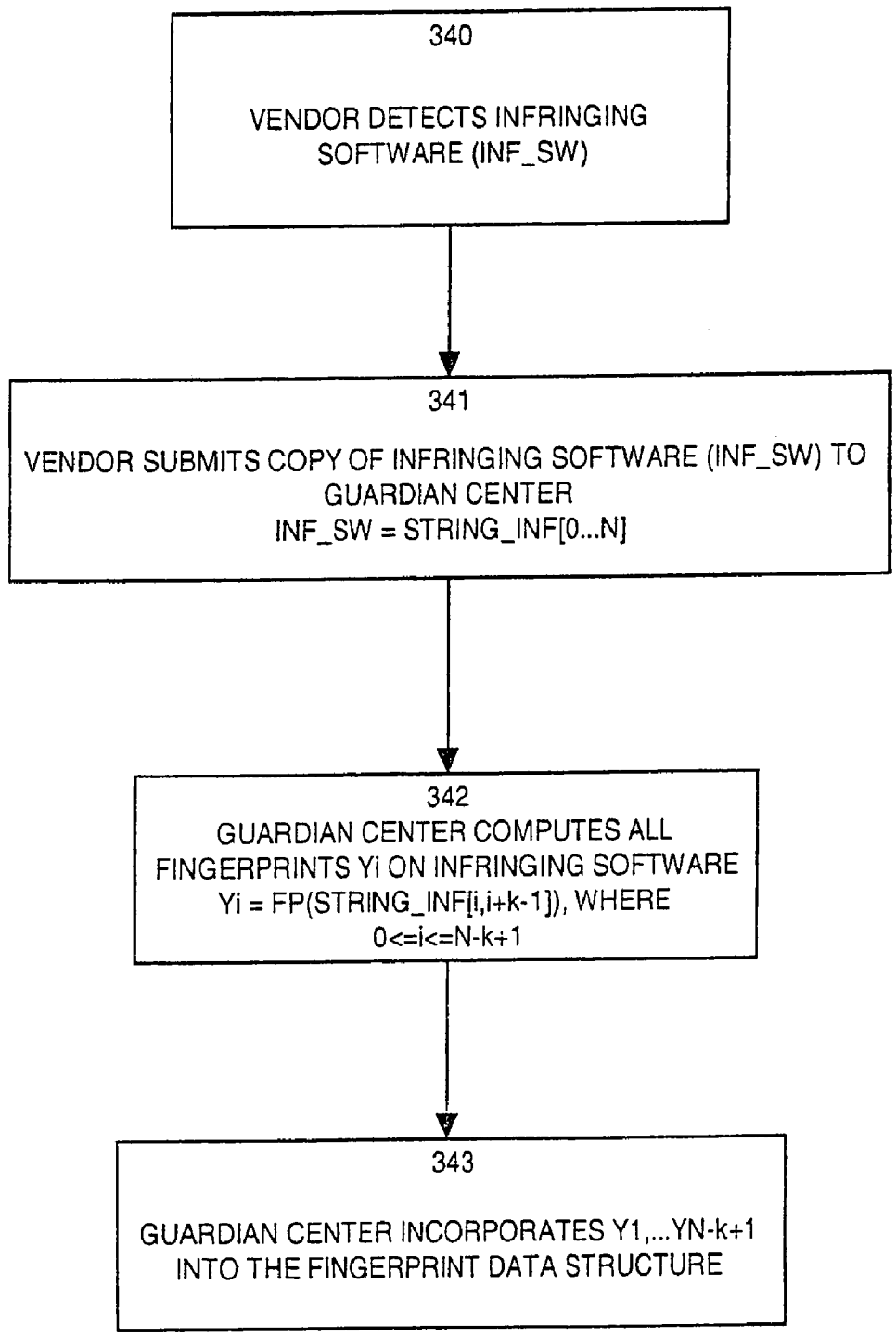
FIG. 11 is a flow chart of the processing performed by a guardian center, according to one embodiment of the invention, when a vendor detects software that infringes on the vendor's rights in some of his software.

FIG. 11 shows the processing steps which result in the creation of the fingerprint data structure 137 maintained within the guardian center 103 (FIG. 2). As previously noted and explained with respect to FIG. 7, fingerprints are created and stored in a fingerprint table 126 within each user device 104 when untagged software, and possibly also tagged software, is first used on the user device 104. According to this invention, software pirates may infringe upon legitimate vendor rights by either copying vendor software and removing the part of the software that requests confirmation of a tag or by creating and distributing derivatives of legitimate software. The software thus produced is called infringing software INF_SW. The fingerprint data structure 137 created within the guardian center 103 (FIG. 2) will contain fingerprints computed on an infringing instances of software INF_SW.

In FIG. 11, in step 340, the software vendor 101 detects the existence of an instance of infringing software (INF_SW). In step 341, the software vendor 101 submits a copy of the instance of infringing software INF_SW to the guardian center 103 (FIG. 2). The infringing software is merely a string of binary digits (bits) appearing as STRING_INF[0 . . . N]. In step 342, the guardian center computes a collection of fingerprints Yi on the instance of infringing software, using the same fingerprint formula FP as the supervising program(s) (SP) 209 on each of the user device(s) 104 use to compute fingerprints. That is, a series of fingerprints Yi are computed as follows:

$$Yi=FP(STRING\_INF[i,i+k-1])$$

where $0<=i<=n-k+1$, with n–k being the number of fingerprints to compute. Then, in step 343, the guardian center 103 (FIG. 2) incorporates each of the computed fingerprints Y1, . . . Yn–k+1 into the fingerprint data structure 137 in the GCDB 300. In an alternative embodiment, fingerprints are computed on non-consecutive sequences of STRING_INF, those sequences being unique or nearly unique to INF_SW.

The fingerprint process is then complete at the guardian center 103 (FIG. 2) and the infringing software INF_SW can be discarded or can be made available to other guardian centers 103 (FIG. 2) elsewhere on this or another communication network 100.

At this point, when the supervising program (SP) 209 on a user device 104 detects a request to use an untagged (and possibly infringing) instance of software UNTAGGED_SW 111–114, the supervising program (SP) 209 records fingerprints of UNTAGGED_SW. Later when the SP 209 performs a call-up procedure to transfer the tag table 210 and the fingerprint table 126 to the guardian center 103 (FIG. 2), the recorded fingerprints of UNTAGGED_SW will be sent. In one embodiment, an access request on a user device 104–107 to use the untagged instance may cause the call-up to occur. Using general-location fingerprinting, the fingerprints in the fingerprint table 126 can be compared to the fingerprints in the fingerprint data structure 137 at the guardian center 103 (FIG. 2). If the software instance UNTAGGED_SW is a copy of an infringing software instance INF_SW that the guardian center 103 (FIG. 2) has been made aware of and has fingerprinted on its own, this will be detected and punitive action can be carried out on the user device 104 via return of a continuation message 212. In another embodiment, the system-call behavior (i.e. the sequence of system calls) of UNTAGGED_SW on user device 104 is compared with the system call behavior expected of INF_SW on the guardian center 103 (FIG. 2). In another embodiment, the steps detailed in the last two paragraphs are applied also in the case of a request on a user device for use of tagged software.

Aside from the fingerprintng aspects of this invention, during a call-up procedure to be explained next, the verification program 315 in the guardian center 103 (FIG. 2) also reads and compares the information in the tag table 210 with information in the tag software database 138 (FIG. 9) to make usage supervision decisions.

FIG. 12 illustrates the steps performed by the supervising program (SP) 209 executing on a user device 104 to perform a call-up procedure in a preferred embodiment of the invention. The steps in FIG. 12 are performed within step 273 in FIG. 8.

In step 370 in FIG. 12, the supervising program (SP) 209 calls up the guardian center 103 (FIG. 2). By call-up, what is meant is that the supervising program (SP) 209 on the user device 104 connects with or exchanges messages with the guardian center 103 (FIG. 2) via communication network 100. In the preferred embodiment, the supervising program (SP) 209 sends the HEADER_TAG_TABLE to the Guardian Center 103 (FIG. 2). The Guardian Center 103 (FIG. 2) causes a call-up failure unless the previous continuation message consisting of the ID_TAG_TABLE of the device, the time as of the last call-up LAST_CALLUP_TIME is equal to CALLUP_TIME of the most recently CALL_UP record having this same HEADER_TAG_TABLE. An advantage of this embodiment is that even if several devices 104–107 have the same ID_TAG_TABLE (Row 1 of the tag table 210 in FIG. 6) and the same tags 210 (an occurrence that is normally due to piracy), those same devices may have received, but will not properly accept the same continuation message 212 for a reason to be explained below, so only one device (i.e., one of 104–107) will send a particular HEADER_TAG_TABLE.

A call-up is made in accordance with the CALL-UP_POLICY or CALL-UP_POLICY(TAG_INST_SW) as explained above in response to a user's attempt to use an instance of software 111–114 on a user device 104–107. That is, when the user 213 attempts to use an instance of software 111–114 for which the time allowed before the next call-up according to the CALL-UP_POLICY of the user device 104 or the CALL-UP_POLICY(TAG_INST_SW) of the software (SW) for that instance has expired, the supervising program 209 on that device 104–107 initiates step 370. In another embodiment, the SP 209 executes a call-up procedure at a chosen time before the expiration time, regardless of whether a use of an instance of software 111–114 is requested. The CALL-UP_POLICY can be maintained within the supervising program 209 on the user device 104. In addition, it is possible that a call-up may occur because a portion of the supervising program 209, executing regardless of use requests, determines that it is time to perform a call-up. For example, it may take place as the result of a certain number of BOOTUPS (power-ups) of a user device 104–107 having taken place or the first use of untagged software.

If the call-up to the guardian center 103 (FIG. 2) in step 371 fails, then processing proceeds to step 376 where punitive action may be performed by the supervising program (SP) 209 on the user device 104. In the preferred embodiment, the supervising program (SP) 209 will perform a new call-up, retrying several times before beginning punitive action. In the case that punitive action is necessary in step 376, the punitive action may merely be to inform the user 213 that the instance of software 111–114 that was requested is temporarily inaccessible due to a communications failure.

If the call-up is successful and a connection is established to the guardian center 103 (FIG. 2) from the user device 104, then in 372, the supervising program (SP) 209 preferably securely sends or transmits the tag table 210 from the user device 104 to the guardian center 103 (FIG. 2). In an alternative embodiment, the supervising program (SP) 209 also sends the fingerprint table 126 to the guardian center 103 (FIG. 2) as well. That is, the fingerprinting aspects of this invention may or may not be incorporated into an embodiment in order to detect the use of user created or user modified infringing software.

After step 372 is complete, the supervising program (SP) 209 enters a wait state until a continuation message (CM) 212 is sent and received from the guardian center 103 (FIG. 2). Alternatively, the supervising program SP 209 may go into a sleep state after step 372 is complete and run again following an interrupt from the Operating System (OS) 207. In an alternative embodiment, the supervising program SP could continue to process requests from the user. Guardian center 103 (FIG. 2) call-up processing will be explained shortly with respect to FIGS. 13A and 13B. When the guardian center 103 (FIG. 2) has completed its call-up procedure processing, a continuation message (CM) 212 is sent to the user device 104.

In step 373, the supervising program (SP) 209 checks for the return of a continuation message 212 as defined in the call-up policy CALL-UP_POLICY of the user device 104. As an example of checking for a continuation message (CM) 212 within the call-up policy CALL-UP_POLICY, step 373 may ensure that no more than a certain amount of elapsed time goes by before receiving the continuation message (CM) 212. If too much time elapses before receipt of a continuation message 212, the call-up policy may be violated.

Other factors can be used to determine if a call-up violation exists as well, such as the inability to validate a digital signature in the continuation message 212. Another factor determining a call-up violation is that the HASH (EVENT_HISTORY) field in the continuation message 212 is not the same as the hash of the event history recorded in the user device 104 as of the time of the last call-up, HASH (EVENT_HISTORY_AS_OF_MOST_RECENT_CALLUP). This might arise if there are two devices 104–107 having the same configuration and ID_TAG_TABLE, due to piracy, but only one performs a call-up. Because of the event history, only one of the devices 104–107 would accept the continuation message 212. The other device would have to do its own call-up and this would lead to a call-up failure because the HEADER_TAG_TABLE (Row one in Table 210 in FIG. 6) would match on ID_TAG_TABLE but would fail to match on call-up time, as explained above.

If the CALL-UP_POLICY is violated in step 373, processing proceeds to step 376 and punitive action can be performed at the user device 104. In this case, punitive action may include notifying the user 213 that a call-up cannot proceed and that the instance of software 111–114 requested must be temporarily denied access or disabled. Alternatively, the user device 104 can be deactivated for some time.

If step 373 determines that a continuation message (CM) 212 is received and is acceptable as being within the limitations defined in CALL-UP_POLICY, in step 374, the continuation message (CM) 212 is passed to the supervising program (SP) 209. Then, in step 375 the supervising program (SP) 209 verifies the continuation message (CM) 212 via a digital key signature technique and executes each action in the continuation message 212 for each tag TAG_INST_SWn in the tag table 210 of the user device 104. That is, the supervising program (SP) 209 updates the USAGE STATUS and ACTION TIME columns for each tag TAG_INST_SWn in the tag table 210. In this manner, the system 109 of the invention allows the user device 104 to periodically obtain tag table 210 updates from the guardian center 103 (FIG. 2).

Since the supervising program (SP) 209 serves as an interface between the user 213 and the instances of installed software 111–114 on a user device 104, the supervising program 209 implements the usage supervision mechanisms described herein preferably on the user device 104. By requiring the tag TAG_INST_SWn for an instance of software 111–114 to be in a "CONTINUED" usage status state, which can be changed only during call-up processing, usage supervision is ultimately managed by one or more guardian centers 103 (FIG. 2). The guardian center(s) 103 (FIG. 2) are responsible for determining whether or not a tag in a tag table 210 for a user device 104 should be in a "CONTINUED" or "GC_DISABLED" state as per policies defined for tags and fingerprints.

Figure 13A:
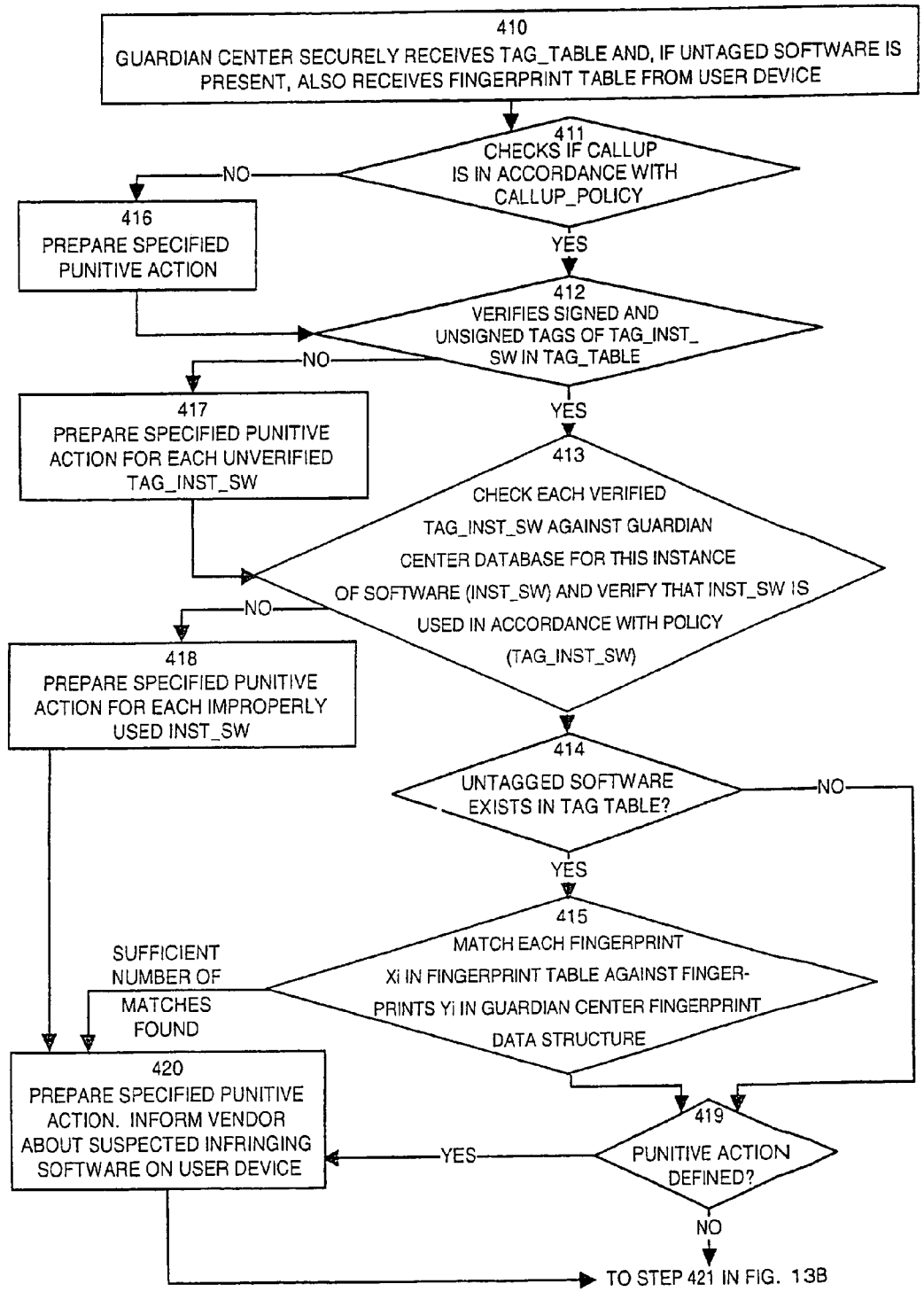
FIGS. 13A and 13B show a flow chart of the guardian center call-up processing steps that are performed according to one embodiment of the invention.
Figure 13B:
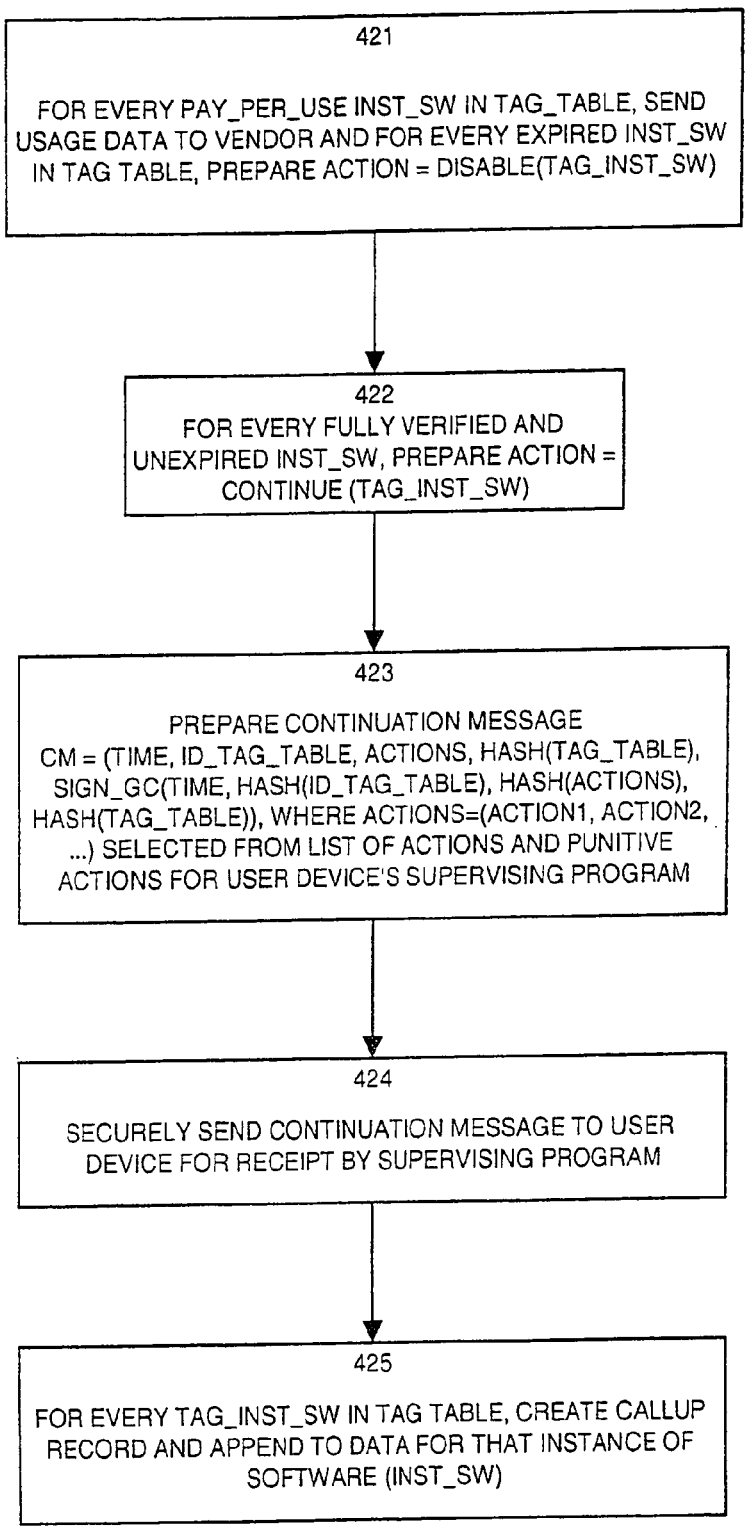

FIGS. 13A and 13B present one continuous flow chart that show the steps performed by the verification program (VRP) 315 in the guardian center 103 (FIG. 2) during call-up processing according to a preferred embodiment of the invention. The guardian center 103 (FIG. 2) is made aware of a call-up procedure when a user device 104 (i.e., supervising program 209) makes the initial call-up processing connection or contact with the guardian center 103 (FIG. 2) in step 370 of FIG. 12. In response thereto, in step 410 of FIG. 13A, the verification guardian center 103 (FIG. 2) receives the tag table 210. The guardian center 103 (FIG. 2) also receives the fingerprint table 126 from the user device 104 if there is any software on the user device 104 that is installed but not tagged with a tag TAG_INST_SWn in the tag table 210. Again, the fingerprint aspects of the invention are optional but are provided in a preferred embodiment of the invention, because they permit the detection of infringing software.

In an alternative embodiment, the guardian center 103 (FIG. 2) may receive a portion of the tag table 210 only, such as, for example, the HEADER_TAG_TABLE and a portion of the tags (column 1) in the tag table 210. The tags 120 received can be those that the guardian center 103 (FIG. 2) requests or can be chosen at random or may be only the tags 120 that the user device needs for use of instances of software at that moment. Another possibility is that the tags 120 can correspond to those instances of software that are pay-per-use or have a fixed number of uses. The advantage of this alternative is that it reduces both the communication costs and the processing costs.

In another alternative embodiment, the guardian center 103 (FIG. 2) receives the HEADER_TAG_TABLE (top row of tag table 210 in FIG. 6) only. This embodiment makes guardian center call-ups inexpensive and can work well when each TAG_INST_SW includes an ID_TAG_TABLE field, as will be explained below. Returning now to a description of call-up processing with respect to FIG. 13A, in step 411, the guardian center 103 (FIG. 2) checks to ensure that the call-up is in accordance with the call-up policy CALL-UP_POLICY associated with the user device 104. Call-up policies CALL-UP_POLICY(s) for user devices 104–107 are preferably maintained at the guardian center 103 (FIG. 2), and/or may be provided from the software vendors 101 or user device manufacturers (not shown) from time to time to instruct the guardian center 103 (FIG. 2) how to determine how frequently a user device 104 must call up to verify and update its tag table 210.

Step 411 can be performed using, for example, HEADER_TAG_TABLE information fields such as the unique identification of the tag table 210 contained in the ID_TAG_TABLE field. If the call-up is not in accordance with the CALL-UP_POLICY, step 416 prepares specified punitive action(s) to be carried out by the supervising program (SP) 209 when the continuation message (CM) 212 is returned from the guardian center 103 (FIG. 2) to the user device 104.

Processing proceeds to step 412 from both steps 416 and 411, at which point the verification program 315 verifies the signed and/or unsigned tags TAG_INST_SWn in the tag table 210. The verification performed in step 412 may be a digital signature verification for the signed tags TAG_INST_SW in the tag table 210. For the unsigned tags, the HASH_INST_SW value may be used to check that the secret number NUM_INST_SW within the tag TAG_INST_SW is consistent with HASH_INST_SW for that tag. This is possible because HASH_INST_SW is a hash function value that is computed partly from NUM_INST_SW. In addition, NUM_INST_SW must be found in SPARSE_SET and must be associated with NAME_SW of TAG_INST_SW.

Each each unverified tag TAG_INST_SWn detected in step 412, step 417 prepares a specified punitive action based on the usage supervision policy POLICY(TAG_INST_SW) associated with the instance of software 111–114 for the unverified tag TAG_INST_SWn. Punitive action in this case may include instructions to disable the user device 104. Note that the punitive action specified in step 417 will be carried out after it is communicated to the user device 104.

Usage supervision policies POLICY(TAG_INST_SW) associated with instances of software 111–114 are maintained at the guardian center 103 (FIG. 2), and may be provided from the software vendors 101 from time to time to instruct the guardian center 103 (FIG. 2) how to handle usage supervision for the various instances of software 111–114 produced by the software vendors 101. That is, the software vendors 101 can provide the instances of software 111–114 to 104–107 (for a fee for example). To enforce use restrictions on those instances 111–114, the software vendors 101 can create the policies POLICY(TAG_INST_SW) for the instances 111–114 and can provide these policies to the guardian centers 103 (FIG. 2). During call-up procedures, the guardian centers enforce or police the policies CALL_POLICY(TAG_INST_SW). As an alternative embodiment, the policy for one instance of software (i.e. 111) may differ from that for another instance (i.e. 112) of that same software, assuming 111 and 112 have the same software content SW. This enables the invention to enforce usage supervision, for example, differently for two users of the same program, since each instance has its own associated tag and call-up policies can be maintained on an instance by instance or user by user basis.

In any event, at the guardian center 103 (FIG. 2), after each tag TAG_INST_SW in the tag table 210 is verified for authenticity (Step 412), or after punitive action is prepared for each unverified tag (Step 417), processing proceeds to step 413 where each verified tag TAG_INST_SWn in the tag table 210 is checked against the tagged software database 138 (FIG. 9). Essentially, step 413 checks that each tag TAG_INST_SWn in the tag table 210 associated with an instance of software 111–114 used on the user device 104 (i.e., the user device performing call-up processing) is being used in accordance with the usage supervision policy of the instance of software POLICY(TAG_INST_SW). After each tag is tested in step 413, processing proceeds to step 414.

The checking process performed in step 413 can be performed in a variety of ways. According to one embodiment, the tagged software database 138 (FIG. 9) contains a list of associations between tags TAG_INST_SWn and supervising program identifiers (209-As) and the times that these associations were discovered. In this embodiment, the verification program (VRP) 315 can compare the tags in the tag table 210 against the list of TAG_INST_SW-HEADER_TAG_TABLE-CALLUP_TIME associations to determine whether the same tag 120 (Column 1 in table 210) is on two devices 104–107. If a tag 120 is found associated with several HEADER_TAG_TABLEs, punitive action can be prepared in step 418.

In a preferred embodiment of the invention, the guardian center's verification program VRP 315 employs the data structure (FIG. 10, 320, 321) associated with a tag 120 TAG_INST_SW to check whether the instance of software 111–114 associated with that tag 120 was used on the calling user device 104 in accordance with the usage supervision policy POLICY(TAG_INST_SW) specified for that instance of software 111–114. For example, if the usage supervision policy specifies that the same instance of software, (i.e. the same tag), must not be present on two different user devices, (e.g. 104 and 105), in a usable status (e.g., USAGE STATUS=CONTINUED) at the same time, the detailed data in the call-up records 321 for the tag enables the VRP 315 to check whether the policy was violated.

After each tag 120 TAG_INST_SWn in the tag table 210 has been checked by step 413, the tags 120 in tag table 210 may or may not have associated punitive action that has been specified in relation to those tags. If punitive action has been specified due to an improperly copied tag or a tag that is not used in accordance with a usage supervision policy, processing proceeds to step 420 where the verification program VRP 315 in the guardian center 103 (FIG. 2) prepares and sends the specified punitive action back to the user device 104 via a continuation message (CM) 212. Such a continuation message (CM) 212 is used to impose punitive action on a user device 104 and contains "GC_DISABLED" action values for the USAGE STATUS fields of all tags TAG_INST_SWn in the tag table 210 that are in violation of the policy POLICY(TAG_INST_SW).

Note that in the preferred embodiment, if at least one tag TAG_INST_SW violates the usage supervision policy POLICY(TAG_INST_SW) or is found to exist in the compromised tag list in the tagged software database 138 (FIG. 9) then punitive action is specified in step 418 and is enacted in step 420 without further continued processing. In an alternative embodiment, punitive action can be specified for each compromised or policy-violating tag TAG_INST_SW in step 418 and processing may be directed to continue to step 414.

As an alternative treatment of tagged software, the above tag processing can occur on only a portion of the tag table. For example, processing may be done only on those tags for which the user device 104–107 (i.e. the supervising program 209 on the user device) is requesting access (i.e., the instance(s) of software attempting to be used). In this case, the continuation message 212 would specify continued or punitive action only for instances of software associated with the tags that are processed at the guardian center 103 (FIG. 2).

As another alternative embodiment, no tag processing at all need take place for software purchased for unlimited use, thus eliminating the activities associated with step 372 (FIG. 12). Instead, only the HEADER_TAG_TABLE needs to be verified. In this case the HEADER_TAG_TABLE (top row in FIG. 6) includes the ID_TAG_TABLE and event history (FIG. 6). In this embodiment, each tag 120 includes an ID_TAG_TABLE in addition to HASH_SW, NAME_SW and NUM_INST_SW. The ID_TAG_TABLE value may be written into the tag 120 (Column 1) at the time of purchase and should be an argument to the hash function in step 153 in FIGS. 3A, 3B, and 3C resulting in HASH_INST_SW.

Since ID_TAG_TABLE includes ID(SP) 209-A and since ID(SP) 209-A is based on a rarely duplicated value including, for example, the microsecond value time when the device 104 is first powered up, each ID_TAG_TABLE value should occur on only one physical device in the absence of piracy.

Piracy, in the form of copying the disk image, may cause a single ID_TAG_TABLE value to occur on several physical devices (creating "twins"), but the LAST_CALLUP_TIME field in the HEADER_TAG_TABLE of the device 104 and the CALLUP_TIME in the CALLUP_RECORD in the authentication database 138 (FIG. 9) in the guardian center 103 (FIG. 2) will fail to match at call-up time, and so the verification of HEADER_TAG_TABLE will fail. This will cause the guardian center 103 to take punitive action if two call-up messages are sent from two identically configured devices 104–107.

Further, the two of devices 104–107 cannot try to share the same cell-up procedure, because their HEADER_TAG_TABLEs will differ due to the HASH (EVENT_HISTORY) field in each of their tag tables 210. Since that hash function value is sent in the continuation message 212, only one of the devices 104–107 will be able to properly process that continuation message 212. In the case where two devices are acting in duplicate, the supervising program 209 is thus able to recognize the attempted duplication and to take punitive action. Therefore, each ID_TAG_TABLE value can be on or associated with only one device 104–107 or a call-up failure will occur. When a tag includes ID_TAG_TABLE, the supervising program 209 on a device 104–107 will allow the instance of software 111–114 associated with that tag 120 to be used only if the ID_TAG_TABLE value in the tag 120 matches that on the proper device. As a result, each instance of software 111–114 will be used on only one device 104–107 and that device will have an ID_TAG_TABLE value that matches the ID_TAG_TABLE value in the tag 120.

In step 414, the verification program (VRP) 315 determines if any entries exist in the tag table 210 for untagged instances of software. An untagged instance of software installed on a user device 104–107 is indicated in the tag table 210 by a special tag UNTAGGED_SW and the USAGE STATUS column for that untagged software is set to UNTAGGED. This UNTAGGED_SW tag entry is preferably created during the installation or first use of the user created software and the fingerprinting process is preferably performed by the user device 104 upon first detection of untagged software as explained with respect to FIG. 7.

In FIG. 13A, if the verification program (VRP) 315 detects an untagged entry in the tag table 210 in step 414, step 415 is executed. The processing of step 415 obtains each fingerprint list from the fingerprint table 126 which was transferred to the guardian center 103 in step 410. The fingerprint table 126 consists of a list of fingerprints for each untagged instance of software. The verification program (VRP) 315 matches each fingerprint list Xi in the fingerprint table 126 against every fingerprint list Yj in the fingerprint data structure 137 in the GCDB 300 using general-location fingerprint checking, as explained above. If more than a specified number of matches are found between fingerprint lists Xi and Yj, then the guardian center has detected the use of infringing software and processing proceeds to step 420 where punitive action is prepared and sent to the user device 104 that performed the call-up. The software vendor 101 who creates the non-infringing versions of the infringing software may also be notified.

It is computationally expensive to compare each list of fingerprints Xi against every fingerprint list in the guardian center and since this is the most expensive operation in the call-up, one embodiment accomplishes this somewhat differently. In this embodiment, a fingerprint list called an Inverted Guardian Fingerprint Table is constructed which contains all of the fingerprints of all the infringing software, but without duplicate fingerprints. Using this Inverted Guardian Fingerprint Table, the guardian center 103 examines each list Xi and determines how many fingerprints in this list match fingerprints in the Inverted Guardian Fingerprint Table (stored as fingerprint data structure 137). If more than a specified number of matches are found, then a detailed check is made of Xi against each Yj, to determine if a close match in the number of fingerprints occurs. If step 415 does not detect any fingerprint lists that match, step 419 is processed to determine if any punitive action has been defined from either of the earlier steps 411 or 412. If so, processing proceeds to step 420 as previously described.

If no punitive action is defined in step 419, step 421 is processed. This step handles all tags TAG_INST_SWn that are known to the guardian center 103 to be pay-per-use tags. That is, guardian center 103 can maintain within the tagged software database 138 (FIG. 9) a list of all instances of software 111–114 that are to be accounted for on a pay-per-use basis. Step 421 examines the tag table 210 for any such tags (Column 1) and upon detection of one or more pay-per-use tags, step 421 causes the guardian center to send accounting information (not shown) to the software vendor 101 concerning the usage characteristics of that pay-per-view or pay-per-use instance 111–114. The RUN COUNT or USE TIME fields of a tag entry in the tag table 210 can be used to determine pay-per-use statistics. If a pay-per-use tag is expired, the USAGE STATUS field for the tag TAG_INST_SWn for that instance of software in the tag table 210 is set to "GC_DISABLED". This can be done by preparing a disable action DISABLE(TAG_INST_SW) for the tag. This disable action can be incorporated into the continuation message 212, as will be explained shortly.

After pay-per-use processing in step 421 is complete, step 422 creates a continue action CONTINUE (TAG_INST_SW) for every fully verified and unexpired tag TAG_INST_SW in the tag table 210. This continue action will be incorporated into the continuation message (CM) 212.

In step 423, the verification program 315 prepares a continuation message (CM) 212 to be returned to the user device 104. The continuation message (CM) 212 contains several fields. A TIME field indicates the current time from clock 304 and a ID_TAG_TABLE field indicates the unique identification of the tag table 210 originally sent to the guardian center 103 in step 410 of the call-up processing, as well as an encoding of the event history at the time of the call-up HASH (EVENT_HISTORY). An ACTIONS field contains a list of actions ACTIONS=(ACTIONS1, ACTIONS2, ... ACTIONSN) selected from the a list of available actions for a particular user device's 104 supervising program (SP) 209. A hash function value is also included and is computed on the actions HASH(ACTIONS). Finally, a digitally signed value on the entire contents of the continuation message 212 is included to ensure that the continuation message 212 cannot be forged by a site or host on network 100 posing as a guardian center 103. Preferably, the signed value appears as follows:

SIGN_GC (TIME, ID_TAG_TABLE,HASH(ACTIONS), HASH(EVENT_HISTORY))

Once all of the fields of the continuation message (CM) 212 are complete, the verification program 315 securely sends or transmits the continuation message (CM) 212 back to the supervising program (SP) 209 within the user device 104 that initiated the call-up in step 410. In one embodiment, this may use a public key provided by the device upon call-up. If a pirate sets up two devices that have the same public key, only the one device having the correct event history will be able to process the continuation message 212 according to this embodiment of the invention.

Finally, in step 425, the guardian center 103 creates a call-up record CALL-UP_RECORDn associated with the call-up procedure. The guardian center 103 appends a reference to this call-up record CALL-UP_RECORDn to the tag data structure 320 (FIG. 10) associated with this TAG_INST_SW. A reference is either a memory pointer or a unique identifier of the CALL-UP RECORD. The contents of the call-up record are discussed above with respect to FIG. 10.

An example of the usefulness of this aspect of the invention will highlight some of its feature. Suppose, for example, a user 213 purchases a one year license to use an instance of software 111–114, and that after that one year period has expired, the user 213 does not renew the license. Since the user 213 does not renew, the software vendor 101 desires to disable the instance of software 111–114 for which the user 213 is no longer maintaining a license. Using this invention, the vendor 101 can simply set the policy POLICY (TAG_INST_SW) at the guardian center 103 associated with that instance of software 111–114 to disable the instance upon the next call-up to the guardian center 103 from the user device 104 equipped with the instance 111–114. In this manner, dynamic usage supervision is provided without requiring the user 213 to turn in his copy of the instance of software 111–114. If the user 213 later desires to renew the license, the vendor 101 merely alters the policy POLICY(TAG_INST_SW) at the guardian center 103 and the next call-up will update the tag table 210 in the user device 104 with a "CONTINUED" status tag TAG_INST_SW for that instance 111–114.

The various components of the continuation message CM 212 prepared by the guardian center GC 103, and the above mentioned digital signature incorporated into the CM 212 serve several important purposes in embodiments of the invention. The continuation message 212 instructs the receiving user device's 104 supervising program 209 how to update the USAGE STATUS column in the device's tag table 210 and which punitive actions, if any, to enact. The identifying hash function and other values in the CM 212 (FIG. 13B, 423) make it virtually impossible for a dishonest user 213 to use an continuation message 212 other than the one actually produced by the guardian center 103 in response to the current call-up from the user device (i.e., one of 104–107), for successful completion of the required call-up procedure. Also, an adversary agent or host cannot cause damage such as denial of service to a user device (i.e., 104), by sending an illegitimate CM 212 to the device 104.

As described in the above preferred embodiments, the invention provides a mechanism to detect, control and supervise usage of instances of software 111–114 that are either created and distributed (i.e., sold) from software vendors 101, or instances that are pirated and illegally distributed with attempted access by user device 104. By providing an unforgeable and authentic tag TAG_INST_SW that uniquely identifies each instance of software 111–114, usage supervision is achieved. In the preferred embodiment, same location fingerprinting is used to verify that TAG_INST_SW is properly associated with a software instance INST_SW.

Fingerprinting may be used for slightly different purposes as well. One such purpose is to check the textual integrity of the operating system 207. This can be done by having one portion of a program check another portion or another program by the aforementioned fingerprinting process. This prevent tampering with, for example, the supervising program 209 or the operating system 207. In another embodiment, an external hardware device such as an electronically programmable read-only memory can perform this check when the machine or device 104–107 is powered on. In either case, the checking program can compute a hash fingerprint as explained above on some portion of the operating system program 207, for example, and will cause the device to fail if it finds a mismatch in fingerprints. Fingerprinting may also be used by the operating system 207 to check the supervising program 209 text. The supervising program 209 in turn can use the hash of the event history for verification or authenticity checking.

This operates, for example, as follows: the supervising program 209 can update the hash of the data tag table 210 after each update using an incremental hash function method such as MD5. Periodically, before updating the tag table 210 with a new event, the supervising program 209 can verify that the hash function value it has is equal to the hash of the tag table. When any of these checks fail, the supervising program 209 or operating system 207 can take punitive action. In this manner, aspects of the invention can be used to detect device or software tampering of software which operates as the invention itself.

A further use of fingerprinting is to verify that specific vendor software submitted to the tag server 102 with a request for tags 120 for instances of that software 111–114, is not an illegitimate copy or derivative of another legitimate vendor's software SW. Such an action, were it possible, would permit a pirating vendor to distribute another legitimate vendor's software SW with associated tag-server produced authentic tags 120. This aspect of the invention prevents this form of piracy by fingerprinting the newly created software and using general location fingerprinting to compare the new software against existing software to see whether the newly submitted vendor software is suspiciously similar to legitimate vendor software SW.

An instance of software 111–114 may have its tag checked either when it is installed or when it is first used. Tags may also be checked (i.e. verified via either hash functions, signatures, or call-up procedures) later. One reason for waiting until the software is first used is that the software may be large, so that checking may entail less overhead when the software is run than when it is first installed.

Because of failures, the state of a device may have to be restored to a previous state. In this case, a user 213 must contact the Guardian Center 103 to warn that an old HEADER_TAG_TABLE may need to be sent. Suspicious uses of this privilege can be tracked easily at the guardian center 103.

FIG. 14 illustrates data structures used by an alternative embodiment of this invention which can eliminate the need for Guardian Center call-ups for software that produces shared data files. An example is a word processing program. Acquaintances often exchange word processing files and may exchange the word processing software as well. Typically, the first case is permitted whereas the second case of exchanging software applications is not. To prevent such piracy, an embodiment of the invention can change the software application program to write the TAG_INST_SW 120 associated with that program, as well as, for example, the ID_TAG_TABLE, and the time of last access in an invisible location of each shared file, as shown in data structure 600 in FIG. 14. The program also may write the TAG_INST_SW and time of last access into the TAG_TABLE 601, also shown in this figure.

The data structure 600 stored in the invisible location (invisible to the user, that is) in a shared software data file (i.e. a document for example, referred to herein as an SSD) may be placed in a comment section of the shared software data SSD file and can be accompanied by an unaliasable hash function which preferably uses the three arguments: TAG_INST_SW, ID_TAG_TABLE and time of last access 600.

Figure 15:
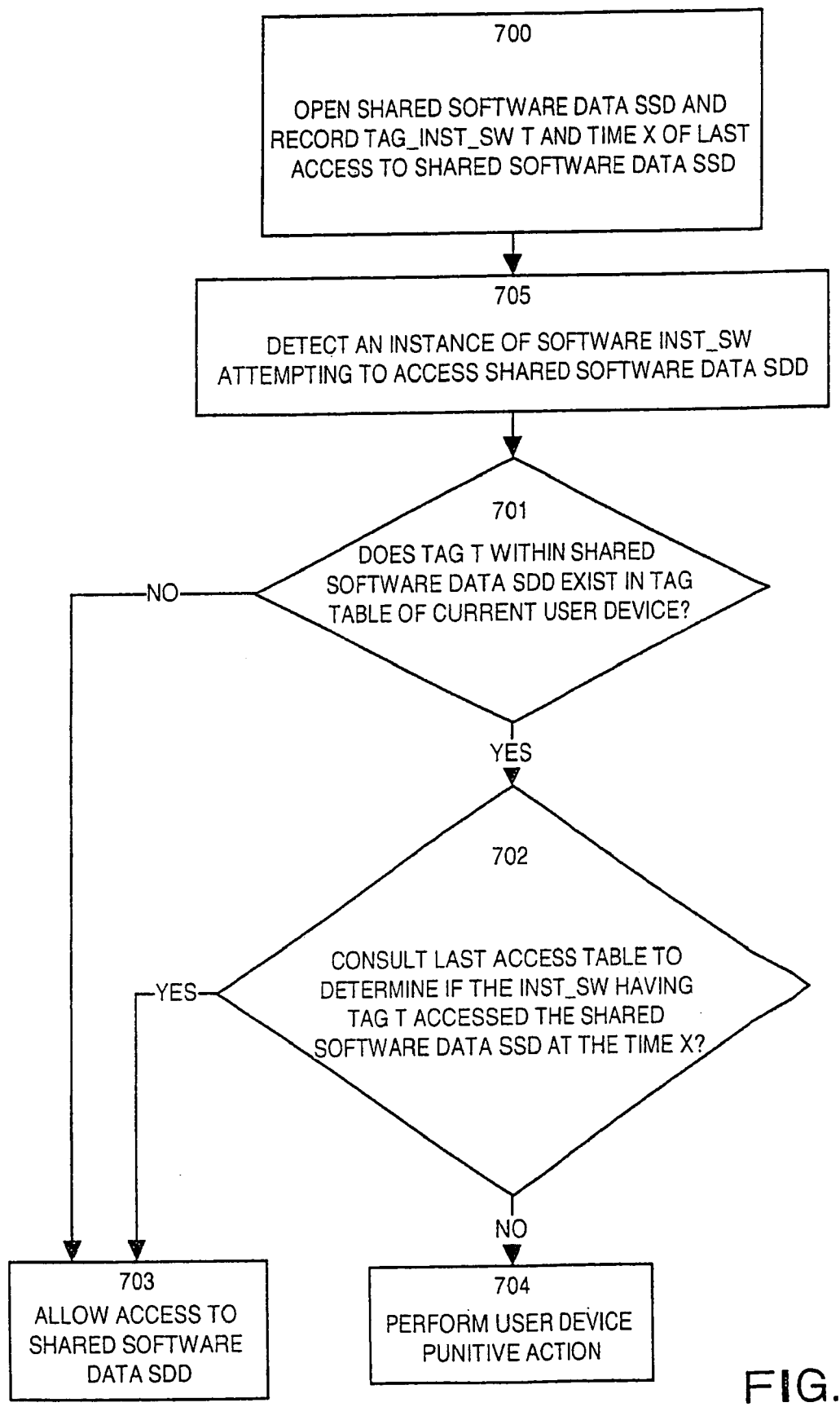
FIG. 15 is a flow chart of processing steps performed by a user device's supervision program in an embodiment of the invention without guardian center call-ups.

FIG. 15 illustrates the steps of an embodiment of the invention that provides the above noted software infringement protection mechanisms. In step 700 of FIG. 15, when supervising program SP 209 on a first user device (i.e. user device 104) having an ID_TAG_TABLE X detects an access to a shared software data SSD, the supervising program 209 examines shared software data SSD and records within a predetermined location within the shared software data SSD that shared software data SSD has accessed by the software instance (i.e. one of 111–114) having a TAG_INST_SW T at a specific time. Then, in step 701, when an instance of software (potentially on another machine or another user device (e.g., 105) attempts to execute and access the shared software data file SSD, the supervising program 209 on the user device 105 senses the existence of data structure 600 in the shared software data file SSD and obtains the tag T from the SSD and checks the tag table 210 on user device 105 (the device obtaining the shared file, but not necessarily the creating device of the file SSD) to see whether the tag T is in the tag table 210. If the tag T does not exist, then the instance of software being used on the secondary device 105 (the device obtaining the shared data) to access the shared software data SSD has not been copied, and thus access is allowed to proceed to step 703.

Alternatively, if in step 701 the tag T does exist in the data structure 600 stored within the shared software data SSD, then processing proceeds to step 702. In step 702, the supervising program 209 on the secondary device 105 tests whether the instance of software (e.g. one of instance 111–114 on the secondary device 105) associated with the tag T wrote the shared software data file at the time indicated in the data structure 600 embedded in the SSD. If not, piracy has occurred and the supervising program 209 performs punitive action on the secondary user device in step 704. If step 702 determines that the current instance of software 111–114 on the secondary device 105 did access the shared software data SSD as indicated by the information in the data structure 600 embedded in the SSD, then processing proceeds to step 703 where access to the shared software data is allowed. Note that this embodiment is advantageous by requiring no Guardian Center call-ups, other than, perhaps, one at the time of the purchase or installation of the software instance 111–114 or for purposes of detecting infringing software.

In another embodiment of this invention, different software instances of the same software differ depending on a device identifier. The advantage of such an embodiment is to reduce the needed communication with the guardian center. The disadvantage is that each software instance must be different (as opposed to only the tag's being different) and cannot be moved from device to device. In this embodiment device identifier is constructed from a processor identifier if available (some processors such as a Pentium III built by Intel Corporation have a processor identifier) or preferably from the supervising program identifier, which may incorporate a processor identifier as described above. Each software instance incorporates the identifier of the device that is to use that software instance in a test inside the software instance's code. Such a test may be expressed in the C language for example as an "if statement." The test compares the incorporated identifier with the device identifier. The software, upon executing, performs the test. If the comparison succeeds, then the device may use the software instance. If the comparison fails, the device may not use the instance and may inform the supervising program to take punitive action. A would-be pirate may modify the program so that the program doesn't check the device identifier. This is analogous to making tagged software appear as if it is untagged and therefore infringing. Software whose device test has been modified or removed may be detected by the fingerprint-based mechanism described in FIG. 13A, starting with step 414 in FIG. 13A.

A variant on this embodiment is that the vendor sends both the device identifier and a signed digital signature of the hash of the software instance incorporating the device identifier.

This can be computed as follows:
SIGN_VENDOR(HASH_INST_SW),
where HASH_INST_SW=HASH(SW, DEVICE_IDENTIFIER)

Here, SIGN_VENDOR is the digital signature of the vendor and the HASH_INST_SW is computed from the contents of the software (identical for all instances) plus the incorporated DEVICE_IDENTIFIER. The software instance incorporating the device identifier would preferably place that identifier at the beginning or at the end of the contents of the software in order to make the hashing process inexpensive. A second test verifies that the digital signature SIGN_VENDOR is authentic and a third test verifies that the sent HASH_INST_SW is equal to the value resulting from hashing the software instance. Both tests are performed by the supervising program on the user device. If either the digital signature is not authentic or HASH_INST_SW has a different value from the hash of the received software instance, then punitive action is taken by the supervising program.

In the above descriptions, the tag server 102, the guardian center 103 and the vendor 101 have been described separately. Alternative embodiments are possible in which these roles can be unified. For example, a single site or networked host or server may serve as both the guardian center 103 and the tag server 102. Or a software vendor 101 may serve all three roles. Further still, even if each process or role is separated, some of the functions allocated to one component (i.e. tag server, guardian server, vendor) in the embodiments above may be performed by other components. For example, same-location fingerprinting may be performed at the vendor 101 instead of at the tag server 102.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A system for supervising usage of software comprising:
a software vendor producing instances of software;
a tag server producing a plurality of tags, one tag per instance of software, each tag uniquely identifying an instance of software with which it is associated;
a user device receiving and installing an instance of software and securely receiving a tag uniquely associated with that instance of software, the user device including a supervising program which detects attempts to use the instance of software and which verifies the authenticity of the tag associated with the instance of software before allowing use of the instance of software; and
an untagged instance of software used on the user device;
wherein the supervising program detects the use of the untagged instance of software and performs a fingerprinting process on the untagged instance of software and stores fingerprints resulting from the fingerprinting process on the user device.

2. The system of claim 1, wherein the user device's supervising program further performs a fingerprinting process on a tagged instance of software used on the device and stores the fingerprints resulting from the fingerprinting process in a fingerprint table on the user device.

3. The system of claim 2, wherein the supervising program stores locations from which the fingerprints are computed.

4. The system of claim 2, wherein the fingerprints are based on contents of the instance of software.

5. The system of claim 2, wherein the fingerprints are based on known sequences of behavior of the instance of software.

6. A user device comprising:
an input port receiving an instance of software and receiving a tag uniquely associated with that instance of software and receiving a request to use the instance of software;
a processor executing a supervising program, the supervising program detecting the request to use the instance of software and verifying the authenticity of the tag associated with the instance of software before allowing use of the instance of software by the user device; and
an untagged instance of software used on the user device;
wherein the supervising program detects the untagged instance of software and performs a fingerprinting process on the untagged instance of software and stores fingerprints resulting from the fingerprinting process in a fingerprint table on the user device.

7. The user device of claim 6, wherein the supervising program determines that a call-up procedure is required as defined by a call-up policy and the supervising program performs the call-up procedure to update the usage status of untagged instances of software stored on the user device.

8. The user device of claim 7, wherein during performing the call-up procedure, the supervising program transmits a portion of the fingerprint table from the user device via an interconnection mechanism coupled to the user device and awaits reception of a continuation message returned to the user device that indicates actions to be performed for each untagged instance of software stored on the user device.

9. A system for supervising usage of software comprising:
a software vendor producing instances of software,
a user device receiving and installing an instance of software,
the user device including a supervising program,
an untagged instance of software used on the user device;
wherein the supervising program detects the use of the untagged instance of software and performs a fingerprinting process on the untagged instance of software and stores fingerprints resulting from the fingerprinting process on the user device.

10. The system of claim 9, wherein the user device's supervising program further performs a fingerprinting process on an untagged instance of software used on the device and stores the fingerprints resulting from the fingerprinting process in a fingerprint table on the user device.

11. The system of claim 10, wherein the supervising program stores locations from which the fingerprints are computed.

12. The system of claim 10, wherein the fingerprints are based on the contents of the instance of software.

13. The system of claim 10, wherein the fingerprints are based on known sequences of behavior of the instance of software.

14. The system of claim 10, further comprising:
a guardian center including:
a fingerprint data structure; and
a verification program;
the guardian center periodically communicating with the user device via a call-up procedure to receive all fingerprints from the user device for an instance of software used on the user device, the verification program comparing every fingerprint received from the user device against the fingerprint data structure to determine if an instance of software used on the user device is an infringing instance of software.

15. The system of claim 14, wherein if the verification program detects more than a specified number of matches between fingerprints in the guardian center's fingerprint data structure and fingerprints received from the user device, the verification program specifies a punitive action to be performed, and the verification program returns a continuation message to the user device, the continuation message indicating the punitive action to be performed on the user device.

16. The system of claim 15, wherein the fingerprint matching process is at least one of general location or same location fingerprint matching.

17. The system of claim 15, wherein the fingerprint matching uses an inverted guardian center fingerprint table.

18. The system of claim 15, wherein the punitive action specifies that the user device be disabled for a specified length of time.

19. The system of claim 15, wherein the punitive action specifies that the instance of software associated with the fingerprint that was matched to a fingerprint in the fingerprint data structure of the guardian center should be disabled for a specified length of time.

20. The system of claim 15, wherein the punitive action depends on at least one of a combination of the history of the behavior of the user device, the history of the behavior of a particular user on the user device, and the collection of other software on the user device.

21. The system of claim 14, wherein the software vendor transmits a copy of an infringing instance of software to the guardian center and the guardian center computes fingerprints on the copy of the infringing instance of software and incorporates and stores the fingerprints into the fingerprint data structure on the guardian center.

* * * * *